(12) United States Patent
Shibayama et al.

(10) Patent No.: US 9,285,512 B2
(45) Date of Patent: *Mar. 15, 2016

(54) ANTI-REFLECTION FILM

(75) Inventors: Naoyuki Shibayama, Tokyo (JP);
Toshiaki Yoshihara, Tokyo (JP)

(73) Assignee: TOPPAN PRINTING CO., LTD. (JP)

( * ) Notice: Subject to any disclaimer, the term of this patent is extended or adjusted under 35 U.S.C. 154(b) by 847 days.

This patent is subject to a terminal disclaimer.

(21) Appl. No.: 13/470,138

(22) Filed: May 11, 2012

(65) Prior Publication Data

US 2012/0218637 A1    Aug. 30, 2012

Related U.S. Application Data

(63) Continuation of application No. PCT/JP2010/068080, filed on Oct. 14, 2010.

(30) Foreign Application Priority Data

| | | |
|---|---|---|
| Nov. 12, 2009 | (JP) | 2009-258783 |
| Jan. 18, 2010 | (JP) | 2010-008078 |
| Mar. 16, 2010 | (JP) | 2010-058990 |
| Mar. 16, 2010 | (JP) | 2010-058991 |

(51) Int. Cl.
*G02B 1/16* (2015.01)
*G02B 1/116* (2015.01)
(Continued)

(52) U.S. Cl.
CPC .............. *G02B 5/0242* (2013.01); *G02B 1/116* (2013.01); *G02B 1/16* (2015.01); *G02F 1/133502* (2013.01)

(58) Field of Classification Search
CPC ............ G02B 1/10; G02B 1/105; G02B 1/11; G02B 1/111; G02B 1/113; G02B 1/115; G02B 1/116; G02B 1/14; G02B 1/16
USPC .......... 359/577, 580, 581, 582, 585, 586, 588
See application file for complete search history.

(56) References Cited

U.S. PATENT DOCUMENTS

| | | | | |
|---|---|---|---|---|
| 2005/0008863 | A1* | 1/2005 | Mimura et al. | 428/409 |
| 2008/0292866 | A1* | 11/2008 | Shinohara et al. | 428/318.4 |

(Continued)

FOREIGN PATENT DOCUMENTS

| | | |
|---|---|---|
| JP | 11-034222 | 2/1999 |
| JP | 11-92750 | 6/1999 |

(Continued)

OTHER PUBLICATIONS

Japanese Notification of Reasons for Refusal dispatched by JPO on Mar. 29, 2011, in connection with Appl. No. 2011-501056, 4 pgs.

(Continued)

*Primary Examiner* — Kimberly N Kakalec
(74) *Attorney, Agent, or Firm* — Squire Patton Boggs (US) LLP

(57) ABSTRACT

An anti-reflection film with low production costs, excellent anti-reflection performance or excellent optical properties free from interference variation, high abrasion resistance, and antistatic function to prevent dust adhesion is demanded. In the present invention, the problem to be solved is to provide an anti-reflection film having low production costs, excellent optical property and excellent abrasion resistance and antistatic function.

The present invention provides an anti-reflection film in which a localized layer and a low refractive index layer are laminated in this order on at least one surface of a transparent base, and the localized layer is constituted to have an intermediate layer, a hard coat layer, an antistatic layer containing a conductive material and a leveling layer containing a leveling material that are laminated as localized in order from at least the side of the transparent base.

15 Claims, 2 Drawing Sheets

(51) Int. Cl.
 *G02F 1/335* (2006.01)
 *G02B 5/02* (2006.01)
 *G02F 1/1335* (2006.01)

(56) References Cited

U.S. PATENT DOCUMENTS

| | | | |
|---|---|---|---|
| 2009/0075074 A1* | 3/2009 | Horio et al. | 428/341 |
| 2009/0141357 A1* | 6/2009 | Kamura et al. | 359/585 |

FOREIGN PATENT DOCUMENTS

| | | |
|---|---|---|
| JP | 2001-059902 | 3/2001 |
| JP | 2001-316604 | 11/2001 |
| JP | 2002-182005 | 6/2002 |
| JP | 2003-053878 | 2/2003 |
| JP | 2004-034399 | 2/2004 |
| JP | 2005-144849 | 6/2005 |
| JP | 2005-199707 | 7/2005 |
| JP | 2005-202389 | 7/2005 |
| JP | 2006-035493 | 2/2006 |
| JP | 2006-159415 | 6/2006 |
| JP | 2007-121993 | 5/2007 |
| JP | 2007-332181 | 12/2007 |
| JP | 2008-033348 | 2/2008 |
| JP | 2008-239724 | 10/2008 |
| JP | 2008-241882 | 10/2008 |
| JP | 2008-257219 | 10/2008 |
| JP | 2008-299007 | 12/2008 |
| JP | 2009-053691 | 3/2009 |
| JP | 2009-075248 | 4/2009 |
| JP | 2009-086660 | 4/2009 |
| JP | 2009-211061 | 9/2009 |
| JP | 2009-217258 | 9/2009 |
| JP | 2009-262149 | 11/2009 |
| WO | WO 2006/109419 A1 | 10/2006 |

OTHER PUBLICATIONS

Translation of the Japanese Notification of Reasons for Refusal dispatched by JPO on Mar. 29, 2011, in connection with Appl. No. 2011-501056, 7 pgs.
Japanese Notification of Reasons for Refusal dispatched by JPO on May 31, 2011, in connection with Appl. No. 2011-501056, 3 pgs.
Translation of the Japanese Notification of Reasons for Refusal dispatched by JPO on May 31, 2011, in connection with Appl. No. 2011-501056, 4 pgs.
Japanese Interrogation dispatched by JPO on Mar. 13, 2012, in connection with Appl. No. 2011-501056, 4 pgs.
Translation of the Interrogation dispatched by JPO on Mar. 13, 2012, in connection with Appl. No. 2011-501056, 8 pgs.
Japanese Notification of Reasons for Refusal dispatched by JPO on Aug. 28, 2012, in connection with Appl. No. 2011-501056, 4 pgs.
Translation of the Japanese Notification of Reasons for Refusal dispatched by JPO on Aug. 28, 2012, in connection with Appl. No. 2011-501056, 8 pgs.
Notification of Reasons for Rejection mailed on Jun. 24, 2014 in connection with Japanese Patent Application No. 2011-247557, 3 pp.
Translation of Notification of Reasons for Rejection mailed on Jun. 24, 2014 in connection with Japanese Patent Application No. 2011-247557, 4 pp.
Written Opinion for PCT/JP2010/068080, mailed Nov. 16, 2010, 7 pgs.
Japanese Notification of Reasons for Rejection dispatched by JPO on Jun. 24, 2014, in connection with Appl. No. 2011-247558, 3 pgs.
Translation of the Japanese Notification of Reasons for Rejection dispatched by JPO on Jun. 24, 2014, in connection with Appl. No. 2011-247558, 3 pgs.
Opinion Brief of the Taiwan patent application No. 099138764, dated Jan. 21, 2015, 6 pgs.
Translation of the Opinion Brief of the Taiwan patent application No. 099138764, dated Jan. 21, 2015, 3 pgs.

* cited by examiner

ANTI-REFLECTION FILM

This application is a continuation of International Application No. PCT/JP2010/068080, filed Oct. 14, 2010, which is incorporated herein by reference in its entirety.

BACKGROUND OF THE INVENTION

1. Field of the Invention

The present invention relates to an anti-reflection film, which is arranged for the purpose of preventing reflection of external light on the surface of a window, a display, and the like. Particularly, the present invention relates to an anti-reflection film, which is arranged on the surface of a display such as a liquid crystal display (LCD), a CRT display, an organic electroluminescence display (ELD), a plasma display (PDP), a surface-conduction electron-emitter display (SED), and a field-emission display (FED). Particularly, the present invention relates to an anti-reflection film, which is arranged on the surface of a liquid crystal display (LCD). Among these, the present invention relates to an anti-reflection film, which is arranged on the surface of a transmission type liquid crystal display (LCD).

2. Description of the Related Art

In general, displays are used in the environment onto which external light and the like are incident regardless of whether they are used indoors or outdoors. This incident light such as external light is reflected on the display surface so that a displayed image is interfered with the reflected image and the quality of display decreases. Hence, it is necessary to provide a display surface and the like with an anti-reflection function, and further, improvements of the anti-reflection function along with introductions of other extra useful functions are being demanded.

In general, an anti-reflection function is realized by forming an anti-reflection layer having a multilayer structure repeating high refractive index layers and low refractive index layers made of a transparent material such as metal oxide on a transparent substrate. The anti-reflection layer including this type of multilayer structure can be obtained by a dry coating method such as chemical vapor deposition (CVD) and physical vapor deposition (PVD).

In the case where the anti-reflection layer is formed by a dry coating method, while there is an advantage of fine thickness controllability of a low refractive index layer and a high refractive index layer, there is also a problem of low productivity due to a limitation of a deposition process performed in a vacuum chamber, which is unsuitable for mass production. Thus, wet coating methods, which use a coating liquid for forming an anti-reflection layer and can provide a large display, produce continuously, and reduce costs, attract attention as a method of forming an anti-reflection layer.

In addition, in the anti-reflection film in which such anti-reflection layer is arranged on the transparent base, the surface thereof is relatively flexible. Thus, a method is generally used in which a hard coat layer resulting from curing of an acrylic-based material is arranged in order to give hardness to the surface, and an anti-reflection layer is formed on the hard coat layer. This hard coat layer is provided with a high level of surface hardness, luster, transparency, and abrasion resistance due to the acrylic-based material.

In the case where an anti-reflection layer is formed by a wet coating method, the anti-reflection layer is produced by coating at least a low refractive index layer on such hard coat layer resulting from curing of such ionization radiation curable materials, and the wet coating method has a merit of inexpensive production in comparison with a dry coating method, and thus, this type of anti-reflection film is widely distributed in the market.

<Patent document 1>: JP-A-2005-202389.
<Patent document 2>: JP-A-2005-199707.
<Patent document 3>: JP-A-H11-92750.
<Patent document 4>: JP-A-2007-121993.
<Patent document 5>: JP-A-2005-144849.
<Patent document 6>: JP-A-2006-159415.
<Patent document 7>: JP-A-2007-332181.

SUMMARY OF THE INVENTION

If the anti-reflection film is applied on a surface of a display device, anti-reflection properties of the anti-reflection film can suppress reflection of external light so as to improve the contrast of the display device in a bright place. It is possible to display an image brighter because transmittance can be improved. In addition, the anti-reflection film is also expected to have an energy saving effect due to a reduction of the power consumption of the backlight, etc.

An anti-reflection film with low production costs is demanded. In addition, an anti-reflection film having excellent anti-reflection performance or excellent optical properties free from interference variation is demanded. In addition, an anti-reflection film with high abrasion resistance is demanded as it is arranged on the surface of a display. In addition, an anti-reflection film having antistatic function in order to prevent dust adhesion is demanded. In the present invention, the problem to be solved is to provide an anti-reflection film having low production costs, excellent optical property and excellent abrasion resistance and antistatic function.

The present invention dissolves the problem. A first aspect of the present invention is an anti-reflection film in which a localized layer and a low refractive index layer are laminated in this order on at least one surface of a transparent base, wherein the localized layer is constituted to have an intermediate layer, a hard coat layer, an antistatic layer containing a conductive material, and a leveling layer containing a leveling material that are laminated as localized in order from at least the side of the transparent base.

A second aspect of the present invention is the anti-reflection film according to the first aspect of the present invention, wherein the parallel light beam transmittance of the anti-reflection film is 93% or more, the haze of the anti-reflection film is within a range of 1.0% or less, the surface resistance value of the anti-reflection film on the surface of the low refractive index layer is within a range of from $1 \times 10^5$ $\Omega/cm^2$ to $1 \times 10^{12}$ $\Omega/cm^2$, and the pure water contact angle of the anti-reflection film on the surface of the low refractive index layer is within a range of from 80° to 130°.

A third aspect of the present invention is the anti-reflection film according to the first aspect of the present invention, wherein the leveling material contained in the leveling layer is selected from a compound having an amide group, a compound having an acrylic group, a compound having a butadiene group and a compound having an olefin group.

A fourth aspect of the present invention is the anti-reflection film according to the first aspect of the present invention, wherein the conductive material contained in the conductive layer is selected from a quaternary ammonium salt material, a metal oxide particle and a conductive polymer.

A fifth aspect of the present invention is the anti-reflection film according to the first aspect of the present invention, wherein the conductive material contained in the conductive layer contains a quaternary ammonium salt material, the leveling material contained in the leveling layer contains a compound having an amide group, the molecular weight (Q) of the quaternary ammonium salt material is preferably from 1,000 to 100,000, and the molecular weight (A) of the compound having an amide group is 100,000 or less.

A sixth aspect of the present invention is the anti-reflection film according to the first aspect of the present invention, wherein the conductive material contained in the conductive layer contains metal oxide particles, the leveling material contained in the leveling layer contains a compound having an amide group, the average particle size of the metal oxide particle is 500 nm or less, and the molecular weight (A) of the compound having an amide group is 100,000 or less.

A seventh aspect of the present invention is the anti-reflection film according to the first aspect of the present invention, wherein the conductive material contained in the conductive layer contains a conductive polymer, the leveling material contained in the leveling layer contains a compound having an amide group, the average particle size of the conductive polymer is preferably 1,000 nm or less, and the molecular weight (A) of the compound having an amide group is 100,000 or less.

An eighth aspect of the present invention is the anti-reflection film according to the first aspect of the present invention, wherein the conductive material contained in the conductive layer contains a quaternary ammonium salt material, the leveling material contained in the leveling layer contains a compound having an acrylic group, the molecular weight (Q) of the quaternary ammonium salt material is preferably from 1,000 to 100,000, and the molecular weight (B) of the compound having an acrylic group is 100,000 or less.

A ninth aspect of the present invention is the anti-reflection film according to the first aspect of the present invention, wherein the conductive material contained in the conductive layer contains metal oxide particles, the leveling material contained in the leveling layer contains a compound having an acrylic group, the average particle size of the metal oxide particle is 500 nm or less, and the molecular weight (B) of the compound having an acrylic group is 100,000 or less.

A tenth aspect of the present invention is the anti-reflection film according to first aspect of the present invention, wherein the conductive material contained in the conductive layer contains a conductive polymer, the leveling material contained in the leveling layer contains a compound having an acrylic group, the average particle size of the conductive polymer is preferably 1,000 nm or less, and the molecular weight (B) of the compound having an acrylic group is 100,000 or less.

An eleventh aspect of the present invention is the anti-reflection film according to the first aspect of the present invention, wherein the conductive material contained in the conductive layer contains a quaternary ammonium salt material, the leveling material contained in the leveling layer contains a compound having a butadiene group, the molecular weight (Q) of the quaternary ammonium salt material is preferably from 1,000 to 100,000, and the molecular weight (C) of the compound having a butadiene group is 100,000 or less.

A twelfth aspect of the present invention is the anti-reflection film according to the first aspect of the present invention, wherein the conductive material contained in the conductive layer contains metal oxide particles, the leveling material contained in the leveling layer contains a compound having a butadiene group, the average particle size of the metal oxide particle is 500 nm or less, and the molecular weight (C) of the compound having a butadiene group is 100,000 or less.

A thirteenth aspect of the present invention is the anti-reflection film according to the first aspect of the present invention, wherein the conductive material contained in the conductive layer contains a conductive polymer, the leveling material contained in the leveling layer contains a compound having a butadiene group, the average particle size of the conductive polymer is preferably 1,000 nm or less, and the molecular weight (C) of the compound having a butadiene group is 100,000 or less.

A fourteenth aspect of the present invention is the anti-reflection film according to the first aspect of the present invention, wherein the conductive material contained in the conductive layer contains a quaternary ammonium salt material, the leveling material contained in the leveling layer contains a compound having an olefin group, the molecular weight (Q) of the quaternary ammonium salt material is preferably from 1,000 to 100,000, and the molecular weight (D) of the compound having an olefin group is 100,000 or less.

A fifteenth aspect of the present invention is the anti-reflection film according to the first aspect of the present invention, wherein the conductive material contained in the conductive layer contains metal oxide particles, the leveling material contained in the leveling layer contains a compound having an olefin group, the average particle size of the metal oxide particle is 500 nm or less, and the molecular weight (D) of the compound having an olefin group is 100,000 or less.

A fifteenth aspect of the present invention is the anti-reflection film according to the first aspect of the present invention, wherein the conductive material contained in the conductive layer contains a conductive polymer, the leveling material contained in the leveling layer contains a compound having an olefin group, the average particle size of the conductive polymer is preferably 1,000 nm or less, and the molecular weight (D) of the compound having an olefin group is 100,000 or less.

A seventeenth aspect of the present invention is a method of producing an anti-reflection film in which a localized layer and a low refractive index layer are laminated in this order on at least one surface of a transparent base, including: a coating process of coating a coating liquid for forming a localized layer containing an ionization radiation curable material, a conductive material, a leveling material and a solvent on at least one surface of the transparent base to form a coating film of the localized layer, a drying process of primarily drying and secondarily drying the coating film of the localized layer, a film-hardening process of irradiating the coating film of the localized layer with ionization radiation to form a localized layer, a coating process of coating a coating liquid for forming a low refractive index layer containing the low refractive index layer-forming material and a solvent to form a coating film of the low refractive index layer, a drying process of drying the coating film of the low refractive index layer, and a film-hardening process of forming the low refractive index layer wherein the localized layer is constituted to have an intermediate layer, a hard coat layer, an antistatic layer and a leveling layer that are laminated as localized in order.

An eighteenth aspect of the present invention is the method of producing an anti-reflection film according to the seventeen the aspect of the present invention, wherein 30 wt % or more of the total solvent contained in the coating liquid for forming a localized layer is a solvent that dissolves the transparent base or causes the transparent base to swell, and the solvent in the coating liquid for forming a localized layer is contained in a ratio of within a range of from 25 wt % to 85 wt %.

A nineteenth aspect of the present invention is the method of producing an anti-reflection film according to the seventeenth aspect of the present invention, wherein the drying process in which the coating film of the localized layer is dried, includes two-step continuous drying of primary drying that is performed at the drying temperature in a range of from 15° C. to 30° C., and secondary drying that is performed at the drying temperature in a range of from 40° C. to 150° C.

DESCRIPTION OF NUMERALS

Figure 1:
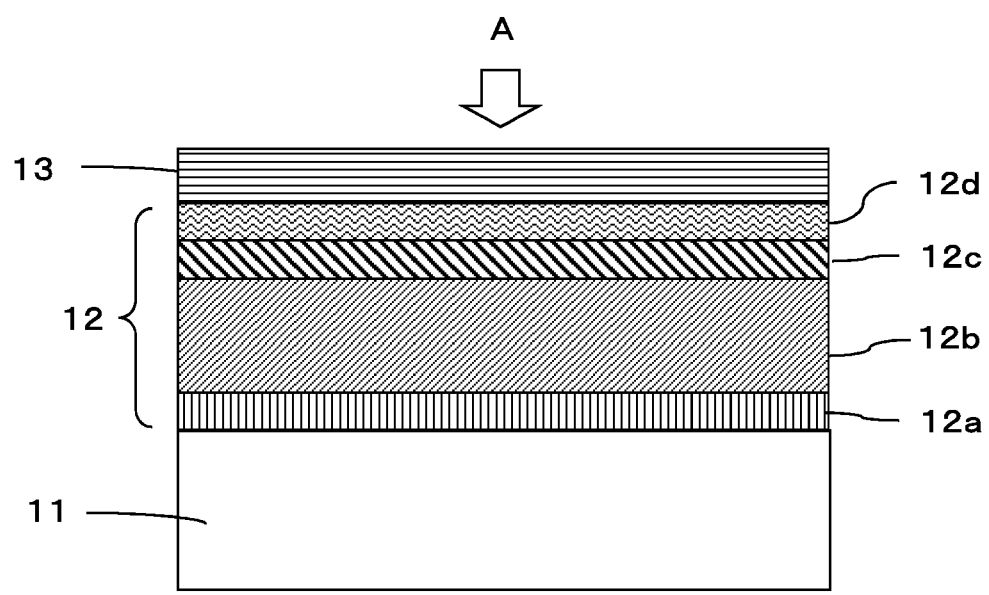
FIG. 1 is a cross-sectional schematic view illustrating an example of the anti-reflection film of the present invention.

1 Anti-reflection film
11 Transparent base
12 Localized layer
12a Intermediate layer
12b Hard coating layer
12c Antistatic layer
12d Leveling layer
13 Low-refractive index layer
21 Coating unit
22 Drying unit
22a Primary drying unit
22b Secondary drying unit
23 Ionization irradiation unit
31 Reeling out section
32 Rolling section

EMBODIMENT OF THE INVENTION

The anti-reflection film and the method of producing the anti-reflection film of the present invention, can provide an anti-reflection film having low production costs and excellent optical property, high abrasion resistance and antistatic performance. Particularly, the anti-reflection film and the method of producing the anti-reflection film of the present invention, can provide an anti-reflection film having excellent abrasion resistance.

The anti-reflection film of the present invention will be described. FIG. 1 illustrates a cross-sectional schematic view of the anti-reflection film (1) of the present invention.

The anti-reflection film (1) of the present invention has a localized layer (12) and a low refractive index layer (13) in order on at least one surface of a transparent base (11) from the side of the transparent base. The localized layer (12) contains an ionization radiation curable material, which is a binder matrix-forming material, a quaternary ammonium salt material or a metal oxide particle or a conductive polymer, which is a conductive material, and a leveling material. The ionization radiation material and the like may be cured with ionization radiation to form a binder matrix, and whereby high surface hardness is given to the anti-reflection film. Herein, the localized layer is formed with an intermediate layer (12a), a hard coat layer (12b), an antistatic layer (12c) in which the conductive material is localized, and a leveling layer (12d) in which the leveling material is localized, in order from the side of the transparent base.

The intermediate layer (12a) is formed on the interface of the transparent base (11) and the localized layer (12). In the intermediate layer (12a), the component of the transparent base and the component of the ionization radiation curable material of the localized layer are mixed. The intermediate layer (12a) has an inclined refractive index changing gradually from a value of the refractive index of the transparent base (11) to a value of the refractive index of the hard coat layer (12b) in the thickness direction from the side of the transparent base (11) toward the side of the low refractive index layer (13).

By arranging the refractive index of the intermediate layer (12a) which has an inclined refractive index changing gradually from a value of the refractive index of the transparent base (11) to a value of the refractive index of the hard coat layer (12b), it is possible to prevent generation of interference fringe, which occurs on the interface the localized layer and the transparent base. In addition, the intermediate layer can improve the adhesion between the transparent base (11) and the localized layer (12). Meanwhile, the intermediate layer can be formed by adding the solvent that dissolves the transparent base or causes the transparent base to swell, to a coating liquid for forming a localized layer when forming the localized layer.

The intermediate layer (12a) can be checked for the presence thereof by calculating the spectral reflectivity at 5° incidence angle from the side of the low refractive index for the resulting anti-reflection film. In addition, in the case where an interference peak (multiple ripples are seen in the spectral waveform) corresponding to the thickness of the low refractive index layer is checked from the resulting spectral reflectivity, it is determined that the intermediate layer (12a) is not formed, and variation of the interference fringe is observed in the appearance test in which the back surface is treated with black coating. On the other hand, in the case where an interference peak corresponding to the thickness of the low refractive index layer is not checked from the resulting spectral reflectivity, it is determined that the intermediate layer (12a) is formed, and variation of the interference is not seen at all in the appearance test in which the back surface is treated with black coating.

Meanwhile, the interference fringe or the interference variation is one kind of color variation due to optical interference, and is mainly resulted due to refractive index difference between the transparent base and the hard coat layer, and a phenomenon where multiple optical interferences occur at the same time and rainbow-colored color variation is observed in the case where the film thickness is thick. The color variation is a phenomenon where color variation in the surface increases with reflection color variation due to variation of the film thickness of the low refractive index layer.

The hard coat layer (12b) has an ionization radiation curable material as a main component, and improves surface hardness of the anti-reflection film, and gives abrasion resistance. Whether the hard coat layer is formed or not can be determined from pencil hardness of the surface of the localized layer.

In addition, the antistatic layer (12c) localizes the conductive material, and give antistatic performance to the anti-reflection film. Localization of the conductive material can decrease the use amount in comparison to dispersion of the conductive material, and can lower the production costs. Whether the antistatic layer is formed or not can be determined from the resistance value of the anti-reflection film surface.

In addition, the leveling layer (12d) localizes a leveling material on the antistatic layer. The leveling layer improves adhesion of the localized layer and the low refractive index layer, prevents detachment of the low refractive index layer from the localized layer, and gives abrasion resistance to the anti-reflection film.

Whether the leveling layer (12d) is formed in the localized layer (12) of the anti-reflection film of the present invention or not can be determined from surface analysis by X-ray photoelectron spectrometer (XPS).

In addition, presence or absence of the antistatic layer (12c) under the leveling layer can be also determined by depth direction analysis (depth profile) with an X-ray photoelectron spectrometer (XPS).

XPS is an apparatus that analyzes the chemical state of the surface of a sample. If a sample is irradiated with X ray (energy: hv), inner shell electron in an element is expelled by the photoelectric effect, and the kinetic energy (Ek) of a photoelectron at this time is represented by General formula (A) $Ek=hv-Eb-\phi$. Herein, Eb is the energy level (binding energy) of the inner shell electron, and $\phi$ is work function of the apparatus or the sample. In addition, Eb is an inherent value of an element, and changes depending on the chemical state of the element. On the other hand, the distance that the electron in the solid can pass while keeping the energy is tens of Å at most. XPS is an apparatus that can analyze a kind, an amount, and chemical state of an element that exists from the sample surface to tens of Å of the depth by measuring Ek and the number of photoelectrons released from the sample surface. In addition, XPS allows depth direction analysis by combination with ion etching.

The low refractive index layer (13) arranged on the localized layer (12) gives anti-reflection function to the anti-reflection film. At this time, the film thickness (d) of the low refractive index layer (13) is designed such that the optical film thickness (nd) resulting from multiplication of the film thickness (d) by the refractive index (n) of the low refractive index layer is equal to ¼ of the wavelength of visible light. The low refractive index layer (13) is formed by coating a coating liquid containing a low refractive index layer-forming material onto the localized layer.

In forming the low refractive index layer on the surface of the localized layer by adding a conductive material to a localized layer-forming material and localizing it, adhesion between an antistatic layer, in which the conductive material is localized, and a low refractive index layer on the antistatic layer, is bad, and as a result thereof, abrasion resistance is reduced by detachment of the low refractive index layer. The present inventors have found that further addition of a leveling material to a coating liquid for forming a localized layer containing an ionization radiation curable material and a conductive material, can provide an anti-reflection film, in which a leveling layer is formed on an antistatic layer in which the conductive material is localized, which improves adhesion of the localized layer and the low refractive index layer, and which has high abrasion resistance, and thus completed the present invention.

In the case where a conductive material is localized on the outermost surface of a localized layer, a low refractive index layer-forming material and a conductive material are electrically repulsive to each other, and the adhesion force between the localized layer and the low refractive index layer falls, and thus abrasion resistance of the anti-reflection film is reduced. In addition, in the case where the electric repulsion between the low refraction layer-forming material and the conductive material is stronger, there may be a problem such as occurrence of crawling and the like when coating the coating liquid for forming a low refractive index layer. In addition, in the case where the low refractive index layer-forming material contains a water-repellent material, electrical repulsion between the conductive material and the water-repellent material in the low refractive index layer material may result that intended antifouling performance is not obtained.

In addition, in the present invention, coating of a coating liquid for forming a localized layer can form a localized layer that becomes an intermediate layer, a hard coat layer, an antistatic layer, and a leveling layer at the same time. Consequently, according to the present invention, it is possible to suppress the production costs in comparison with a case where a hard coat layer and an antistatic layer are sequentially coated and formed on a transparent base.

In the localized layer (12), the conductive material easily precipitates on the surface in comparison with an ionization radiation curable material, which is a binder matrix-forming material, and the leveling material further easily precipitates on the surface in comparison with the conductive material. Consequently, localization of a localized layer by controlling of conditions of drying temperature and time when forming the localized layer, can isolate an intermediate layer, a hard coat layer, an antistatic layer, and a leveling layer, wherein the layered constitution is the localized layer.

The intermediate layer (12a) is composed of a binder matrix component and a triacetyl cellulose component of the localized layer. The intermediate layer (12a) has an inclined refractive index changing gradually from a value of the refractive index of the transparent base (11) to a value of the refractive index of the hard coat layer (12b), which is a refractive index of a binder matrix of the low refractive index layer, in the thickness direction from the side of the transparent base (11) toward the side of the low refractive index layer (13). By arranging the refractive index of the intermediate layer (12a) which has an inclined of the refractive index changing gradually from a value of the refractive index of the transparent base (11) to a value of the refractive index of the hard coat layer (12b), it is possible to prevent generation of interference fringe, which occurs on the interface the localized layer and the transparent base. In addition, the intermediate layer can improve the adhesion between the transparent base (11) and the localized layer (12).

The hard coat layer (12b) may contain an ionization radiation curable material, which is a binder matrix component, a conductive material and a leveling material. The hard coat layer (12b) is mainly constituted with the ionization radiation curable material, which is a binder matrix component, and can give surface hardness to the anti-reflection film since the binder matrix component is present abundantly as localized.

The antistatic layer (12c) may contain an ionization radiation curable material, which is a binder matrix component, a conductive material and a leveling material. The conductive material is abundantly present as localized, which makes it possible to give an anti-reflection film that expresses antistatic function, and has antistatic function.

The leveling layer (12d) may contain an ionization radiation curable material, which is a binder matrix component, and a leveling material. The leveling layer (12d) is mainly constituted with the leveling material, and contains no conductive material. In the case where the conductive material is present on the outermost surface of the localized layer, the adhesion force between the localized layer and the low refractive index layer falls when the low refractive index layer is formed on the localized layer, and thus abrasion resistance of the anti-reflection film is reduced. Since the leveling material has lower surface tension than the conductive material, which is a conductive material for the outermost surface in the anti-reflection film of the present invention, a layer that does not contain a conductive material can be easily formed.

When forming the low refractive index layer in the anti-reflection film of in the present invention, there is no influence of the conductive material. Accordingly, it is possible to prevent decrease of the adhesion force between the localized layer and the low refractive index layer, and give high surface hardness to the anti-reflection film, and give excellent abrasion resistance and excellent antifouling property to the anti-reflection film.

In the anti-reflection film of the present invention, it is preferable that the parallel light transmittance of the anti-reflection film is 93% or more, and the haze of the anti-reflection film is within a range of 1.0% or less, and the surface resistance value on the surface of the low refractive index layer of the anti-reflection film is within a range of from $1\times10^5$ $\Omega/cm^2$ to $1\times10^{12}$ $\Omega/cm^2$, and the pure water contact angle on the surface of the low refractive index layer of the anti-reflection film is within a range of from 80° to 130°.

In the case where the parallel light transmittance of the anti-reflection film is lower than 93%, or in the case where the haze is more than 1.0%, the anti-reflection film may have no transparent feeling, become clouded (pale white), and have decreased display contrast. Meanwhile, the parallel light transmittance is preferably as high as possible, and the haze is preferably as low as possible in the anti-reflection film of the present invention. However, the parallel light transmittance of the anti-reflection film is preferably within a range of from 93% to 98%. It is difficult to prepare an anti-reflection film having more than 98% of the parallel light transmittance in consideration of materials used currently. In addition, the haze of the anti-reflection film is preferably within a range of from 0.05% to 0.5%. It is difficult to prepare an anti-reflection film having lower than 0.05% of the haze in consideration of materials used currently.

In addition, the surface resistance value is preferably within a range of from $1\times10^5$ $\Omega/cm^2$ to $1\times10^{12}$ $\Omega/cm^2$. Meanwhile, in the case where an anti-reflection film having lower than $1\times10^5$ $\Omega/cm^2$ of the surface resistance value on the surface of the anti-reflection film is prepared, it requires a large amount of a quaternary ammonium salt material, or a metal oxide particle or a conductive polymer, which is a conductive material, and thus the localized layer of the present invention may not be formed. Furthermore, transparency (total light transmittance value) may decrease. In the case where the surface resistance value on the surface of the anti-reflection film is $1\times10^{10}$ $\Omega/cm^2$ to $1\times10^{12}$ $\Omega/cm^2$, it is generally called a region having no adhesion of dust in the dynamic state, and this condition is required when used in the outermost surface of a display. Therefore, the surface resistance value is preferably $1\times10^{12}$ $\Omega/cm^2$ or less in the present invention.

Meanwhile, as a method of measuring the surface resistance value, the surface resistance value may be measured in compliance with JIS-K6911 (1995).

In addition, the pure water contact angle is preferably within a range of from 80° to 130° in the anti-reflection film of the present invention. The pure water contact angle arranged to 80° or more makes it possible to give excellent antifouling property to the low refractive index layer. In addition, the pure water contact angle arranged to within a range of 130° or less, makes it possible to give high surface hardness since the adhesion between the localized layer and the low refractive index layer improves when the low refractive index layer is formed, and makes it possible to give an anti-reflection film having excellent abrasion resistance and excellent antifouling property.

Meanwhile, in the case where the pure water contact angle is more than 130°, there is a concern that crawling occurs when the low refractive index layer is formed, and the low refractive index layer is not formed. In addition, in the case where pure water contact angle is less than 80°, sufficient antifouling property may not be obtained.

Meanwhile, as a method of measuring the pure water contact angle, the pure water contact angle may be measured in compliance with JIS R3257 (1999). Specifically, droplets are created on a needle tip at the dry state (20° C., 65% RH) using a contact angle meter, and they are contacted on the surface of the sample (solid), whereby to create droplets, and the contact angle can be measured, whereby to calculate the contact angle. The contact angle refers to an angle between the tangential line to the liquid surface and the solid surface at the contact point of the solid and the liquid, and is defined as angular degree at the liquid-containing side. As the liquid, distilled water is used.

In addition, the leveling material contained in the leveling layer in the anti-reflection film of the present invention is preferably selected from a compound having an amide group, a compound having an acrylic group, a compound having a butadiene group and a compound having an olefin group. Meanwhile, specific examples of the leveling material selected from a compound having an amide group, a compound having an acrylic group, a compound having a butadiene group and a compound having an olefin group will be described later.

In addition, the conductive material contained in the conductive layer in the anti-reflection film of the present invention is preferably selected from a quaternary ammonium salt material, a metal oxide particle and a conductive polymer. Meanwhile, specific examples of the conductive material selected from a quaternary ammonium salt material, a metal oxide particle and a conductive polymer will be described later.

In addition, when the conductive material contained in the conductive layer contains a quaternary ammonium salt material, and the leveling material contained in the leveling layer contains a compound having an amide group in the anti-reflection film of the present invention, the molecular weight of the quaternary ammonium salt material (Q) is preferably 1,000 or more and 100,000 or less, and the molecular weight of the compound having an amide group (A) is preferably 100,000 or less. The molecular weight of the quaternary ammonium salt material (Q) and the molecular weight of the compound having an amide group (A) within the predetermined ranges make it possible to form a localized layer in which an intermediate layer, a hard coat layer, an antistatic layer and a leveling layer are laminated as localized in order from the side of the transparent base.

In the case where the molecular weight of the quaternary ammonium salt material (Q) used in the localized layer is lower than 1,000, the quaternary ammonium salt material becomes easily localized onto the surface of the localized layer, and the leveling layer is not formed, and the quaternary ammonium salt material is present on the surface of the localized layer. At this time, the low refractive index layer-forming material and the quaternary ammonium salt material are electrically repulsive to each other, and the adhesion force between the localized layer and the low refractive index layer is reduced, and thus the abrasion resistance of the resulting anti-reflection film is reduced. On the other hand, in the case where the molecular weight of the quaternary ammonium salt material (Q) is more than 100,000, it becomes difficult to form the antistatic layer by localizing the quaternary ammonium salt material. In addition, in the case where the molecular weight of the compound having an amide group (A) is more than 100,000, the conductive material and the leveling material are mixed to form a layer, and the antistatic layer and/or the leveling layer becomes not to be formed.

In addition, when the conductive material contained in the conductive layer contains metal oxide particles, and the leveling material contained in the leveling layer contains a compound having an amide group in the anti-reflection film of the present invention, the average particle size of the metal oxide particle is preferably 500 nm or less, and the molecular weight of the compound having an amide group (A) is preferably 100,000 or less. The average particle size of the metal oxide particle and the molecular weight of the compound having an amide group (A) within the predetermined ranges make it possible to form a localized layer in which an intermediate layer, a hard coat layer, an antistatic layer and a leveling layer are laminated as localized in order from the side of the transparent base.

In the case where the average particle size of the metal oxide particle is more than 500 nm, the metal oxide particle becomes easily localized onto the surface of the localized layer, and the metal oxide particle is present on the surface of the localized layer. At this time, the low refractive index layer-forming material and the quaternary ammonium salt material are electrically repulsive to each other, and the adhesion force between the localized layer and the low refractive index layer is reduced, and thus the abrasion resistance of the resulting anti-reflection film is reduced. In addition, in the case where the molecular weight of the compound having an amide group (A) is more than 100,000, the conductive material and the leveling material are mixed to form a layer, and the antistatic layer and/or the leveling layer becomes not to be formed.

In addition, when the conductive material contained in the conductive layer contains a conductive polymer, and the leveling material contained in the leveling layer contains a compound having an amide group in the anti-reflection film of the present invention, the average particle size of the conductive polymer is preferably 1,000 nm or less, and the molecular weight of the compound having an amide group (A) is preferably 100,000 or less. The average particle size of the conductive polymer and the molecular weight of the compound having an amide group (A) within the predetermined ranges make it possible to form a localized layer in which an intermediate layer, a hard coat layer, an antistatic layer and a leveling layer are laminated as localized in order from the side of the transparent base.

In the case where the average particle size of the conductive polymer is more than 500 nm, the conductive polymer becomes easily localized onto the surface of the localized layer, and the metal oxide particle is present on the surface of the localized layer. At this time, the low refractive index layer-forming material and the conductive polymer are electrically repulsive to each other, and the adhesion force between the localized layer and the low refractive index layer is reduced, and thus the abrasion resistance of the resulting anti-reflection film is reduced. In addition, in the case where the molecular weight of the compound having an amide group (A) is more than 100,000, the conductive material and the leveling material are mixed to form a layer, and the antistatic layer and/or the leveling layer becomes not to be formed.

In addition, when the conductive material contained in the conductive layer contains a quaternary ammonium salt material, and the leveling material contained in the leveling layer contains a compound having an acrylic group in the anti-reflection film of the present invention, the molecular weight of the quaternary ammonium salt material (Q) is preferably 1,000 or more and 100,000 or less, and the molecular weight of the compound having an acrylic group (B) is preferably 100,000 or less. The molecular weight of the quaternary ammonium salt material (Q) and the molecular weight of the compound having an acrylic group (B) within the predetermined ranges make it possible to form a localized layer in which an intermediate layer, a hard coat layer, an antistatic layer and a leveling layer are laminated as localized in order from the side of the transparent base.

In the case where the molecular weight of the quaternary ammonium salt material (Q) used in the localized layer is lower than 1,000, the quaternary ammonium salt material becomes easily localized onto the surface of the localized layer, and the leveling layer is not formed, and the quaternary ammonium salt material is present on the surface of the localized layer. At this time, the low refractive index layer-forming material and the quaternary ammonium salt material are electrically repulsive to each other, and the adhesion force between the localized layer and the low refractive index layer is reduced, and thus the abrasion resistance of the resulting anti-reflection film is reduced. On the other hand, in the case where the molecular weight of the quaternary ammonium salt material (Q) is more than 100,000, it becomes difficult to form the antistatic layer by localizing the quaternary ammonium salt material. In addition, in the case where the molecular weight of the compound having an acrylic group (B) is more than 100,000, the conductive material and the leveling material are mixed to form a layer in the outermost layer, and the antistatic layer and/or the leveling layer becomes not to be formed.

In addition, when the conductive material contained in the conductive layer contains metal oxide particles, and the leveling material contained in the leveling layer contains a compound having an acrylic group in the anti-reflection film of the present invention, the average particle size of the metal oxide particle is preferably 500 nm or less, and the molecular weight of the compound having an acrylic group (B) is preferably 100,000 or less. The average particle size of the metal oxide particle and the molecular weight of the compound having an acrylic group (B) within the predetermined ranges make it possible to form a localized layer in which an intermediate layer, a hard coat layer, an antistatic layer and a leveling layer are laminated as localized in order from the side of the transparent base.

In the case where the average particle size of the metal oxide particle is more than 500 nm, the metal oxide particle becomes easily localized onto the surface of the localized layer, and the metal oxide particle is present on the surface of the localized layer. Accordingly, the leveling layer is not formed in the outermost layer, the low refractive index layer-forming material and a metal oxide particle are electrically repulsive to each other, and the abrasion resistance of the resulting anti-reflection film is reduced. Furthermore, the haze of the resulting anti-reflection film increases. In addition, in the case where the molecular weight of the compound having an acrylic group (B) is more than 100,000, the conductive material and the leveling material are mixed to form a layer, and the antistatic layer and/or the leveling layer becomes not to be formed.

In addition, when the conductive material contained in the conductive layer contains a conductive polymer, and the leveling material contained in the leveling layer contains a compound having an acrylic group in the anti-reflection film of the present invention, the average particle size of the conductive polymer is preferably 1,000 nm or less, and the molecular weight of the compound having an acrylic group (B) is preferably within a range of 100,000 or less. The average particle size of the conductive polymer and the molecular weight of the compound having an acrylic group (B) within the predetermined ranges make it possible to form a localized layer in which an intermediate layer, a hard coat layer, an antistatic layer and a leveling layer are laminated as localized in order from the side of the transparent base.

In the case where the average particle size of the conductive polymer is more than 500 nm, the conductive polymer becomes easily localized onto the surface of the localized layer, and the metal oxide particle is present on the surface of the localized layer. At this time, the low refractive index layer-forming material and the conductive polymer are electrically repulsive to each other, and the adhesion force between the localized layer and the low refractive index layer is reduced, and thus the abrasion resistance of the resulting anti-reflection film is reduced. In addition, in the case where the molecular weight of the compound having an acrylic group (B) is more than 100,000, the conductive material and the leveling material are mixed to form a layer, and the antistatic layer and/or the leveling layer becomes not to be formed.

In addition, when the conductive material contained in the conductive layer contains a quaternary ammonium salt material, and the leveling material contained in the leveling layer contains a compound having a butadiene group in the anti-reflection film of the present invention, the molecular weight of the quaternary ammonium salt material (Q) is preferably within a range of from 1,000 to 100,000, and the molecular weight of the compound having a butadiene group that is the leveling material (C) is preferably 100,000 or less. The molecular weight of the quaternary ammonium salt material (Q) and the molecular weight of the compound having a butadiene group (C) within the predetermined ranges make it possible to form a localized layer in which an intermediate layer, a hard coat layer, an antistatic layer and a leveling layer are laminated as localized in order from the side of the transparent base.

In the case where the molecular weight of the quaternary ammonium salt material (Q) used in the localized layer is lower than 1,000, the quaternary ammonium salt material becomes easily localized onto the surface of the localized layer, and the leveling layer is not formed, and the quaternary ammonium salt material is present on the surface of the localized layer. At this time, the low refractive index layer-forming material and the quaternary ammonium salt material are electrically repulsive to each other, and the adhesion force between the localized layer and the low refractive index layer is reduced, and thus the abrasion resistance of the resulting anti-reflection film is reduced. On the other hand, in the case where the molecular weight of the quaternary ammonium salt material (Q) is more than 100,000, it becomes difficult to form the antistatic layer by localizing the quaternary ammonium salt material, and sufficient antistatic performance of the resulting anti-reflection film cannot be obtained. In addition, in the case where the molecular weight of the compound having a butadiene group (C) is more than 100,000, the quaternary ammonium salt material and the leveling material are mixed to form a layer, and the antistatic layer and/or the leveling layer becomes not to be formed.

In addition, when the conductive material contained in the conductive layer contains metal oxide particles, and the leveling material contained in the leveling layer contains a compound having a butadiene group in the anti-reflection film of the present invention, the average particle size of the metal oxide particle is preferably 500 nm or less, and the molecular weight of the compound having a butadiene group (C) is preferably 100,000 or less. The average particle size of the metal oxide particle and the molecular weight of the compound having a butadiene group (C) within the predetermined ranges make it possible to form a localized layer in which an intermediate layer, a hard coat layer, an antistatic layer and a leveling layer are laminated as localized in order from the side of the transparent base.

In the case where the average particle size of the metal oxide particle is more than 500 nm, the metal oxide particle becomes easily localized onto the surface of the localized layer, and the metal oxide particle is present on the surface of the localized layer. Accordingly, the leveling layer is not formed in the outermost layer, the low refractive index layer-forming material and a metal oxide particle are electrically repulsive to each other, and the abrasion resistance of the resulting anti-reflection film is reduced. Furthermore, the haze of the resulting anti-reflection film increases. In addition, in the case where the molecular weight of the compound having a butadiene group (C) is more than 100,000, the conductive material and the leveling material are mixed to form a layer, and the antistatic layer and/or the leveling layer is not formed, and thus it becomes not possible to an anti-reflection film having sufficient antistatic performance.

In addition, in the anti-reflection film of the present invention, it is preferable that the conductive material contained in the conductive layer contains a conductive polymer, and the leveling material contained in the leveling layer contains a compound having a butadiene group, and the average particle size of the conductive polymer is 1,000 nm or less, and the molecular weight of the compound having a butadiene group (C) is within a range of 100,000 or less. The average particle size of the conductive polymer and the molecular weight of the compound having a butadiene group (C) within the predetermined ranges make it possible to form a localized layer in which an intermediate layer, a hard coat layer, an antistatic layer and a leveling layer are laminated as localized in order from the side of the transparent base.

In the case where the average particle size of the conductive polymer is more than 500 nm, the conductive polymer becomes easily localized onto the surface of the localized layer, and the metal oxide particle is present on the surface of the localized layer. At this time, the low refractive index layer-forming material and the conductive polymer are electrically repulsive to each other, and the adhesion force between the localized layer and the low refractive index layer is reduced, and thus the abrasion resistance of the resulting anti-reflection film is reduced. In addition, in the case where the molecular weight of the compound having a butadiene group (C) is more than 100,000, the conductive material and the leveling material are mixed to form a layer, and the antistatic layer and/or the leveling layer becomes not to be formed.

In addition, when the conductive material contained in the conductive layer contains a quaternary ammonium salt material, and the leveling material contained in the leveling layer contains a compound having an olefin group in the anti-reflection film of the present invention, it is preferable that the molecular weight of the quaternary ammonium salt material (Q) is 1,000 or more and 100,000 or less, and the value of the molecular weight of the compound having an olefin group that is the leveling material (D) divided by the molecular weight of the quaternary ammonium salt material (Q) (D/Q) is 0.5 or less. The molecular weight of the quaternary ammonium salt material (Q) and the molecular weight of the compound having an olefin group (D) within the predetermined ranges make it possible to form a localized layer in which an intermediate layer, a hard coat layer, an antistatic layer and a leveling layer are laminated as localized in order from the side of the transparent base.

In the case where the molecular weight of the quaternary ammonium salt material (Q) used in the localized layer is lower than 1,000, the quaternary ammonium salt material becomes easily localized onto the surface of the localized layer, and the leveling layer is not formed, and the quaternary ammonium salt material is present on the surface of the localized layer. At this time, the low refractive index layer-forming material and the quaternary ammonium salt material are electrically repulsive to each other, and the adhesion force between the localized layer and the low refractive index layer is reduced, and thus the abrasion resistance of the resulting anti-reflection film is reduced. On the other hand, in the case where the molecular weight of the quaternary ammonium salt material (Q) is more than 100,000, it becomes difficult to form the antistatic layer by localizing the quaternary ammonium salt material, and sufficient antistatic performance of the resulting anti-reflection film cannot be obtained. In addition, in the case where the molecular weight of the compound having an olefin group (D) is more than 100,000, the quaternary ammonium salt material and the leveling material are mixed to form a layer, and the antistatic layer and/or the leveling layer becomes not to be formed.

In addition, when the conductive material contained in the conductive layer contains metal oxide particles, and the leveling material contained in the leveling layer contains a compound having an olefin group in the anti-reflection film of the present invention, the average particle size of the metal oxide particle is 500 nm or less, and the molecular weight of the compound having an olefin group (D) is preferably 100,000 or less. The average particle size of the metal oxide particle and the molecular weight of the compound having an olefin group (D) within the predetermined ranges make it possible to form a localized layer in which an intermediate layer, a hard coat layer, an antistatic layer and a leveling layer are laminated as localized in order from the side of the transparent base.

In the case where the average particle size of the metal oxide particle is more than 500 nm, the metal oxide particle becomes easily localized onto the surface of the localized layer, and the metal oxide particle is present on the surface of the localized layer. Accordingly, the leveling layer is not formed in the outermost layer, the low refractive index layer-forming material and a metal oxide particle are electrically repulsive to each other, and the abrasion resistance of the resulting anti-reflection film is reduced. Furthermore, the haze of the resulting anti-reflection film increases. In addition, in the case where the molecular weight of the compound having an olefin group (D) is more than 100,000, the conductive material and the leveling material are mixed to form a layer, and the antistatic layer and/or the leveling layer becomes not to be formed.

In addition, when the conductive material contained in the conductive layer contains a conductive polymer, and the leveling material contained in the leveling layer contains a compound having an olefin group in the anti-reflection film of the present invention, it is preferable that the average particle size of the conductive polymer is 1,000 nm or less, and the molecular weight of the compound having an olefin group (D) is 100,000 or less. The average particle size of the conductive polymer and the molecular weight of the compound having an olefin group (D) within the predetermined ranges make it possible to form a localized layer in which an intermediate layer, a hard coat layer, an antistatic layer and a leveling layer are laminated as localized in order from the side of the transparent base.

In the case where the average particle size of the conductive polymer is more than 500 nm, the conductive polymer becomes easily localized onto the surface of the localized layer, and the metal oxide particle is present on the surface of the localized layer. At this time, the low refractive index layer-forming material and the conductive polymer are electrically repulsive to each other, and the adhesion force between the localized layer and the low refractive index layer is reduced, and thus the abrasion resistance of the resulting anti-reflection film is reduced. In addition, in the case where the molecular weight of the compound having a butadiene group (D) is more than 100,000, the conductive material and the leveling material are mixed to form a layer, and the antistatic layer and/or the leveling layer becomes not to be formed.

Meanwhile, the "molecular weight" in the present invention refers to a molecular weight calculated from the structural formula when the molecular weight is 1,000 or less, or a weight average molecular weight when the molecular weight is 1,000 or more.

Meanwhile, the molecular weight of the compound having an amide group (A) used as the leveling material in the anti-reflection film of the present invention is preferably 100,000 or less, but the molecular weight of the compound having an amide group (A) is preferably 40 or more and 100,000 or less in consideration of the molecular weights of commercially available compounds having an amide group.

Meanwhile, the molecular weight of the compound having an acrylic group (B) used as the leveling material in the anti-reflection film of the present invention is preferably 100,000 or less, but the molecular weight of the compound having an acrylic group (B) is preferably 1,000 or more and 100,000 or less in consideration of the molecular weights of commercially available compounds having an acrylic group.

Meanwhile, the molecular weight of the compound having a butadiene group (C) used as the leveling material in the anti-reflection film of the present invention is preferably 100,000 or less, but the molecular weight of the compound having a butadiene group (C) is preferably 1,000 or more and 100,000 or less in consideration of the molecular weights of commercially available compounds having a butadiene group.

Meanwhile, the molecular weight of the compound having an olefin group (D) used as the leveling material in the anti-reflection film of the present invention is preferably 100,000 or less, but the molecular weight of the compound having an olefin group (D) is preferably 1,000 or more and 100,000 or less in consideration of the molecular weights of commercially available compounds having an olefin group.

Meanwhile, in the present invention, the average particle size of the metal oxide particle and the average particle size of the conductive polymer are calculated from light scattering method.

Meanwhile, the average particle size of the metal oxide particle used as the conductive material in the anti-reflection film of the present invention is preferably 500 nm or less, but the average particle size of the metal oxide particle is preferably 1 nm or more and 500 nm or less in consideration of the average particle size of commercially available metal oxide particles.

Meanwhile, the average particle size of the conductive polymer used as the conductive material in the anti-reflection film of the present invention is preferably 500 nm or less, but the average particle size of the conductive polymer is preferably 1 nm or more and 500 nm or less in consideration of the average particle size of commercially available metal oxide particles.

In addition, the optical film thickness of the low refractive index layer in the anti-reflection film of the present invention is preferably within a range of from 80 nm to 200 nm. The optical film thickness of the low refractive index layer arranged within a range of from 80 nm to 200 nm makes it possible to render the spectral reflectivity curve calculated from the side of the surface (A) of the anti-reflection film, to a spectral reflectivity curve having the minimum value at about 500 nm, and to give an anti-reflection film excellent in anti-reflection.

The spectral reflectivity curve shows a tendency that the increase curve toward the short wavelength direction is steeper in comparison with the increase curve toward the long wavelength direction on the basis of the minimum value. At this time, the increase curve that is steeper toward the short wavelength direction on the basis of the minimum value of the spectral reflectivity curve, is responsible for the color shade of the reflection light of the formed anti-reflection film, and is responsible for occurrence of color variation when variation of film thickness of the localized layer occurs. In the present invention, the minimum value of the spectral reflectivity curve at about 500 nm makes it possible to give small reflection hue, and suppress occurrence of color variation by the increase curve steeper toward the short wavelength direction.

In addition, in the anti-reflection film of the present invention, the luminous average reflectivity on the low refractive index layer-forming surface (surface (A)) of the anti-reflection film is preferably within a range of from 0.5% to 2.0%.

In the case where the luminous average reflectivity at the low refractive index layer-forming surface (surface (A)) of the anti-reflection film is more than 2.5%, it is not possible to give an anti-reflection film having sufficient anti-reflection performance. On the other hand, it is difficult to implement an anti-reflection film having 0.2% of the luminous average reflectivity at the anti-reflection film surface by the optical interference of the localized layer. Meanwhile, the luminous average reflectivity at the surface of the localized layer is further preferably within a range of from 0.2% to 2.0%.

In addition, in the case where a quaternary ammonium salt material is used as the conductive material in the localized layer in the anti-reflection film of the present invention, the content of the quaternary ammonium salt material, which is a conductive material in the localized layer, is preferably 0.5 wt % or more and less than 25 wt %. In the case where the content of the quaternary ammonium salt material, which is a conductive material, is less than 0.5 wt %, sufficient antistatic performance may not be obtained. On the other hand, in the case where the content of the quaternary ammonium salt material, which is a conductive material in the localized layer, is more than 25 wt %, the leveling layer is not formed well. In addition, the quaternary ammonium salt material, which is a conductive material, has no hard coating property, and thus the hardness and the abrasion resistance of the anti-reflection film may decrease. In addition, the cost increases.

In addition, in the case where a metal oxide particle is used as the conductive material in the localized layer in the anti-reflection film of the present invention, the content of the metal oxide particle, which is a conductive material in the localized layer, is preferably 0.5 wt % or more and less than 25 wt %. In the case where the content of the metal oxide particle, which is a conductive material in the localized layer, is less than 0.5 wt %, sufficient antistatic performance may not be obtained. On the other hand, in the case where the content of the metal oxide particle, which is a conductive material, is more than 25 wt %, the leveling layer is not formed well.

In addition, in the case where a conductive polymer is used as the conductive material in the localized layer in the anti-reflection film of the present invention, the content of the conductive polymer, which is a conductive material in the localized layer, is preferably 0.1 wt % or more and less than 25 wt %. In the case where the content of the conductive polymer, which is a conductive material in the localized layer, is less than 0.1 wt %, sufficient antistatic performance may not be obtained. On the other hand, in the case where the content of the conductive polymer, which is a conductive material, is more than 25 wt %, the leveling layer is not formed well. In addition, the conductive polymer, which is a conductive material, has no hard coating property, and thus the hardness and the abrasion resistance of the anti-reflection film may decrease. In addition, the cost increases.

In addition, in the case where a compound having an amide group is used as a leveling material, the content of the compound having an amide group, which is a leveling material in the localized layer, is preferably within a range of 0.05 wt % or more and less than 25 wt %. In the case where the content of the compound having an amide group in the localized layer is less than 0.05 wt %, the leveling layer cannot be formed, and the conductive material becomes present on the outermost surface of the localized layer, and thus the abrasion resistance is reduced, and further formation of the low refractive index layer may be inhibited. On the other hand, in the case where the content of the compound having an amide group is more than 25 wt %, the amide layer becomes thick, and the antistatic function may decrease.

In addition, in the case where another compound than the compound having an amide group such as a compound having an acrylic group, a compound having a butadiene group and a compound having an olefin group is used as a leveling material, the content of the leveling material in the localized layer is preferably within a range of 0.001 wt % or more and less than 5.00 wt %. In the case where the content of the leveling material in the localized layer is less than 0.001 wt %, the leveling layer cannot be formed, and the conductive material becomes present on the outermost surface of the localized layer, and thus abrasion resistance is reduced, and further formation of the low refractive index layer may be inhibited. On the other hand, in the case where the content of the leveling material is more than 5.00 wt %, the amide layer becomes thick, and the antistatic function may decrease.

The method of producing the anti-reflection film of the present invention will be explained.

The method of producing the anti-reflection film of the present invention is a method of producing an anti-reflection film in which a localized layer and a low refractive index layer are laminated in this order on at least one surface of a transparent base, which comprises in order, coating process in which a coating liquid for forming a localized layer containing an ionization radiation curable material, a conductive material, a leveling material and a solvent, is coated on at least one surface of the transparent base, to form a coating film of the localized layer; drying process in which the coating film of the localized layer is subjected to primary drying and secondary drying; film-hardening process in which the coating film of the localized layer is irradiated with ionization radiation, to form a localized layer; coating process in which a coating liquid for forming a low refractive index layer containing the low refractive index layer-forming material and a solvent is coated, to form a coating film of the low refractive index layer; drying process in which the coating film of the low refractive index layer is dried; and film-hardening process in which the low refractive index layer is formed, which is characterized that the localized layer is constituted to have an intermediate layer, a hard coat layer, an antistatic layer and a leveling layer that are laminated as localized in order.

By arranging the drying process in which primary drying is conducted for the coating film of the localized layer, and the drying process in which the primary drying is conducted for the coating film of the localized layer after the drying process of the primary drying in the present invention, it is possible to localize an intermediate layer, a hard coat layer, an antistatic layer in which the conductive material is localized, and a leveling layer in which the leveling material is localized, in order in the localized layer.

Figure 2:
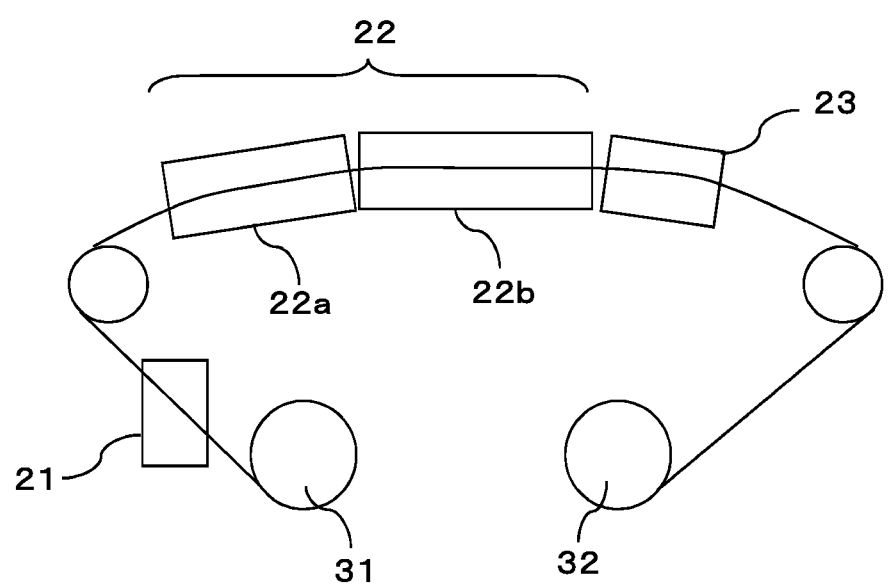
FIG. 2 is a schematic view illustrating an example of the method of producing the anti-reflection film of the present invention.

FIG. 2 illustrates a schematic view of one example of the apparatus for producing the anti-reflection film of the present invention.

The apparatus for producing the anti-reflection film of the present invention has in order, a coating unit (21) for coating a coating liquid for forming a localized layer containing a binder matrix-forming material containing an ionization radiation curable material, a conductive material, a leveling material, and a solvent on a transparent base to form a coating film; two drying units (22) of a primary drying unit (22a), and a secondary drying unit (22b) for conducting secondary drying of the coating film of the localized layer; an ionization irradiation unit (23) for irradiating the coating film of the localized layer with ionization radiation, and film-hardening the localized layer. The transparent base is continuously conveyed from a reeling out section (31) to a rolling section (32), whereby to form the localized layer on the transparent base.

Next, the coating process in which the coating liquid for forming a low refractive index layer is coated onto the localized layer to form a coating film of the low refractive index layer, the drying process in which the coating film of the low refractive index layer is dried, and the film-hardening process in which the low refractive index layer is formed, are performed to form the low refractive index layer. At this time, in the case where an ionization radiation curable material is used as the low refractive index layer-forming material in the film-hardening process in which the low refractive index layer is formed, the ionization radiation curable material is film-hardened by irradiating ionization radiation to form the low refractive index layer. On the other hand, in the case where a thermoset material is used as the low refractive index layer-forming material, the thermoset material is film-hardened by heating to form the low refractive index layer. In forming the low refractive index layer, the production apparatus shown in FIG. 2 may be also used to form the low refractive index layer on the localized layer, whereby to produce the anti-reflection film. Meanwhile, formation of the localized layer and the process of forming the low refractive index layer may be also subsequently connected to produce the anti-reflection film.

In the method of producing the anti-reflection film of the present invention, 30 wt % or more of the total solvent contained in the coating liquid for forming a localized layer is a solvent that dissolves the transparent base or causes the transparent base to swell, and the solvent is preferably contained in a ratio of 25 wt % or more and 85 wt % or less in the coating liquid for forming a localized layer. By using the solvent that dissolves the transparent base or causes the transparent base to swell within a range of 30 wt % or more of the total solvent contained in the coating liquid for forming a localized layer containing a binder matrix-forming material, a conductive material, and a leveling material on the transparent base, and containing the solvent in a ratio of 25 wt % or more and 85 wt % or less in the coating liquid for forming a localized layer, it is possible to form a localized layer having a conductive material, and an antistatic layer in which the leveling material is localized, and a leveling layer.

The solvent that dissolves the transparent base or causes the transparent base to swell contained in the coating liquid penetrates the transparent base during the process up to the drying after coating the coating liquid for forming a localized layer on the transparent base to form the coating film, and accordingly the binder matrix-forming material component also penetrates the transparent base, and is mixed with the base whereby to form the intermediate layer. On the other hand, the conductive material and the leveling material hardly penetrate the transparent base, and thus are localized to the side of the antistatic layer and the leveling layer, which is the opposite to the side of the transparent base, whereby to form the localized layer.

By using the solvent that dissolves the transparent base or causes the transparent base to swell within a range of 30 wt % or more of the total solvent contained in the coating liquid for forming a localized layer, it is possible to form an intermediate layer composed of a transparent base component and a binder matrix component between the transparent base and the localized layer, and further effectively form the localized layer. Meanwhile, in the case where the solvent that dissolves the transparent base or causes the transparent base to swell is lower than 30 wt % of the total solvent, the localized layer may not be formed. The amount of the solvent in the coating liquid of the localized layer within the range, makes it possible to give sufficient time until a quaternary ammonium salt material, or a metal oxide particle or a conductive polymer, which is a conductive material in the coating film, and a leveling material, are localized, to form the localized layer, and makes it possible to easily produce the localized layer.

Meanwhile, in the case where the amount of the solvent in the coating liquid for forming a localized layer is less than 25 wt %, there is a concern that the coating film is rapidly dried and the localized layer is not formed. On the other hand, in the case where the amount of the solvent in the coating liquid for forming a localized layer is more than 85 wt %, the drying time needs to be prolonged and it tends to be unsuitable for large production.

In the method of producing the anti-reflection film of the present invention, the drying process in which the coating film of the localized layer is dried, preferably contains two-step continuous drying of primary drying, which is performed at a drying temperature within a range of 15° C. or more and 30° C. or less, and secondary drying, which is performed at a drying temperature within a range of 40° C. or more and 150° C. or less. In the drying process, the primary drying is preferably performed at a drying temperature within a range of 20° C. or more and 30° C. or less immediately after the coating. The primary drying temperature within a range of 20° C. or more and 30° C. or less, makes it possible to give sufficient time until a quaternary ammonium salt material, or a metal oxide particle or a conductive polymer, which is a conductive material in the coating film of the localized layer, and a leveling material are localized, to form the localized layer.

Meanwhile, in the case where the drying temperature is more than 30° C., there is a concern that the coating film of the localized layer is rapidly dried and the localized layer is not formed. On the other hand, in the case where the drying temperature is lower than 20° C., the drying time needs to be prolonged and it tends to be unsuitable for continuous production.

In addition, the secondary drying is preferably performed at a drying temperature within a range of 50° C. or more and 150° C. or less. The secondary drying temperature within a range of 50° C. or more and 150° C. or less, makes it possible to form a localized layer in which an intermediate layer, a hard coat layer, an antistatic layer, and a leveling layer are laminated as localized in order from the side of the transparent base. Meanwhile, in the case where the drying temperature is more than 150° C., the evaporation rate of the solvent is too fast, and thus there is a concern that the surface of the localized layer becomes rough, and the haze occurs. On the other hand, in the case where the drying temperature is lower than 50° C., the solvent remains in the localized layer, and the localized layer becomes to have no hard coating property.

In addition, the drying may be insufficient with only the primary drying, and suitable heat drying with heat drying at a drying temperature within a range of 50° C. or more and 150° C. or less may be performed in combination as the secondary drying after the primary drying. By performing the primary drying and the secondary drying at the drying temperatures in the drying process, it is possible to easily produce the localized layer (12).

In addition, in order to perform isolation of each layer of the localized layer, the primary drying is performed, and the secondary drying is performed by suitable heat drying with heat drying within a range of 50° C. or more and 150° C. or less, whereby to remove the solvent.

Meanwhile, in the method of producing the anti-reflection film of the present invention, the drying process in which the coating film of the localized layer is dried, is preferably performed such that the time for the solvent contained in the coating film of the localized layer to become 10 wt % or less, is within a range of 2 seconds or more and 60 seconds or less.

The fact that the time for the solvent contained in the coating film composed of the coating liquid for forming a localized layer on the transparent base to become 10 wt % or less after formation of the coating film of the localized layer on the transparent base, is within a range of 2 seconds or more and 60 seconds or less, makes it possible to give sufficient time until the conductive material and the leveling material in the coating film are localized, to form a localized layer, and makes it possible to easily form a localized layer having an antistatic layer and an leveling layer.

In addition, in the case where the time until the solvent contained in the coating film of the localized layer becomes 10 wt % or less, is less than 2 seconds, the coating film of the localized layer is rapidly dried, and accordingly, the antistatic layer and the leveling layer may not be formed. Meanwhile, in the case where the time until the solvent contained in the coating film of the localized layer becomes 10 wt % or less, is more than 60 seconds, the time is too much taken, and thus is not practical. Further in the case where the localized layer is formed in a sheet form, taken time becomes long, and the productivity decreases, which is undesirable.

Furthermore, the anti-reflection film of the present invention and a method of producing the anti-reflection film will be explained specifically.

As the transparent base used in the anti-reflection film of the present invention, a film or a sheet composed of various organic polymers may be used. Examples of the transparent base include, for example, bases ordinarily used in an optical member such as a display, and used is those composed of organic polymers, e.g., polyolefins such as polyethylene and polypropylene, polyesters such as polyethylene terephthalate and polyethylene naphthalate, celluloses such as triacetyl cellulose, diacetyl cellulose, and cellophane, polyamides such as 6-nylon and 6,6-nylon, acryls such as polymethyl methacrylate, polystyrene, polyvinyl chloride, polyimide, polyvinyl alcohol, polycarbonate, or ethylene vinyl alcohol in consideration of various physical properties, e.g., optical properties such as transparency and light refractive index, and further impact resistance, heat resistance, and durability. Particularly, the transparent base is preferably polyethylene terephthalate, triacetyl cellulose, polycarbonate, or polymethyl methacrylate. Among them, triacetyl cellulose may be used suitably for a liquid crystal display since it has small double refractive index and good transparency.

Meanwhile, the thickness of the transparent base is preferably within a range of 25 μm or more and 200 μm or less, and further preferably within a range of 40 μm or more and 80 μm or less.

Furthermore, known additives, for example, an ultraviolet absorbing agent, an infrared absorbing agent, a plasticizer, a lubricant, a colorant, an antioxidant, a fire-retardant, and the like may be added to such organic polymer, whereby to use those added with such functions. In addition, as the transparent base, one kind or a mixture of 2 or more kinds selected from the organic polymers, or those composed of the polymers may be used, or those of multiple layers laminated may be used.

Next, the localized layer will be explained.

In forming the localized layer, an ionization radiation curable material is contained as a binder matrix-forming material. As the ionization radiation curable material, an acrylic-based material may be used. As the acrylic-based material, mono-functional or multi-functional (meth)acrylate compounds such as polyhydric alcohol acrylic acid or methacrylic acid ester, multi-functional urethane (meth)acrylate compounds such as those synthesized from hydroxyester of diisocyanate and polyhydric alcohol and acrylic acid or methacrylic acid may be used. In addition, besides these, as the ionization radiation type material, a polyether resin, a polyester resin, an epoxy resin, an alkyd resin, a spiroacetal resin, a polybutadiene resin, a polythiol polyene resin, and the like, which have an acrylate-based functional group, may be used.

Meanwhile, "(meth)acrylate" in the present invention represents both of "acrylate" and "methacrylate". For example, "urethane (meth)acrylate" represents both of "urethane acrylate" and "urethane methacrylate".

Examples of the mono-functional (meth)acrylate compound include, for example, 2-hydroxyethyl (meth)acrylate, 2-hydroxypropyl (meth)acrylate, 2-hydroxybutyl (meth) acrylate, n-butyl (meth)acrylate, isobutyl (meth)acrylate, t-butyl (meth)acrylate, glycidyl (meth)acrylate, acryloyl morpholine, N-vinyl pyrrolidone, tetrahydrofurfuryl acrylate, cyclohexyl (meth)acrylate, 2-ethylhexyl (meth)acrylate, isobornyl (meth)acrylate, isodecyl (meth)acrylate, lauryl (meth)acrylate, tridecyl (meth)acrylate, cetyl (meth)acrylate, stearyl (meth)acrylate, benzyl (meth)acrylate, 2-ethoxyethyl (meth)acrylate, 3-methoxybutyl (meth)acrylate, ethylcarbitol (meth)acrylate, phosphoric acid (meth)acrylate, ethylene oxide-modified phosphoric acid (meth)acrylate, phenoxy (meth)acrylate, ethylene oxide-modified phenoxy (meth) acrylate, propylene oxide-modified phenoxy (meth)acrylate, nonyl phenol (meth)acrylate, ethylene oxide-modified nonyl phenol (meth)acrylate, propylene oxide-modified nonyl phenol (meth)acrylate, methoxy diethylene glycol (meth)acrylate, methoxy polyethylene glycol (meth)acrylate, methoxypropylene glycol (meth)acrylate, 2-(meth)acryloyloxyethyl-2-hydroxypropylphthalate, 2-hydroxy-3-phenoxy propyl (meth)acrylate, 2-(meth)acryloyloxyethyl hydrogen phthalate, 2-(meth)acryloyloxypropyl hydrogen phthalate, 2-(meth)acryloyloxypropyl hexahydrohydrogen phthalate, 2-(meth)acryloyloxypropyl tetrahydrohydrogen phthalate, dimethylaminoethyl (meth)acrylate, trifluoroethyl (meth)acrylate, tetrafluoropropyl (meth)acrylate, hexafluoropropyl (meth)acrylate, octafluoropropyl (meth)acrylate, octafluoropropyl (meth)acrylate, 2-adamantane, and adamantane derivative mono(meth)acrylate such as adamantyl acrylate having monovalent mono(meth)acrylate derived from adamantanediol.

Examples of the di-functional (meth)acrylate compound include, for example, di (meth)acrylates such as ethylene glycol di(meth)acrylate, diethylene glycol di(meth)acrylate, butanediol di(meth)acrylate, hexanediol di(meth)acrylate, nonanediol di(meth)acrylate, ethoxylated hexanediol di(meth)acrylate, propoxylated hexanediol di(meth)acrylate, diethylene glycol di(meth)acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth)acrylate, tripropylene glycol di(meth)acrylate, and hydroxypivalic acid neopentyl glycol di(meth)acrylate and the like.

Examples of the tri- or higher-functional (meth)acrylate compound include, for example, tri(meth)acrylates such as trimethylol propane tri(meth)acrylate, ethoxylated trimethylol propane tri(meth)acrylate, propoxylated trimethylol propane tri(meth)acrylate, tris 2-hydroxyethylisocyanurate tri(meth)acrylate, and glycerin tri(meth)acrylate; tri-functional (meth)acrylate compounds such as pentaerythritol tri(meth)acrylate, dipentaerythritol tri(meth)acrylate, and ditrimethylol propane tri(meth)acrylate; tri-functional or higher-functional (meth)acrylate compounds such as pentaerythritol tetra(meth)acrylate, ditrimethylol propane tetra(meth)acrylate, dipentaerythritol tetra(meth)acrylate, dipentaerythritol penta(meth)acrylate, ditrimethylol propane penta(meth)acrylate, dipentaerythritol hexa(meth)acrylate, and ditrimethylol propane hexa(meth)acrylate; multi-functional (meth)acrylate compounds obtained by replacing some of these (meth)acrylates with an alkyl group or ε-caprolactone; and the like.

As the acrylic-based materials, multi-functional urethane acrylate may be also used. The urethane acrylate is obtained by reacting polyhydric alcohol, polyhydric isocyanate and acrylate containing a hydroxy group. Specifically, examples of the urethane acrylate include but are not limited to, UA-306H, UA-306T, UA-3061 and the like, which are manufactured by KYOEISHA CHEMICAL Co., LTD.; UV-1700B, UV-6300B, UV-7600B, UV-7605B, UV-7640B, UV-7650B, and the like, which are manufactured by The Nippon Synthetic Chemical Industry Co., Ltd.; U-4HA, U-6HA, UA-100H, U-6LPA, U-15HA, UA-32P, U-324A, and the like, which are manufactured by Shin-Nakamura Chemical Co., Ltd.; Ebecryl-1290, Ebecryl-1290K, Ebecryl-5129, and the like, which are manufactured by Daicel-UCB Co., Ltd.; and UN-3220HA, UN-3220HB, UN-3220HC, UN-3220HS, and the like, which are manufactured by Negami Chemical Industrial Co., Ltd.

Besides these, as the ionization radiation type material, a polyether resin, a polyester resin, an epoxy resin, an alkyd resin, a spiroacetal resin, a polybutadiene resin, a polythiol polyene resin, and the like, which have an acrylate-based functional group, may be used.

In addition, the film thickness of the localized layer is preferably within a range of 3 μm or more and 20 μm or less in view of optical property, abrasion resistance, hardness and the like. In addition, the film thickness of the localized layer is further preferably within a range of 4 μm or more 7 μm or less in view of process and handling such as suppression of curling.

A solvent is added to the coating liquid for forming a localized layer, and the solvent used is a solvent that dissolves or causes the transparent base to swell, and is used within a range of 30 wt % or more of the total solvent.

In addition, by using the solvent that dissolves the transparent base or causes the transparent base to swell within a range of 30 wt % or more of the total solvent contained in a coating liquid for forming a localized layer containing a binder matrix-forming material and a quaternary ammonium salt material, and a leveling material on the transparent base, it is possible to form a localized layer in which the conductive material and the leveling material are localized.

By using the solvent that dissolves the transparent base or causes the transparent base to swell within a range of 30 wt % or more of the total solvent contained in the coating liquid for forming a localized layer, it is possible to form an intermediate layer composed of a transparent base component and a binder matrix component between the transparent base and the localized layer, and further to effectively form the localized layer.

Meanwhile, in the case where the solvent that dissolves the transparent base or causes the transparent base to swell is lower than 30 wt % of the total solvent, the localized layer may not be formed.

Examples of the solvent that dissolves the transparent base or causes the transparent base to swell when triacetyl cellulose film is used as the transparent base, include ethers such as dibutyl ether, dimethoxymethane, dimethoxyethane, diethoxyethane, propylene oxide, dioxane, dioxolane, trioxane, tetrahydrofuran, anisole, and phenetol; or some ketones such as acetone, methyl ethyl ketone, diethyl ketone, dipropyl ketone, diisobutyl ketone, cyclopentanone, cyclohexanone, methyl cyclohexanone, and methyl cyclohexanone; or esters such as ethyl formate, propyl formate, n-pentyl formate, methyl acetate, ethyl acetate, methyl propionate, ethyl propionate, n-pentyl acetate, and γ-butyrolactone; and further, cellosolves such as methyl cellosolve, cellosolve, butyl cellosolve, and cellosolve acetic acid; and in addition, N-methyl-2-pyrrolidone, and dimethyl carbonate. They may be used alone in one kind or in combination of 2 or more kinds.

Examples of a solvent that does not dissolve the triacetyl cellulose film or cause the triacetyl cellulose film to swell include alcohols such as ethanol, isopropyl alcohol, aromatic hydrocarbons such as toluene, xylene, cyclohexane, and cyclohexyl benzene, hydrocarbons such as n-hexane, some ketones such as methyl isobutyl ketone, methyl butyl ketone, and diacetone alcohol, and the like. They may be used alone in one kind or in combination of 2 or more kinds.

In addition, the solvent is preferably contained in a ratio of 25 wt % or more and 85 wt % or less in the coating liquid for forming a localized layer. The amount of the solvent within the range in the coating liquid of the localized layer, makes it possible to give sufficient time until a quaternary ammonium salt material or a metal oxide particle or a conductive polymer, which is a conductive material in the coating film, and the leveling material are localized, to form a localized layer, and makes it possible to easily produce the localized layer.

Meanwhile, in the case where the amount of the solvent in the coating liquid for forming a localized layer is less than 25 wt %, there is a concern that the coating film is rapidly dried and the localized layer is not formed. On the other hand, in the case where the amount of the solvent in the coating liquid for forming a localized layer is more than 85 wt %, the drying time needs to be prolonged and it is unsuitable for large production.

In addition, the process of drying the coating film of the localized layer is preferably performed under a solvent atmosphere of 0.2 vol % or more and 10 vol % or less of the solvent concentration. By performing the process of drying the coating film of the localized layer under the solvent atmosphere of 0.2 vol % or more and 10 vol % or less, it is possible to give sufficient time until the quaternary ammonium salt material, or the metal oxide particle or the conductive polymer, which is a conductive material in the coating film, is localized, to form a localized layer, and it is possible to easily produce the localized layer.

Meanwhile, as the solvent used in the dry atmosphere at this time, at least one kind among the solvents contained in the coating liquid for forming a localized layer is preferable. In the case where the solvent atmosphere is less than 0.2 vol %, the coating film is rapidly dried and the localized layer may not be formed. On the other hand, in the case where the solvent atmosphere is more than 10 vol %, the drying time needs to be prolonged and it is unsuitable for large production.

As the quaternary ammonium salt material, which is a conductive material contained in the localized layer, an acrylic-based material containing the quaternary ammonium salt material as a functional group in the molecule may be used suitably. The quaternary ammonium salt material is represented by a structure of —$N^+ X^-$, and expresses conductivity to a hard coat layer by having quaternary ammonium cation (—$N^+$) and anion ($X^-$). At this time, examples of $X^-$ include $Cl^-$, $Br^-$, $I^-$, $F^-$, $HSO_4^-$, $SO_4^{2-}$, $NO_3^-$, $PO_4^{2-}$, $HPO_4^-$, $H_2PO_4^-$, $SO_3^-$, $OH^-$, and the like.

In addition, as the quaternary ammonium salt material, an acrylic-based material containing the quaternary ammonium salt material as a functional group in the molecule may be also used. As the acrylic-based material containing the quaternary ammonium salt material as a functional group in the molecule, mono-functional or multi-functional (meth)acrylate compounds such as polyhydric alcohol acrylic acid or methacrylic acid ester containing a quaternary ammonium salt material (—$N^+ X^-$) as a functional group in the molecule, multi-functional urethane (meth)acrylate compounds such as those synthesized from hydroxyester of diisocyanate and polyhydric alcohol and acrylic acid or methacrylic acid and the like may be used. In addition, besides these, as the ionization radiation type material, a polyether resin, a polyester resin, an epoxy resin, an alkyd resin, a spiroacetal resin, a polybutadiene resin, a polythiol polyene resin and the like, which have an acrylate-based functional group, may be used.

The molecular weight of the quaternary ammonium salt material contained in the localized layer of the present invention is preferably within a range of 1,000 or more and 100,000 or less. The weight average molecular weight of the quaternary ammonium salt material within a range of 1,000 or more and 100,000 or less, makes it possible to form a localized layer in which an intermediate layer, a hard coat layer, an antistatic layer, and a leveling layer are laminated as localized in order from the side of the transparent base.

In addition, in the case where the molecular weight of the quaternary ammonium salt material is lower than 1,000, the quaternary ammonium salt material becomes easily localized onto the surface of the localized layer, and the quaternary ammonium salt material is present on the surface of the localized layer. Accordingly, the low refractive index layer-forming material and the quaternary ammonium salt material are electrically repulsive to each other, adhesion of the localized layer and the low refractive index layer is reduced, and thus abrasion resistance may decrease. On the other hand, in the case where the weight average molecular weight of the quaternary ammonium salt material is more than 100,000, the hard coat layer and the antistatic layer are mixed, and surface resistance value becomes worse. As the quaternary ammonium salt material, specifically, NR-121X-9IPA (manufactured by COLCOAT CO., Ltd.) and the like may be used.

As the metal oxide particle used as the conductive material, a metal oxide particle having conductivity, which contains as a major component, one kind or 2 or more kinds of metal oxides selected from zirconium oxide, antimony-containing tin oxide (ATO), phosphorus-containing tin oxide (PTO), tin-containing indium oxide, aluminum oxide, cerium oxide, zinc oxide, aluminum-containing zinc oxide, tin oxide, antimony-containing zinc oxide, and indium-containing zinc oxide, may be used.

As the conductive polymer used as the conductive material, one kind or a mixture of 2 or more kinds selected from polyacethylene, polyaniline, polythiophene, polypyrrole, polypinylene sulfide, poly(1,6-heptadiyne), polybiphenylene (polyparaphenylene), polyparaphenylene sulfide, polyphenyl acethylene, poly(2,5-thienylene) and a derivative thereof may be used.

A compound having an amide group is added as a leveling material to the coating liquid for forming a localized layer, to form the leveling layer in the localized layer. As the compound having an amide group, a compound having one or more amide groups in one molecule may be used. Specifically, examples thereof include acrylic-based compounds such as acetoamide, (meth)acrylic amide, N-methylol (meth)acrylic amide, N,N-dimethyl(meth)acrylic amide, N,N-dibutyl(meth)acrylic amide, N,N-dioctyl(meth)acrylic amide, N-monobutyl(meth)acrylic amide, N-(2-hydroxyethyl)acrylic amide, N-(2-hydroxyethyl)methacrylic amide and (meth)acryloyl morpholine, N-vinyl formamide, N,N-diallyl formamide, N-vinyl pyrrolidone, N-vinyl-ϵ-caprolactam, polyamide and the like. Among them, as the compound having an amide group as a leveling material, a compound having one or more polymeric groups besides an amide group is preferably used.

The compound having an acrylic group used as the leveling material is an acrylic-based leveling agent containing an acrylic group in the molecule. The compound having an acrylic group has the structure shown in Chemical Formula 1, and has low activation level and good re-coatability. At this time, examples of $R_1$ include H, $CH_3$, $C_nH_{2n-1}$ (n=natural number), and the like. In addition, as $R_2$, an alkyl group, a polyester group, a polyether group, a salt, a reactive group, and the like may be introduced.

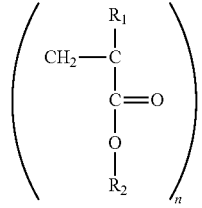

[Chemical Formula 1]

Examples of the compound having an acrylic group used as the leveling material specifically include BYK0-350, BYK-352, BYK-354, BYK-355, BYK-356, BYK-358N, BYK-361N, BYK-380, BYK-392, BYK-394, and the like.

As the compound having a butadiene group used as the leveling material, a butadiene-based leveling agent containing a butadiene group in the molecule may be suitably used. The compound having a butadiene group has low activation level and good re-coatability. At this time, an olefin group, a polyester group, a polyether group, a salt or a reactive group, and the like may be introduced into the molecule.

Examples of the compound having a butadiene group used as the leveling material specifically include FLOREN AC-1190, FLOREN AC-1190HF, FLOREN AC-2000, FLOREN AC-2000HF, and the like.

As the compound having an olefin group used as the leveling material, an olefin-based leveling agent containing an olefin group in the molecule may be used suitably. The compound having an olefin group has low activation level and good re-coatability. At this time, a polyester group, a polyether group, a salt or a reactive group, and the like may be introduced into the molecule.

Examples of the compound having an olefin group used as the leveling material specifically include FLOREN AC-2200HF and the like.

In addition, in the case where the coating liquid for forming a localized layer is cured by ultraviolet light, a photopolymerization initiator is added to the coating liquid for forming a localized layer.

As the photopolymerization initiator, those generating radical when irradiated with ultraviolet light, for example, acetophenones, benzoins, benzophenones, phosphine oxides, ketals, anthraquinones, or thioxanthones may be used. In addition, the addition amount of the photopolymerization initiator is preferably within a range of 0.1 wt % or more and 10 wt % or less, and further preferably within a range of 1 wt % or more and 8.5 wt % or less with respect to the ionization radiation curable material.

In addition, a surface regulator, a refractive index regulator, an adhesion promoting agent, a curing agent, and the like may be also added as an additive to the coating liquid for forming a localized layer.

The coating liquid for forming a localized layer obtained by adjusting the materials described above is coated on the transparent base by a wet coating method, to form a coating film, whereby to form the localized layer. Hereinafter, a method of forming the localized layer will be described.

The coating liquid for forming a localized layer is coated on the transparent base, to form a coating film. As the coating method for coating the coating liquid for forming a localized layer on the transparent base, a coating method using a roll coater, a reverse roll coater, a gravure coater, a microgravure coater, a knife coater, a bar coater, a wire bar coater, a die coater, or a dip coater may be used. Meanwhile, a microgravure coater method or die coater method is preferably used, as the localized layer of the present invention (12) is a thin coating film, and needs to have uniform film thickness.

Next, the coating film of the localized layer formed on the transparent base is dried, whereby to remove the solvent in the coating film. At this time, as the drying means, heating, blowing, hot air and the like may be used.

Meanwhile, as the drying process, primary drying is preferably performed within a range of 20° C. or more and 30° C. or less of the drying temperature immediately after the coating. The primary drying temperature within a range of 20° C. or more and 30° C. or less makes it possible to give sufficient time until the conductive material and the leveling material in the coating film of the localized layer are localized, to form the localized layer.

Meanwhile, in the case where the drying temperature is more than 30° C., there is a concern that the coating film of the localized layer is rapidly dried and the localized layer is not formed. On the other hand, in the case where the drying temperature is lower than 20° C., the drying time needs to be prolonged and it tends to be unsuitable for continuous production.

In addition, the secondary drying is preferably performed within a range of 50° C. or more and 150° C. or less of the drying temperature. The secondary drying temperature arranged within a range of 50° C. or more and 150° C. or less, makes it possible to form a localized layer in which an intermediate layer, a hard coat layer, an antistatic layer and a leveling layer are laminated as localized in order from the side of the transparent base.

Meanwhile, in the case where the drying temperature is more than 150° C., the evaporation rate of the solvent is too fast, and thus there is a concern that the surface of the localized layer becomes rough, and the haze occurs. On the other hand, in the case where the drying temperature is lower than 50° C., the solvent remains in the localized layer, and the localized layer becomes to have no hard coating property.

In addition, the drying may be insufficient with only the primary drying, and suitable heat drying with heat drying at a drying temperature within a range of 50° C. or more and 150° C. or less may be performed in combination as the secondary drying after the primary drying.

By performing the primary drying and the secondary drying at the drying temperatures in the drying process, it is possible to easily produce the localized layer (12).

In addition, in order to perform isolation of each layer of the localized layer, the primary drying is performed, and the secondary drying is performed by suitable heat drying with heat drying within a range of 50° C. or more and 150° C. or less, whereby to remove the solvent.

The fact that the time for the solvent contained in the coating film composed of the coating liquid for forming a localized layer on the transparent base to become 10 wt % or less after formation of the coating film of the localized layer on the transparent base, is within a range of 2 seconds or more and 60 seconds or less, makes it possible to give sufficient time until the conductive material and the leveling material in the coating film are localized, to form a localized layer, and makes it possible to easily form a localized layer (12).

In addition, in the case where the time until the solvent contained in the coating film of the localized layer becomes 10 wt % or less is less than 2 seconds, the coating film of the localized layer is rapidly dried, and accordingly the antistatic layer and the leveling layer may not be formed.

Meanwhile, in the case where the time until the solvent contained in the coating film of the localized layer becomes 10 wt % or less is more than 60 seconds, the time is too much taken, and thus is not practical. Further in the case where the localized layer is formed in a sheet form, takt time becomes long, and the productivity decrease, which is undesirable.

Next, the coating film obtained from coating the coating liquid for forming a localized layer on the transparent base, is irradiated with ionization radiation, to form a localized layer (12).

As the ionization radiation, ultraviolet light or electron beam may be used. In the case of ultraviolet light curing, a light source such as a high-pressure mercury vapor lamp, a low-pressure mercury vapor lamp, an ultrahigh-pressure mercury vapor lamp, a metal halide lamp a carbon-arc, and a xenon arc may be used. In addition, in the case of electron beam curing, electron beam released from various electron beam accelerators such as Cockcroft-Walton type, Van de Graaff type, resonance transformation type, insulated core transformer type, linear type, dynamitron type and high-frequency type may be used. The electron beam preferably has 50 to 1,000 KeV energy. The electron beam more preferably has 100 to 300 KeV energy.

Next, a method of forming a low refractive index layer will be described.

The low refractive index layer is formed with a wet coating method by coating the coating liquid for forming a low refractive index layer containing a low refractive index layer-forming material onto the surface of the localized layer. At this time, the film thickness (d) of the low refractive index layer is designed such that the optical film thickness (nd) resulting from multiplication of the film thickness (d) by the refractive index (n) of the low refractive index layer is equal to ¼ of the wavelength of visible light.

As the low refractive index layer-forming material, a low refractive index particle and a binder matrix-forming material may be used. Meanwhile, in the case where the binder matrix-forming material has low refractive index, a low refractive index particle may not be contained in the low refractive index forming material. As the binder matrix-forming material in the low refractive index layer (13), an ionization radiation curable material or a thermoset material may be used.

As the low refractive particle that can be contained in the coating liquid for the low refractive index layer-forming material, low refractive index particles composed of a low refraction material such as LiF, MgF, 3NaF·AlF or AlF (1.40 refractive index for any one of them), or $Na_3AlF_6$ (cryolite, 1.33 refractive index) may be used. In addition, a particle having voids inside the particle may be suitably used. The portion of the void in the particle having voids inside the particle makes it possible to give the refractive index of air ($\approx 1$), and thus to give a low refractive index particle having very low refractive index. Specifically, a low refractive index silica particle having internal voids may be used.

The portion of the void in the particle having voids inside the particle makes it possible to give the refractive index of air ($\approx 1$), and thus to give a low refractive index particle having very low refractive index. As the low refractive index silica particle having internal voids, a porous silica particle or a silica particle of shell structure may be used.

In addition, the low refractive index particle preferably has 1 nm or more and 100 nm or less of the particle size. In the case where the particle size is more than 100 nm, there is a tendency that the light is remarkably reflected by Rayleigh scattering, and the low refractive index layer is bleached and the transparency of the anti-reflection film decreases. On the other hand, in the case where the particle size is less than 1 nm, problems occur such as non-uniformity of particles in the low refractive index layer by aggregation of the particles.

Meanwhile, as one example of the low refractive index silica particle having internal voids, use may be made of those having 1.35 of the low refractive index, which is lower in comparison to 1.45 of the vitreous refractive index, while keeping the spherical shape, having the spherical structure of 20 nm or more and 25 nm or less of the radius and the density ($\rho 1$) in the central portion, with the periphery covered with a layer of different density ($\rho 2$) and 10 nm or more and 15 nm or less of the thickness, wherein the value ($\rho 1/\rho 2$) is 0.5, 0.1 or 0.0, and having a structure where the central portion of the low refractive index silica particle has a density of $1/10$ or so of that of external silica, and the like.

As the ionization radiation curable material used as the binder matrix-forming material, an acrylic-based material may be used. As the acrylic-based material, mono-functional or multi-functional (meth)acrylate compounds such as polyhydric alcohol acrylic acid or methacrylic acid ester, multi-functional urethane (meth)acrylate compounds such as those synthesized from hydroxyester of diisocyanate and polyhydric alcohol and acrylic acid or methacrylic acid, and the like may be used. In addition, besides these, as the ionization radiation type material, a polyether resin, a polyester resin, an epoxy resin, an alkyd resin, a spiroacetal resin, a polybutadiene resin, a polythiol polyene resin and the like, which have an acrylate-based functional group, may be used.

Examples of the mono-functional (meth)acrylate compound include, for example, 2-hydroxyethyl (meth)acrylate, 2-hydroxypropyl (meth)acrylate, 2-hydroxybutyl (meth)acrylate, n-butyl (meth)acrylate, isobutyl (meth)acrylate, t-butyl (meth)acrylate, glycidyl (meth)acrylate, acryloyl morpholine, N-vinyl pyrrolidone, tetrahydrofurfuryl acrylate, cyclohexyl (meth)acrylate, 2-ethylhexyl (meth)acrylate, isobornyl (meth)acrylate, isodecyl (meth)acrylate, lauryl (meth)acrylate, tridecyl (meth)acrylate, cetyl (meth)acrylate, stearyl (meth)acrylate, benzyl (meth)acrylate, 2-ethoxyethyl (meth)acrylate, 3-methoxybutyl (meth)acrylate, ethylcarbitol (meth)acrylate, phosphoric acid (meth)acrylate, ethylene oxide-modified phosphoric acid (meth)acrylate, phenoxy (meth)acrylate, ethylene oxide-modified phenoxy (meth)acrylate, propylene oxide-modified phenoxy (meth)acrylate, nonyl phenol (meth)acrylate, ethylene oxide-modified nonyl phenol (meth)acrylate, propylene oxide-modified nonyl phenol (meth)acrylate, methoxy diethylene glycol (meth)acrylate, methoxy polyethylene glycol (meth)acrylate, methoxypropylene glycol (meth)acrylate, 2-(meth)acryloyloxyethyl-2-hydroxypropylphthalate, 2-hydroxy-3-phenoxy propyl (meth)acrylate, 2-(meth)acryloyloxyethyl hydrogen phthalate, 2-(meth)acryloyloxypropyl hydrogen phthalate, 2-(meth)acryloyloxypropyl hexahydrohydrogen phthalate, 2-(meth)acryloyloxypropyl tetrahydrohydrogen phthalate, dimethylaminoethyl (meth)acrylate, trifluoroethyl (meth)acrylate, tetrafluoropropyl (meth)acrylate, hexafluoropropyl (meth)acrylate, octafluoropropyl (meth)acrylate, octafluoropropyl (meth)acrylate, 2-adamantane and adamantane derivative mono(meth)acrylate such as adamantyl acrylate having monovalent mono(meth)acrylate derived from adamantanediol, and the like.

Examples of the di-functional (meth)acrylate compound include, for example, di(meth)acrylates such as ethylene glycol di(meth)acrylate, diethylene glycol di(meth)acrylate, butanediol di(meth)acrylate, hexanediol di(meth)acrylate, nonanediol di(meth)acrylate, ethoxylated hexanediol di(meth)acrylate, propoxylated hexanediol di(meth)acrylate, diethylene glycol di(meth)acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth)acrylate, tripropylene glycol di(meth)acrylate, hydroxypivalic acid neopentyl glycol di(meth)acrylate and the like.

Examples of the tri- or higher-functional (meth)acrylate compound include, for example, tri(meth)acrylates such as trimethylol propane tri(meth)acrylate, ethoxylated trimethylol propane tri(meth)acrylate, propoxylated trimethylol propane tri(meth)acrylate, tris 2-hydroxyethylisocyanurate tri (meth)acrylate and glycerin tri(meth)acrylate; tri-functional (meth)acrylate compounds such as pentaerythritol tri(meth)acrylate, dipentaerythritol tri(meth)acrylate and ditrimethylol propane tri(meth)acrylate; tri-functional or higher-functional (meth)acrylate compounds such as pentaerythritol tetra (meth)acrylate, ditrimethylol propane tetra(meth)acrylate, dipentaerythritol tetra(meth)acrylate, dipentaerythritol penta (meth)acrylate, ditrimethylol propane penta(meth)acrylate, dipentaerythritol hexa(meth)acrylate and ditrimethylol propane hexa(meth)acrylate; multi-functional (meth)acrylate compounds obtained by replacing some of these (meth)acrylates with an alkyl group or $\epsilon$-caprolactone; and the like.

Among the acrylic-based materials, multi-functional urethane acrylate may be suitably used for the reason that intended molecular weight and molecule structure can be designed, and the balance of the physical properties of the formed hard coat layer can be easily taken. The urethane acrylate is obtained by reacting a polyhydric alcohol, polyhydric isocyanate and acrylate containing a hydroxy group.

In addition, besides the ionization radiation curable material, a thermoplastic resin and the like may be also added. As the thermoplastic resin, use may be made of cellulose derivatives such as acetyl cellulose, nitrocellulose, acetyl butyl cellulose, ethylcellulose and methylcellulose, vinyl-based resins such as vinyl acetate and a copolymer thereof, vinyl chloride and a copolymer thereof, vinylidene chloride and a copolymer thereof, acetal resins such as polyvinyl formal and polyvinyl butyral, acrylic-based resins such as an acrylic resin and a copolymer thereof, a methacrylic resin and a copolymer thereof, a polystyrene resin, a polyamide resin, a linear polyester resin, a polycarbonate resin and the like. By adding the thermoplastic resin, it is possible to suppress curling of the produced film.

In addition, the low refractive index layer-forming material may be treated with a water-repellent material in order to make it hard for smudge such as fingerprint to adhere to the surface of the anti-reflection film, and to easily clean adhered smudge. As the water-repellent material, silicone-based materials, organic silicon compounds or UV curable water repelling agents may be used. As the silicone-based materials, alkylaralkyl-modified silicone oil, alkyl-modified silicone oil, polyether-modified silicone oil or alkyl polyether-modified silicone oil may be also used. Furthermore, an organic silicon compound containing no fluorine and having no (meth)acrylic group may be also used. Specifically, an alkylalkoxy silane compound, a silane siloxane compound, a polyester group-containing silane compound, polyether group-having silane compound or a siloxane compound may be also used. In addition, as the UV curable water repelling agent, BYK-350 or BYK-3500 (manufactured by BYK-Chemie Japan), F470 (manufactured by DIC Corporation) and the like may be used.

In addition, as the binder matrix-forming material, a hydrolysate of silicon alkoxide, which is a thermoset material, may be used. Specifically, a hydrolysate of silicon alkoxide represented by General formula (A) $R_xSi(OR)_{4-x}$ (wherein R represents an alkyl group and x is an integer that satisfies $0 \leq X \leq 3$) may be used.

As the silicon alkoxide represented by General formula (A), use may be made of, for example, tetramethoxy silane, tetraethoxy silane, tetra-iso-propoxysilane, tetra-n-propoxy silane, tetra-n-butoxy silane, tetra-sec-butoxy silane, tetra-tert-butoxy silane, tetrapentaethoxy silane, tetrapenta-iso-propoxy silane, tetrapenta-n-propoxy silane, tetrapenta-n-butoxy silane, tetrapenta-sec-butoxy silane, tetrapenta-tert-butoxy silane, methyltrimethoxy silane, methyltriethoxy silane, methyltripropoxy silane, methyltributoxy silane, dimethyldimethoxy silane, dimethyldiethoxy silane, dimethylethoxy silane, dimethylmethoxy silane, dimethylpropoxy silane, dimethylbutoxy silane, methyldimethoxy silane, methyldiethoxy silane, hexyltrimethoxy silane and the like. The hydrolysate of silicon alkoxide may be obtained from a metal alkoxide represented by General formula (B) as a raw material, and is, for example, those obtained by hydrolysis with hydrochloric acid.

As the binder matrix-forming material, a hydrolysate of silicon alkoxide represented by General formula (B) $R'_zSi(OR)_{4-z}$ (wherein R' represents a non-reactive functional group having an alkyl group, a fluoroalkyl group or a fluoroalkylene oxide group, and z is an integer that satisfies $1 \leq z \leq 3$), which is a fluorine compound, may be further contained as the water-repellent material in the case where a hydrolysate of silicon alkoxide, which is a thermoset material, is used. By using the hydrolysate of silicon alkoxide represented by General formula (B), it is possible to give antifouling property to the surface of the low refractive index layer of the anti-reflection film. Furthermore, it is possible to further decrease the refractive index of the low refractive index layer. Examples of the silicon alkoxide represented by General formula (C) include, for example, octadecyl trimethoxy silane, 1H,1H,2H,2H-perfluorooctyltrimethoxy silane and the like.

The solvent contained in the coating liquid for forming a low refractive index layer is suitably selected from aromatic hydrocarbons such as toluene, xylene, cyclohexane and cyclohexyl benzene, and hydrocarbons such as n-hexane, ethers such as dibutyl ether, dimethoxymethane, dimethoxyethane, diethoxyethane, propylene oxide, dioxane, dioxolane, trioxane, tetrahydrofuran, anisole and phenetol, and ketones such as methyl isobutyl ketone, methyl butyl ketone, acetone, methyl ethyl ketone, diethyl ketone, dipropyl ketone, diisobutyl ketone, cyclopentanone, cyclohexanone, methyl cyclohexanone, and methyl cyclohexanone, or esters such as ethyl formate, propyl formate, n-pentyl formate, methyl acetate, ethyl acetate, methyl propionate, ethyl propionate, n-pentyl acetate, and γ-butyrolactone, and further cellosolves such as methyl cellosolve, cellosolve, butyl cellosolve and cellosolve acetic acid, alcohols such as methanol, ethanol and isopropyl alcohol, water, and the like in consideration of coating properness and the like.

In addition, In the case where curing is performed with ultraviolet light using an ionization radiation curable material used as the binder matrix-forming material, a photopolymerization initiator is added to the coating liquid for forming a low refractive index layer.

As the photopolymerization initiator, those generating a radical when irradiated with ultraviolet light may be used, and for example, acetophenones, benzoins, benzophenones, phosphine oxides, ketals, anthraquinones or thioxanthones may be used. In addition, the addition amount of the photopolymerization initiator is preferably within a range of 0.1 wt % or more and 10 wt % or less, and further preferably 1 wt % or more and 8.5 wt % or less with respect to the ionization radiation curable material.

In addition, additives such as a surface regulator, a refractive index regulator, an adhesion promoting agent, a curing agent and the like may be also added to the coating liquid for forming a low refractive index layer.

The coating liquid for forming a low refractive index layer resulting from adjusting the materials above, may be coated onto the localized layer (12) by a wet coating method, to form a coating film of the low refractive index layer, and to form a low refractive index layer (13). Hereinafter, a method of forming the low refractive index layer will be shown.

The coating liquid for forming a low refractive index layer is coated onto the localized layer (12), to form a coating film of the low refractive index layer. As the coating method for coating the coating liquid for forming a localized layer on the transparent base, a coating method using a roll coater, a reverse roll coater, a gravure coater, a microgravure coater, a knife coater, a bar coater, a wire bar coater, a die coater or a dip coater may be used. Meanwhile, a microgravure coater method is preferably used, as the low refractive index layer (13) of the present invention is a thin coating film, and needs to have uniform film thickness.

Next, the coating film of the localized layer (12) formed on the transparent base is dried, whereby to remove the solvent in the coating film. At this time, as the drying means, heating, blowing, hot air and the like may be used. Meanwhile, as the drying temperature, suitable heat drying is preferably performed within a range of 50° C. or more and 150° C. or less.

Next, in the case where an ionization radiation curable material is used as the binder matrix-forming material, the coating liquid for forming a low refractive index layer is coated onto the localized layer, and the resulting coating film of the low refractive index layer is irradiated with ionization radiation, to form the low refractive index layer (13).

As the ionization radiation, ultraviolet light or electron beam may be used. In the case of the ultraviolet light curing, a light source such as a high-pressure mercury vapor lamp, a low-pressure mercury vapor lamp, an ultrahigh-pressure mercury vapor lamp, a metal halide lamp a carbon-arc, and a xenon arc may be used. In addition, in the case of the electron beam curing, electron beam released from various electron beam accelerators such as Cockcroft-Walton type, Van de Graaff type, resonance transformation type, insulated core transformer type, linear type, dynamitron type and high-frequency type may be used. The electron beam preferably has 50 to 1,000 KeV energy. The electron beam more preferably has 100 to 300 KeV energy.

The anti-reflection film of the present invention is continuously formed in roll-to-roll method. As shown in FIG. 2, a rolled web-form transparent base is continuously run from a reeling out section (31) to a rolling section (32), and at this time, the transparent base passes through a coating unit (21), a drying unit (22), and an ionization irradiation unit (23), whereby to continuously form a localized layer on the transparent base. The, a low refractive index layer passes through the units in the same manner, whereby to form the low refractive index layer on the localized layer, and thus produce the anti-reflection film.

EXAMPLES

First, evaluation methods for the anti-reflection film obtained in Examples will be shown.

"Measurement of Luminous Average Reflectivity"

The low refractive index layer-forming surface and the opposite surface of the obtained anti-reflection film were coated into black color with black matting spray. After the coating, the spectral reflectivity in 5° of the incidence angle under conditions of C light source and 2 degrees of the view field was measured for the low refractive index layer-forming surface measured using an automatic spectral photometer (trade name: U-4000, manufactured by Hitachi Ltd.). From the resulting spectral reflectivity, average luminous reflectance (Y %) was calculated. In addition, as the relative luminosity, photopia-referenced relative luminosity was used.

"Measurement of Haze (H) and Parallel Light Transmittance"

For the resulting anti-reflection film, haze (H) and parallel light transmittance were measured using a haze turbidimeter instrument (trade name:NDH-2000, manufactured by NIPPON DENSHOKU INDUSTRIES CO., LTD.).

"Measurement of Surface Resistance Value"

The measurement was performed with a high resistance resistivity meter (trade name: Hiresta MCP-HT260, manufactured by DIA INSTRUMENTS CO., LTD.) in compliance with JIS-K6911 (1995) for the surface of the low refractive index layer of the obtained anti-reflection film.

"Measurement of Contact Angle"

For the surface of the localized layer and the surface of the low refractive index layer of the obtained anti-reflection film, droplets having 1.8 mm diameter were created on a needle tip at the dry state (20° C., 65% RH) using a contact angle meter (CA-X type, manufactured by Kyowa Interface Science Co., LTD.), and they are contacted with the surface of the sample (solid), whereby to create the droplets. The contact angle refers to an angle between the tangential line to the liquid surface and the solid surface at the contact point of the solid and the liquid, and is defined as angular degree at the liquid-containing side. As the liquid, distilled water was used. In addition, the method of measuring contact angle of pure water was measured in compliance with JIS-R3257.

"Measurement of Pencil Hardness"

The pencil hardness of the surface of the localized layer of each anti-reflection film was measured with 500 g load in compliance with JIS K5600-5-4 (1999).

"Evaluation of Color Variation and Interference Fringe"

For the resulting anti-reflection film, a fluorescent lamp was lighted on the surface of the low refractive index layer, and the reflection light was checked whereby to check the color variation and check the interference variation.

Evaluations with visual checking were performed on the criteria described below.

○): Color variation and interference fringe good.

x: Color variation and interference fringe not good.

"Evaluation of Abrasion Resistance (Steel Wool (SW))"

For the surface of the low refractive index layer of the obtained anti-reflection film, back and forth rubbing was performed 10 times using steel wool (trade name: Bonstar #0000, manufactured by Nihon Steel Wool Co., Ltd.) with 500 g/cm² load on the surface of the low refractive index layer of an optical laminate using Gakushin-Type fastness to rubbing tester (trade name: AB-301, manufactured by TESTER SANGYO CO, LTD.), and the changes of appearance such as rubbing track, scarring and the like were visually evaluated.

The evaluations with visual checking were performed on the criteria described below.

○: Scarring not checked.

x: Scarring checked.

"Measurement of Pencil Hardness"

For the surface of the localized layer of the obtained anti-reflection film, pencil hardness test was performed in compliance with JIS K5600-5-4 (1999), and the pencil hardness was calculated.

Determination of the intermediate layer, the hard coat layer, the antistatic layer and the leveling layer in the localized layer was performed on the determination criteria described below.

"Check of Intermediate Layer in Localized Layer"

From the spectral reflectivity calculated in the item of the "Measurement of luminous average reflectivity", check of presence or absence of the intermediate layer was performed. Specifically, a case where an interference peak corresponding to the film thickness of the localized layer in the resulting spectral reflectivity curve was not checked, was determined as presence of the intermediate layer, and a case where an interference peak corresponding to the film thickness of the localized layer was checked, was determined as absence of the intermediate layer.

○: Presence of intermediate layer (absence of interference peak)

x: Absence of intermediate layer (presence of interference peak)

"Check of Hard Coat Layer in Localized Layer"

From the pencil hardness of the surface of the localized layer calculated in the item of the "Measurement of pencil hardness", a case where the pencil hardness of the surface of the localized layer was H or more, was determined as presence of the hard coat layer, and a case where the pencil hardness was less than H, was determined as absence of the hard coat layer.

○: Presence of hard coat layer (H or more of the pencil hardness)

x: Absence of hard coat layer (less than H of the pencil hardness)

"Check of Antistatic Layer in Localized Layer"

From the surface resistance value calculated in the item of the "Measurement of surface resistance value", check of presence or absence of the antistatic layer was performed. A case where the surface resistance value was $1 \times 10^{10}$ Ω/cm² or less, was determined as presence of the antistatic layer, and a case where the surface resistance value was greater than $1 \times 10^{10}$ Ω/cm², was determined as absence of the antistatic layer.

○: Presence of antistatic layer ($1 \times 10^{10}$ Ω/cm² or less of the surface resistance value)

x: Absence of antistatic layer (greater than $1\times10^{10}$ $\Omega/cm^2$ of the surface resistance value)

Meanwhile, "Check of antistatic layer in localized layer" was performed for an anti-reflection film to which the coating liquid for forming a localized layer conductive material was added.

"Check of Leveling Layer in Localized Layer"

Presence of the leveling layer was checked with the contact angle on the surface of the localized layer, and an X-ray photoelectron spectrometer. A method of measuring the contact angle on the surface of the localized layer is as described in the "Measurement of contact angle". Presence of the leveling layer was determined by performing the surface analysis of the surface of the localized layer using an X-ray photoelectron spectrometer (trade name: JPS-90MXV micro, manufactured by (JEOL Ltd). A case where the contact angle was 60° or more and an unique element of a conductive material was not detectable in XPS measurement, was determined as presence of the leveling layer, and a case where the contact angle was less than 60° and/or chlorine was detected in the surface analysis by XPS, was determined as absence of the leveling layer. In addition, a case where the ratio of the atomic weight was 0.1 atomic % or less, was taken as not detectable. Meanwhile, the X ray intensity in the measurement was set to 100 W (10 kV, 10 mA).

◯: Presence of leveling layer (65° or more of contact angle, and unique element of conductive material not detectable)

x: Absence of leveling layer (others than those described)

Meanwhile, for an anti-reflection film in which a leveling material was not added to the coating liquid for forming a localized layer, the "Check of leveling layer in localized layer" was not performed.

Meanwhile, the unique element of a conductive material is as described below.

Quaternary ammonium salt material: Cl
Metal oxide particle (antimony-containing tin oxide): Sn
Metal oxide particle (phosphorus-containing tin oxide): Sn
Conductive polymer (polythiophene): S
Conductive polymer (polyaniline): N Next, a method of preparing the anti-reflection film produced in Examples will be shown.

(A) Leveling Material: Compound Having an Amide Group, and Conductive Material: Quaternary Ammonium Salt Material Hereinafter, Examples where a compound having an amide group is used as a leveling material, and a quaternary ammonium salt material is used as the conductive material, are shown.

Hereinafter, Adjustment Examples of the coating liquid for forming a localized layer A1 to A13 are shown.

Synthesis Example 1

A four-necked flask equipped with stirring blades, a reflux cooling tube, a dry air introduction tube, and a thermometer, was charged with

| | |
|---|---|
| octylpolyethylene glycol polypropylene glycol methacrylate (trade name: "BLEMMER 50POEP-800B", manufactured by NOF CORPORATION) | 18.0 g |
| methacryloyl oxyethyltrimethyl ammonium chloride | 35.0 g |
| cyclohexyl methacrylate | 14.0 g |
| azobisisobutyronitrile | 0.3 g |
| isopropyl alcohol | 100.0 g |
| methyl ethyl ketone | 40.0 g | and polymerized at 65° C. for 3 hours under nitrogen atmosphere. After completion of the polymerization, the reaction liquid was put into hexane, and a product was precipitated, and then dried. The weight average molecular weight of the resulting quaternary ammonium salt material was 18500.

Adjustment Example A1

Coating Fluid for Forming Localized Layer A1

A mixture of

| | |
|---|---|
| quaternary ammonium salt material (molecular weight: 18500) produced in Synthesis Example 1 | 10 weight parts |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer A1.

Adjustment Example A2

Coating Fluid for Forming Localized Layer A2

A mixture of

| | |
|---|---|
| NR-121X-9IPA (isopropyl alcohol dispersion liquid, manufactured by COLCOAT CO., Ltd.) (solid content) | 20 weight parts |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer A2.

Adjustment Example A3

Coating Fluid for Forming Localized Layer A3

A mixture of

| | |
|---|---|
| quaternary ammonium salt material (molecular weight: 18500) produced in Synthesis Example 1 | 10 weight parts |
| N,N-diallyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer A3.

Adjustment Example A4

Coating Fluid for Forming Localized Layer A4

A mixture of

| | |
|---|---|
| quaternary ammonium salt containing LIGHT ESTER DQ100 (trade name, manufactured by KYOEISHA CHEMICAL Co., LTD., molecular weight 208) | 10 weight parts |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer A4.

Adjustment Example A5

Coating Fluid for Forming Localized Layer A5

A mixture of

| | |
|---|---|
| p-styrene sulfonic acid ammonium salt homopolymer (molecular weight: 120,000) | 10 weight parts |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer A5.

Adjustment Example A6

Coating Fluid for Forming Localized Layer A6

A mixture of

| | |
|---|---|
| quaternary ammonium salt material (molecular weight: 18500) produced in Synthesis Example 1 | 10 weight parts |
| polyamide (molecular weight: 10000) | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer A6.

Adjustment Example A7

Coating Fluid for Forming Localized Layer A7

A mixture of

| | |
|---|---|
| quaternary ammonium salt material (molecular weight: 18500) produced in Synthesis Example 1 | 0.01 weight part |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer A7.

Adjustment Example A8

Coating Fluid for Forming Localized Layer A8

A mixture of

| | |
|---|---|
| quaternary ammonium salt material (molecular weight: 18500) produced in Synthesis Example 1 | 100 weight parts |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer A8.

Adjustment Example A9

Coating Fluid for Forming Localized Layer A9

A mixture of

| | |
|---|---|
| quaternary ammonium salt material (molecular weight: 8500) produced in Synthesis Example 1 | 10 weight parts |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)
was prepared, and this was prepared to a liquid having 50 wt % of the solid content using isopropyl alcohol, which was taken as the coating liquid for forming a localized layer A9.

Adjustment Example A10

Coating Fluid for Forming Localized Layer A10

A mixture of

| | |
|---|---|
| quaternary ammonium salt material (molecular weight: 18500) produced in Synthesis Example 1 | 10 weight parts |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)
was prepared, and this was prepared to a liquid having 20 wt % of the solid content using methyl ethyl ketone, which was taken as the coating liquid for forming a localized layer A10.

Adjustment Example A11

Coating Fluid for Forming Localized Layer A11

A mixture of

| | |
|---|---|
| quaternary ammonium salt material (molecular weight: 18500) produced in Synthesis Example 1 | 10 weight parts |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)
was prepared, and this was prepared to a liquid having 90 wt % of the solid content using methyl ethyl ketone, which was taken as the coating liquid for forming a localized layer A11.

Adjustment Example A12

Coating Fluid for Forming Hard Coat Layer A12

A mixture of

| | |
|---|---|
| quaternary ammonium salt material (molecular weight: 18500) produced in Synthesis Example 1 | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)
was prepared, and this was prepared to a liquid having 50 wt % of the solid content using methyl ethyl ketone, which was taken as the coating liquid for forming a localized layer A12.

Adjustment Example A13

Coating Fluid for Forming Localized Layer A13

A mixture of

| | |
|---|---|
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)
was prepared, and this was prepared to a liquid having 50 wt % of the solid content using methyl ethyl ketone, which was taken as the coating liquid for forming a localized layer A13.

Hereinafter, Adjustment Example of the coating liquid for forming a low refractive index layer A is shown.
(Coating Fluid for Forming Low Refractive Index Layer A)
A mixture of

| | |
|---|---|
| dispersion liquid of porous silica fine particles (having an average particle size of 50 nm/20 wt % of the solid content/methyl isobutyl ketone dispersion liquid) (solid content) | 2.5 weight parts |
| EO-modified dipentaerythritol hexaacrylate (trade name: DPEA-12, manufactured by NIPPO KAYAKU Co., Ltd.) | 2.5 weight parts |
| photopolymerization initiator (trade name: IRGACURE 184, manufactured by Ciba Specialty Chemicals Japan K.K.) | 0.1 weight part | was prepared, and this was prepared to a liquid having 5 wt % of the solid content using isopropyl alcohol, which was taken as the coating liquid for forming a low refractive index layer A.

Example A1

Formation of Localized Layer

Onto one surface of a triacetyl cellulose film (manufactured by FUJIFILM Corporation, film thickness: 80 μm), the coating liquid for forming a localized layer A1 was coated, and dried at 25° C. for 10 seconds in a drying oven for primary drying, and subsequently dried at 80° C. for 50 seconds in a drying oven for secondary drying, and then ultraviolet irradiation was performed using an ultraviolet irradiation apparatus (manufactured by Fusion UV Systems Japan K.K., light source: H bulb), at an irradiation dose of 300 mJ/m$^2$, whereby to form a transparent localized layer having a dry film thickness of 5 μm.

(Formation of Low Refractive Index Layer)

Onto the localized layer formed above, the coating liquid for forming a low refractive index layer A was coated such that the film thickness after drying became 100 nm. Primary drying was performed at a temperature of 25° C. for 25 seconds, and then secondary drying was performed at a temperature of 80° C. for 50 seconds, and then ultraviolet irradiation was performed at an irradiation dose of 192 mJ/m$^2$ using an ultraviolet irradiation apparatus (manufactured by Fusion UV Systems Japan K.K., light source: H bulb) to harden the film, whereby to form a low refractive index layer, and prepare the anti-reflection film of [Example A1].

[Example A2] to [Example A11]

In [Example A2] to [Example A11], the coating liquids for forming a localized layer A2 to A11 were used instead of the coating liquid for forming a localized layer A1, with other production conditions being similar to those of [Example A1], whereby to prepare the anti-reflection films of [Example A2] to [Example 11].

[Example A12] to [Example A14]

In [Example A12], the localized layer was formed at 50° C. of the primary drying temperature and at 60° C. of the secondary drying temperature using the coating liquid for forming a localized layer A1, with other production conditions being similar to those of [Example A1], whereby to prepare the anti-reflection film of [Example A12].

In [Example A13], the localized layer was formed using the coating liquid for forming a localized layer A1 at 25° C. of both of the primary drying temperature and the secondary drying temperature, with other production conditions being similar to those of [Example A1], whereby to prepare the anti-reflection film of [Example A13].

In [Example A14], the localized layer was formed using the coating liquid for forming a localized layer A1 at 80° C. of both of the primary drying temperature and the secondary drying temperature, with other production conditions being similar to those of [Example A1], whereby to prepare the anti-reflection film of [Example A14].

[Example A15] and [Example A16]

In [Example A15] and [Example A16], the coating liquids for forming a localized layer A12 and A13 were used instead of the coating liquid for forming a localized layer A1, with other production conditions being similar to those of [Example A1], whereby to prepare the anti-reflection films of [Example A15] and [Example A16].

The production conditions in [Example A1] to [Example A16] are shown collectively in Table 1.

TABLE 1

| | | Production Condition | | | | | | | | |
|---|---|---|---|---|---|---|---|---|---|---|
| | | Quaternary Ammonium Salt Material | | | Leveling Material | | Dilution Solvent | | Drying Temperature | |
| | | | | | | | | | Primary Drying | Secondary Drying |
| | Forming Coating Liquid | Name of Material | Molecular Weight | Quantity | Name of Material | Molecular Weight | Name of Material | Solid Content Adjustment | Temperature | Temperature |
| Example A1 | Localized Layer-Forming Coating Liquid A1 | Synthesis Example 1 | 18500 | 10 Weight Part | N-Vinyl Formamide | 71 | Methyl Ethyl Ketone | 50% | 25° C. | 80° C. |
| Example A2 | Localized Layer-Forming Coating Liquid A2 | NR-121X-9IPA | 15000 | 20 Weight Part | N-Vinyl Formamide | 71 | Methyl Ethyl Ketone | 50% | 25° C. | 80° C. |
| Example A3 | Localized Layer-Forming Coating Liquid A3 | Synthesis Example 1 | 18500 | 10 Weight Part | N,N-diallyl Formamide | 125 | Methyl Ethyl Ketone | 50% | 25° C. | 80° C. |
| Example A4 | Localized Layer-Forming Coating Liquid A4 | LIGHT ESTER DQ100 | 208 | 10 Weight Part | N-Vinyl Formaldehyde | 71 | Methyl Ethyl Ketone | 50% | 25° C. | 80° C. |
| Example A5 | Localized Layer-Forming Coating Liquid A5 | Ammonium Salt Homopolymer | 120000 | 10 Weight Part | N-Vinyl Formaldehyde | 71 | Methyl Ethyl Ketone | 50% | 25° C. | 80° C. |
| Example A6 | Localized Layer-Forming Coating Liquid A6 | Synthesis Example 1 | 18500 | 10 Weight Part | Polyamide | 150000 | Methyl Ethyl Ketone | 50% | 25° C. | 80° C. |
| Example A7 | Localized Layer-Forming Coating Liquid A7 | Synthesis Example 1 | 18500 | 0.01 Weight Part | N-Vinyl Formamide | 71 | Methyl Ethyl Ketone | 50% | 25° C. | 80° C. |

TABLE 1-continued

| | Production Condition | | | | | | | | |
|---|---|---|---|---|---|---|---|---|---|
| | | Quaternary Ammonium Salt Material | | | Leveling Material | | Dilution Solvent | | Drying Temperature |
| | Forming Coating Liquid | Name of Material | Molecular Weight | Quantity | Name of Material | Molecular Weight | Name of Material | Solid Content Adjustment | Primary Drying Temperature / Secondary Drying Temperature |
| Example A8 | Localized Layer-Forming Coating Liquid A8 | Synthesis Example 1 | 18500 | 100 Weight Part | N-Vinyl Formamide | 71 | Methyl Ethyl Ketone | 50% | 25° C. / 80° C. |
| Example A9 | Localized Layer-Forming Coating Liquid A9 | Synthesis Example 1 | 18500 | 10 Weight Part | N-Vinyl Formaldehyde | 71 | Isopropyl Alcohol | 50% | 25° C. / 80° C. |
| Example A10 | Localized Layer-Forming Coating Liquid A10 | Synthesis Example 1 | 18500 | 10 Weight Part | N-Vinyl Formaldehyde | 71 | Methyl Ethyl Ketone | 20% | 25° C. / 80° C. |
| Example A11 | Localized Layer-Forming Coating Liquid A11 | Synthesis Example 1 | 18500 | 10 Weight Part | N-Vinyl Formaldehyde | 71 | Methyl Ethyl Ketone | 90% | 25° C. / 80° C. |
| Example A12 | Localized Layer-Forming Coating Liquid A1 | Synthesis Example 1 | 18500 | 10 Weight Part | N-Vinyl Formaldehyde | 71 | Methyl Ethyl Ketone | 50% | 50° C. / 60° C. |
| Example A13 | Localized Layer-Forming Coating Liquid A1 | Synthesis Example 1 | 18500 | 10 Weight Part | N-Vinyl Formaldehyde | 71 | Methyl Ethyl Ketone | 50% | 25° C. |
| Example A14 | Localized Layer-Forming Coating Liquid A1 | Synthesis Example 1 | 18500 | 10 Weight Part | N-Vinyl Formamide | 71 | Methyl Ethyl Ketone | 50% | 80° C. |
| Example A15 | Localized Layer-Forming Coating Liquid A12 | Synthesis Example 1 | 18500 | — | — | — | Methyl Ethyl Ketone | 50% | 25° C. / 80° C. |
| Example A16 | Localized Layer-Forming Coating Liquid A13 | — | — | — | — | — | Methyl Ethyl Ketone | 50% | 25° C. / 80° C. |

For the resulting anti-reflection films of [Example A1] to [Example A16], evaluations were performed as described above, and the state of formation of each layer in the localized layer was checked. The evaluation results and the like are shown collectively in Table 2.

TABLE 2

| | Evaluation Item | | | | | | | | | | | | |
|---|---|---|---|---|---|---|---|---|---|---|---|---|---|
| | | | | | Contact Angle (°) | | Color Variation and | | | State of Localized Layer | | | |
| | Luminous Reflectivity (%) | Haze (%) | Parallel Light Transmittance (%) | Surface Resistance Value ($\Omega$/cm2) | Localized Layer Surface | Low-refractive Index Surface | Interference Fringe | Abrasion Resistance (SW) | Pencil Hardness | Formation | | | |
| | | | | | | | | | | Intermediate Layer | Hard Coat Layer | Antistatic Layer | Leveling Layer |
| Example A1 | 1.0 | 0.1 | 96.0 | $1 \times 10^9$ | 75 | 85 | ○ | ○ | 2H | ○ | ○ | ○ | ○ |
| Example A2 | 1.0 | 0.1 | 96.0 | $1 \times 10^9$ | 75 | 85 | ○ | ○ | 2H | ○ | ○ | ○ | ○ |
| Example A3 | 1.0 | 0.1 | 96.0 | $1 \times 10^9$ | 75 | 85 | ○ | ○ | 2H | ○ | ○ | ○ | ○ |
| Example A4 | 1.0 | 2.0 | 94.0 | $5 \times 10^8$ | 45 | 60 | ○ | X | 2H | ○ | ○ | ○ | X |
| Example A5 | 1.0 | 0.1 | 96.0 | $1 \times 10^{13}$ | 75 | 85 | ○ | ○ | 2H | ○ | ○ | X | ○ |
| Example A6 | 1.0 | 1.5 | 95.0 | $5 \times 10^{13}$ | 75 | 65 | ○ | ○ | 2H | ○ | ○ | X | ○ |
| Example A7 | 1.0 | 0.1 | 96.0 | $1 \times 10^{13}$ | 75 | 85 | ○ | ○ | 2H | ○ | ○ | X | ○ |
| Example A8 | 1.0 | 5.0 | 92.5 | $2 \times 10^8$ | 40 | 60 | ○ | X | 2H | ○ | ○ | ○ | X |
| Example A9 | 1.0 | 0.1 | 96.0 | $1 \times 10^8$ | 75 | 85 | X | ○ | 2H | X | ○ | ○ | ○ |

TABLE 2-continued

| | Evaluation Item | | | | | | | | | | | | |
|---|---|---|---|---|---|---|---|---|---|---|---|---|---|
| | Luminous Reflectivity (%) | Haze (%) | Parallel Light Transmittance (%) | Surface Resistance Value (Ω/cm2) | Contact Angle (°) | | Color Variation and Interference Fringe | Abrasion Resistance (SW) | Pencil Hardness | State of Localized Layer Formation | | | |
| | | | | | Localized Layer Surface | Low-refractive Index Surface | | | | Intermediate Layer | Hard Coat Layer | Antistatic Layer | Leveling Layer |
| Example A10 | 1.0 | 3.0 | 94.0 | 1 × 10$^8$ | 40 | 60 | ○ | X | B | ○ | X | ○ | X |
| Example A11 | 1.0 | 0.7 | 95.5 | 5 × 10$^8$ | 75 | 85 | X | ○ | 2H | X | ○ | X | X |
| Example A12 | 1.0 | 2.0 | 95.0 | 1 × 10$^{13}$ | 60 | 85 | ○ | X | 2H | ○ | ○ | X | X |
| Example A13 | 1.0 | 0.1 | 96.0 | 1 × 10$^9$ | 40 | 50 | ○ | X | B | ○ | X | ○ | X |
| Example A14 | 1.0 | 0.1 | 96.0 | 5 × 10$^{13}$ | 60 | 85 | ○ | ○ | 2H | ○ | ○ | X | X |
| Example A15 | 1.0 | 3.0 | 94.0 | 5 × 10$^8$ | 40 | 50 | ○ | X | 2H | ○ | ○ | ○ | — |
| Example A16 | 1.0 | 0.1 | 96.0 | 5 × 10$^{13}$ | 70 | 85 | ○ | ○ | 2H | ○ | ○ | — | — |

(B) Leveling Material: Compound Having an Amide Group, and Conductive Material: a Metal Oxide Particle Hereinafter, Examples where a compound having an amide group is used as a leveling material, and a metal oxide particle is used as the conductive material, are shown.

Hereinafter, Adjustment Examples of the coating liquids for forming a localized layer B1 to B11, are shown.

Adjustment Example B1

Coating Fluid for Forming Localized Layer B1

A mixture of

| | |
|---|---|
| antimony-containing tin oxide (50 nm of the average particle size/isopropyl alcohol dispersion liquid) (solid content) | 5 weight parts |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer B1.

Adjustment Example B2

Coating Fluid for Forming Localized Layer B2

A mixture of

| | |
|---|---|
| phosphorus-containing tin oxide (50 nm of the average particle size/isopropyl alcohol dispersion liquid) (solid content) | 5 weight parts |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer B2.

Adjustment Example B3

Coating Fluid for Forming Localized Layer B3)

A mixture of

| | |
|---|---|
| antimony-containing tin oxide (50 nm of the average particle size/isopropyl alcohol dispersion liquid) (solid content) | 5 weight parts |
| N,N-diallyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer B3.

Adjustment Example B4

Coating Fluid for Forming Localized Layer B4

A mixture of

| | |
|---|---|
| antimony-containing tin oxide (50 nm of the average particle size/isopropyl alcohol dispersion liquid) (solid content) | 0.01 weight part |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer B4.

Adjustment Example B5

Coating Fluid for Forming Localized Layer B5

A mixture of

| | |
|---|---|
| antimony-containing tin oxide (50 nm of the average particle size/isopropyl alcohol dispersion liquid) (solid content) | 100 weight parts |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer B5.

Adjustment Example B6

Coating Fluid for Forming Localized Layer B6

A mixture of

| | |
|---|---|
| antimony-containing tin oxide (1,000 nm of the average particle size/isopropyl alcohol dispersion liquid) (solid content) | 5 weight parts |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer B6.

Adjustment Example B7

Coating Fluid for Forming Localized Layer B7

A mixture of

| | |
|---|---|
| antimony-containing tin oxide (50 nm of the average particle size/isopropyl alcohol dispersion liquid) (solid content) | 5 weight parts |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using isopropyl alcohol, which was taken as the coating liquid for forming a localized layer B7.

Adjustment Example B8

Coating Fluid for Forming Localized Layer B8

A mixture of

| | |
|---|---|
| antimony-containing tin oxide (50 nm of the average particle size/isopropyl alcohol dispersion liquid) (solid content) | 5 weight parts |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 20 wt % of the solid content using methyl ethyl ketone, which was taken as the coating liquid for forming a localized layer B8.

Adjustment Example B9

Coating Fluid for Forming Localized Layer B9

A mixture of

| | |
|---|---|
| antimony-containing tin oxide (50 nm of the average particle size/isopropyl alcohol dispersion liquid) (solid content) | 5 weight parts |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 90 wt % of the solid content using methyl ethyl ketone, which was taken as the coating liquid for forming a localized layer B9.

Adjustment Example B10

Coating Fluid for Forming Localized Layer B10

A mixture of

| | |
|---|---|
| antimony-containing tin oxide (50 nm of the average particle size/isopropyl alcohol dispersion liquid) (solid content) | 5 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer B10.

Adjustment Example B11

Coating Fluid for Forming Localized Layer B11

A mixture of

| | |
|---|---|
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer B11.

Hereinafter, Adjustment Example of the coating liquid for forming a low refractive index layer B is shown.
(Coating Fluid for Forming Low Refractive Index Layer B)
A mixture of

| | |
|---|---|
| dispersion liquid of porous silica fine particles (50 nm of the average particle size/20 wt % of the solid content/methyl isobutyl ketone dispersion liquid) (solid content) | 2.5 weight parts |
| EO-modified dipentaerythritol hexaacrylate (trade name: DPEA-12, manufactured by NIPPO KAYAKU Co., Ltd.) | 2.5 weight parts |
| photopolymerization initiator (trade name: IRGACURE 184, manufactured by Ciba Specialty Chemicals Japan K.K.) | 0.1 weight part | was prepared, and this was prepared to a liquid having 5 wt % of the solid content using isopropyl alcohol, which was taken as the coating liquid for forming a low refractive index layer B.

Example B1

Formation of Localized Layer

The coating liquid for forming a localized layer B1 was coated Onto one surface of a triacetyl cellulose film (manufactured by FUJIFILM Corporation, film thickness: 80 μm), and dried at 25° C. for 10 seconds in a drying oven for primary drying, and subsequently dried at 80° C. for 50 seconds in a drying oven for secondary drying, and then ultraviolet irradiation was performed using an ultraviolet irradiation apparatus (manufactured by Fusion UV Systems Japan K.K., light source: H bulb) at an irradiation dose of 300 mJ/m$^2$, whereby to form a transparent localized layer having a dry film thickness of 5 μm.
(Formation of Low Refractive Index Layer)

Onto the localized layer formed above, the coating liquid for forming a low refractive index layer B was coated such that the film thickness after drying became 100 nm. Primary drying was performed at a temperature of 25° C. for 25 seconds, and then secondary drying was performed at a temperature of 80° C. for 50 seconds, and then ultraviolet irradiation was performed at an irradiation dose of 192 mJ/m$^2$ using an ultraviolet irradiation apparatus (manufactured by Fusion UV Systems Japan K.K., light source: H bulb) to harden the film, whereby to form a low refractive index layer, and prepare the anti-reflection film of [Example B1].

[Example B2] to [Example B9]

In [Example B2] to [Example B9], the coating liquids for forming a localized layer B2 to B9 were used instead of the coating liquid for forming a localized layer B1, with other production conditions being similar to those of [Example B1], whereby to prepare the anti-reflection films of [Example B2] to [Example B9].

[Example B10] to [Example B12]

In [Example B10], the coating liquid for forming a localized layer B1 was used, and the localized layer was formed at 50° C. of the primary drying temperature and at 60° C. of the secondary drying temperature, with other production conditions being similar to those of [Example B1], whereby to prepare the anti-reflection film of [Example B10].

In [Example B11], the coating liquid for forming a localized layer B1 was used, and the localized layer was formed at 25° C. of both of the primary drying temperature and the secondary drying temperature, with other production conditions being similar to those of [Example B1], whereby to prepare the anti-reflection film of [Example B11].

In [Example B12], the coating liquid for forming a localized layer B1 was used, and the localized layer was formed at 80° C. of both of the primary drying temperature and the secondary drying temperature, with other production conditions being similar to those of [Example B1], whereby to prepare the anti-reflection film of [Example B12].

[Example B13] and [Example B14]

In [Example B13] and [Example B14], the coating liquids for forming a localized layer B10 and B11 were used instead of the coating liquid for forming a localized layer B1, with other production conditions being similar to those of [Example B1], whereby to prepare the anti-reflection films of [Example B13] and [Example B14].

The production conditions in [Example B1] to [Example B14] are shown collectively in Table 3.

TABLE 3

| | | Production Condition | | | | | | | | |
|---|---|---|---|---|---|---|---|---|---|---|
| | | Metal Oxide Particle | | | Leveling Material | | Dilution Solvent | | Drying Temperature | |
| | Forming Coating Liquid | Name of Material | Average Particle Size (nm) | Quantity | Name of Material | Molecular Weight | Name of Material | Solid Content Adjustment | Primary Drying Temperature | Secondary Drying Temperature |
| Example B1 | Localized Layer-Forming Coating Liquid B1 | ATO | 50 | 5 Weight Part | N-Vinyl Formamide | 71 | Methyl Ethyl Ketone | 50% | 25° C. | 80° C. |
| Example B2 | Localized Layer-Forming Coating Liquid B2 | PTO | 50 | 5 Weight Part | N-Vinyl Formamide | 71 | Methyl Ethyl Ketone | 50% | 25° C. | 80° C. |
| Example B3 | Localized Layer-Forming Coating Liquid B3 | ATO | 50 | 5 Weight Part | N,N-diallyl Formamide | 125 | Methyl Ethyl Ketone | 50% | 25° C. | 80° C. |
| Example B4 | Localized Layer-Forming Coating Liquid B4 | ATO | 50 | 0.01 Weight Part | N-Vinyl Formamide | 71 | Methyl Ethyl Ketone | 50% | 25° C. | 80° C. |
| Example B5 | Localized Layer-Forming Coating Liquid B5 | ATO | 50 | 100 Weight Part | N-Vinyl Formamide | 71 | Methyl Ethyl Ketone | 50% | 25° C. | 80° C. |
| Example B6 | Localized Layer-Forming Coating Liquid B6 | ATO | 1000 | 5 Weight Part | N-Vinyl Formamide | 71 | Methyl Ethyl Ketone | 50% | 25° C. | 80° C. |
| Example B7 | Localized Layer-Forming Coating Liquid B7 | ATO | 50 | 5 Weight Part | N-Vinyl Formamide | 71 | Isopropyl Alcohol | 50% | 25° C. | 80° C. |
| Example B8 | Localized Layer-Forming Coating Liquid B8 | ATO | 50 | 5 Weight Part | N-Vinyl Formamide | 71 | Methyl Ethyl Ketone | 20% | 25° C. | 80° C. |
| Example B9 | Localized Layer-Forming Coating Liquid B9 | ATO | 50 | 5 Weight Part | N-Vinyl Formamide | 71 | Methyl Ethyl Ketone | 90% | 25° C. | 80° C. |
| Example B10 | Localized Layer-Forming Coating Liquid B1 | ATO | 50 | 5 Weight Part | N-Vinyl Formamide | 71 | Methyl Ethyl Ketone | 50% | 50° C. | 60° C. |
| Example B11 | Localized Layer-Forming Coating Liquid B1 | ATO | 50 | 5 Weight Part | N-Vinyl Formamide | 71 | Methyl Ethyl Ketone | 50% | 25° C. | |
| Example B12 | Localized Layer-Forming Coating Liquid B1 | ATO | 50 | 5 Weight Part | N-Vinyl Formamide | 71 | Methyl Ethyl Ketone | 50% | 80° C. | |
| Example B13 | Localized Layer-Forming Coating Liquid B10 | ATO | 50 | 5 Weight Part | — | — | Methyl Ethyl Ketone | 50% | 25° C. | 80° C. |
| Example B14 | Localized Layer-Forming Coating Liquid B11 | — | — | — | — | — | Methyl Ethyl Ketone | 50% | 25° C. | 80° C. |

For the resulting anti-reflection films of [Example B1] to [Example B14], evaluations were performed as described above, and the state of formation of each layer in the localized layer was checked. The evaluation results and the like are shown collectively in Table 4.

TABLE 4

| | Evaluation Item | | | | | | | | | | | | |
|---|---|---|---|---|---|---|---|---|---|---|---|---|---|
| | Luminous Reflectivity (%) | Haze (%) | Parallel Light Transmittance (%) | Surface Resistance Value (Ω/cm2) | Contact Angle (°) | | Color Variation and Interference Fringe | Abrasion Resistance (SW) | Pencil Hardness | State of Localized Layer Formation | | | |
| | | | | | Localized Layer Surface | Low-refractive Index Surface | | | | Intermediate Layer | Hard Coat Layer | Antistatic Layer | Leveling Layer |
| Example B1 | 1.0 | 0.1 | 95.0 | 1 × 10⁹ | 75 | 85 | ○ | ○ | 2H | ○ | ○ | ○ | ○ |
| Example B2 | 1.0 | 0.1 | 95.0 | 1 × 10⁹ | 75 | 85 | ○ | ○ | 2H | ○ | ○ | ○ | ○ |
| Example B3 | 1.0 | 0.1 | 95.0 | 1 × 10⁹ | 75 | 85 | ○ | ○ | 2H | ○ | ○ | ○ | ○ |
| Example B4 | 1.0 | 0.1 | 95.0 | 1 × 10¹³ | 75 | 85 | ○ | ○ | 2H | ○ | ○ | X | ○ |
| Example B5 | 1.0 | 5.0 | 95.5 | 2 × 10⁸ | 40 | 60 | ○ | X | 2H | ○ | ○ | ○ | X |
| Example B6 | 1.0 | 3.0 | 93.5 | 1 × 10⁹ | 50 | 50 | ○ | X | 2H | ○ | ○ | ○ | X |
| Example B7 | 1.0 | 0.1 | 95.0 | 1 × 10⁸ | 75 | 85 | X | ○ | 2H | X | ○ | ○ | X |
| Example B8 | 1.0 | 3.0 | 92.0 | 1 × 10⁸ | 40 | 60 | ○ | X | B | ○ | X | ○ | X |
| Example B9 | 1.0 | 3.0 | 92.0 | 5 × 10⁸ | 75 | 85 | X | ○ | 2H | X | ○ | X | X |
| Example B10 | 1.0 | 2.0 | 93.0 | 1 × 10¹³ | 60 | 85 | ○ | X | 2H | ○ | ○ | X | X |
| Example B11 | 1.0 | 0.1 | 95.0 | 1 × 10⁹ | 40 | 50 | ○ | X | B | ○ | X | ○ | X |
| Example B12 | 1.0 | 0.1 | 95.0 | 5 × 10¹³ | 60 | 85 | ○ | ○ | 2H | ○ | ○ | X | X |
| Example B13 | 1.0 | 5.0 | 93.0 | 5 × 10⁸ | 40 | 50 | ○ | X | 2H | ○ | ○ | ○ | — |
| Example B14 | 1.0 | 0.1 | 96.0 | 5 × 10¹³ | 70 | 85 | ○ | ○ | 2H | ○ | ○ | — | — |

(C) Leveling Material: Compound Having an Amide Group, and Conductive Material: a Conductive Polymer Hereinafter, Examples where a compound having an amide group is used as a leveling material, and a conductive polymer is used as a conductive material, are shown.

Hereinafter, Adjustment Examples of the coating liquids for forming a localized layer C1 to C9, are shown.

Adjustment Example C1

Coating fluid for forming localized layer C1

A mixture of

| | |
|---|---|
| polythiophene (100 nm of the average particle size/isopropyl alcohol dispersion liquid) (solid content) | 5 weight parts |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer C1.

Adjustment Example C2

Coating Fluid for Forming Localized Layer C2

A mixture of

| | |
|---|---|
| polythiophene (300 nm of the average particle size/isopropyl alcohol dispersion liquid) (solid content) | 5 weight parts |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer C2.

Adjustment Example C3

Coating Fluid for Forming Localized Layer C3

A mixture of

| | |
|---|---|
| polythiophene (100 nm of the average particle size/isopropyl alcohol dispersion liquid) (solid content) | 5 weight parts |
| N,N-diallyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer C3.

Adjustment Example C4

Coating Fluid for Forming Localized Layer C4

A mixture of

| | |
|---|---|
| polythiophene (100 nm of the average particle size/isopropyl alcohol dispersion liquid) (solid content) | 0.01 weight part |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer C4.

Adjustment Example C5

Coating Fluid for Forming Localized Layer C5

A mixture of

| | |
|---|---|
| polythiophene (100 nm of the average particle size/isopropyl alcohol dispersion liquid) (solid content) | 5 weight parts |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using isopropyl alcohol, which was taken as the coating liquid for forming a localized layer C5.

Adjustment Example C6

Coating Fluid for Forming Localized Layer C6

A mixture of

| | |
|---|---|
| polythiophene (100 nm of the average particle size/isopropyl alcohol dispersion liquid) (solid content) | 5 weight parts |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 20 wt % of the solid content using methyl ethyl ketone, which was taken as the coating liquid for forming a localized layer C6.

Adjustment Example C7

Coating Fluid for Forming Localized Layer C7

A mixture of

| | |
|---|---|
| polythiophene (100 nm of the average particle size/isopropyl alcohol dispersion liquid) (solid content) | 5 weight parts |
| N-vinyl formamide | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 90 wt % of the solid content using methyl ethyl ketone, which was taken as the coating liquid for forming a localized layer C7.

Adjustment Example C9

Coating Fluid for Forming Localized Layer C8

A mixture of

| | |
|---|---|
| polythiophene (100 nm of the average particle size/isopropyl alcohol dispersion liquid) (solid content) | 5 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer C8.

Adjustment Example C9

Coating Fluid for Forming Localized Layer C9

A mixture of

| | |
|---|---|
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer C9.

Hereinafter, Adjustment Example of the coating liquid for forming a low refractive index layer C, is shown.

(Coating Fluid for Forming Low Refractive Index Layer C)
A mixture of

| | |
|---|---|
| dispersion liquid of porous silica fine particles (50 nm of the average particle size/20 wt % of the solid content/methyl isobutyl ketone dispersion liquid) (solid content) | 2.5 weight parts |
| EO-modified dipentaerythritol hexaacrylate (trade name: DPEA-12, manufactured by NIPPO KAYAKU Co., Ltd.) | 2.5 weight parts |
| photopolymerization initiator (trade name: IRGACURE 184, manufactured by Ciba Specialty Chemicals Japan K.K.) | 0.1 weight part | was prepared, and this was prepared to a liquid having 5 wt % of the solid content using isopropyl alcohol, which was taken as the coating liquid for forming a low refractive index layer C.

Example C1

Formation of Localized Layer

Onto one surface of a triacetyl cellulose film (manufactured by FUJIFILM Corporation, film thickness: 80 μm), the coating liquid for forming a localized layer C1 was coated, and dried at 25° C. for 10 seconds in a drying oven for primary drying, and subsequently dried at 80° C. for 50 seconds in a drying oven for secondary drying, and then ultraviolet irradiation was performed using an ultraviolet irradiation apparatus (manufactured by Fusion UV Systems Japan K.K., light source: H bulb) at an irradiation dose of 300 mJ/m$^2$, whereby to form a transparent localized layer having a dry film thickness of 5 μm.

(Formation of Low Refractive Index Layer)

Onto the localized layer formed above, the coating liquid for forming a low refractive index layer C was coated such that the film thickness after drying became 100 nm. Primary drying was performed at a temperature of 25° C. for 25 seconds, and then secondary drying was performed at a temperature of 80° C. for 50 seconds, and then ultraviolet irradiation was performed at an irradiation dose of 192 mJ/m$^2$ using an ultraviolet irradiation apparatus (manufactured by Fusion UV Systems Japan K.K., light source: H bulb) to harden the film, whereby to form a low refractive index layer, and prepare the anti-reflection film of [Example C1].

[Example C2] to [Example C7]

In [Example C2] to [Example C7], the coating liquids for forming a localized layer C2 to C7 were used instead of the coating liquid for forming a localized layer C1, with other production conditions being similar to those of [Example C1], whereby to prepare the anti-reflection films of [Example C2] to [Example C7].

[Example C8] to [Example C10]

In [Example C8], the coating liquid for forming a localized layer C1 was used, and the localized layer was formed at 50° C. of the primary drying temperature and at 60° C. of the secondary drying temperature, with other production conditions being similar to those of [Example C1], whereby to prepare the anti-reflection film of [Example C8].

In [Example C9], the coating liquid for forming a localized layer C1 was used, and the localized layer was formed at 25° C. of both of the primary drying temperature and the secondary drying temperature, with other production conditions being similar to those of [Example C1], whereby to prepare the anti-reflection film of [Example C9].

In [Example C10], the coating liquid for forming a localized layer C1 was used, and the localized layer was formed at 80° C. of both of the primary drying temperature and the secondary drying temperature, with other production conditions being similar to those of [Example C1], whereby to prepare the anti-reflection film of [Example C10].

[Example C11] and [Example C12]

In [Example C11] and [Example C12], the coating liquids for forming a localized layer C8 and C9 were used instead of the coating liquid for forming a localized layer C1, with other production conditions being similar to those of [Example C1], whereby to prepare the anti-reflection films of [Example C11] and [Example C12].

The production conditions in [Example C1] to [Example C12] are shown collectively in Table 5.

TABLE 5

| | | Production Condition | | | | | | | | |
|---|---|---|---|---|---|---|---|---|---|---|
| | | Conductive Polymer | | | | Leveling Material | | Dilution Solvent | | Drying Temperature |
| | Forming Coating Liquid | Name of Material | Average Particle Size (nm) | Quantity | | Name of Material | Molecular Weight | Name of Material | Solid Content Adjustment | Primary Drying Temperature | Secondary Drying Temperature |
| Example C1 | Localized Layer-Forming Coating Liquid C1 | Polythiophene | 100 | 5 Weight Part | N-Vinyl Formamide | 71 | Methyl Ethyl Ketone | 50% | 25° C. | 80° C. |
| Example C2 | Localized Layer-Forming Coating Liquid C2 | Polythiophene | 300 | 5 Weight Part | N-Vinyl Formamide | 71 | Methyl Ethyl Ketone | 50% | 25° C. | 80° C. |
| Example C3 | Localized Layer-Forming Coating Liquid C3 | Polythiophene | 100 | 5 Weight Part | N,N-diallyl Formamide | 125 | Methyl Ethyl Ketone | 50% | 25° C. | 80° C. |

TABLE 5-continued

| | | Production Condition | | | | | | | | |
|---|---|---|---|---|---|---|---|---|---|---|
| | | Conductive Polymer | | | Leveling Material | | Dilution Solvent | | Drying Temperature | |
| | Forming Coating Liquid | Name of Material | Average Particle Size (nm) | Quantity | Name of Material | Molecular Weight | Name of Material | Solid Content Adjustment | Primary Drying Temperature | Secondary Drying Temperature |
| Example C4 | Localized Layer-Forming Coating Liquid C4 | Polythiophene | 100 | 0.01 Weight Part | N-Vinyl Formamide | 71 | Methyl Ethyl Ketone | 50% | 25° C. | 80° C. |
| Example C5 | Localized Layer-Forming Coating Liquid C5 | Polythiophene | 100 | 5 Weight Part | N-Vinyl Formamide | 71 | Isopropyl Alcohol | 50% | 25° C. | 80° C. |
| Example C6 | Localized Layer-Forming Coating Liquid C6 | Polythiophene | 100 | 5 Weight Part | N-Vinyl Formamide | 71 | Methyl Ethyl Ketone | 20% | 25° C. | 80° C. |
| Example C7 | Localized Layer-Forming Coating Liquid C7 | Polythiophene | 100 | 5 Weight Part | N-Vinyl Formamide | 71 | Methyl Ethyl Ketone | 90% | 25° C. | 80° C. |
| Example C8 | Localized Layer-Forming Coating Liquid C1 | Polythiophene | 100 | 5 Weight Part | N-Vinyl Formamide | 71 | Methyl Ethyl Ketone | 50% | 50° C. | 60° C. |
| Example C9 | Localized Layer-Forming Coating Liquid C1 | Polythiophene | 100 | 5 Weight Part | N-Vinyl Formamide | 71 | Methyl Ethyl Ketone | 50% | 25° C. | |
| Example C10 | Localized Layer-Forming Coating Liquid C1 | Polythiophene | 100 | 5 Weight Part | N-Vinyl Formamide | 71 | Methyl Ethyl Ketone | 50% | | 80° C. |
| Example C11 | Localized Layer-Forming Coating Liquid C8 | Polythiophene | 100 | 5 Weight Part | — | — | Methyl Ethyl Ketone | 50% | 25° C. | 80° C. |
| Example C12 | Localized Layer-Forming Coating Liquid C9 | — | — | — | — | — | Methyl Ethyl Ketone | 50% | 25° C. | 80° C. |

For the resulting anti-reflection films of [Example C1] to [Example C12], evaluations were performed as described above, and the state of formation of each layer in the localized layer was checked. The evaluation results and the like are shown collectively in Table 6.

TABLE 6

| | Evaluation Item | | | | | | | | | | | | |
|---|---|---|---|---|---|---|---|---|---|---|---|---|---|
| | Luminous Reflectivity (%) | Haze (%) | Parallel Light Transmittance (%) | Surface Resistance Value (Ω/cm2) | Contact Angle (°) | | Color Variation and Interference Fringe | Abrasion Resistance (SW) | Pencil Hardness | State of Localized Layer Formation | | | |
| | | | | | Localized Layer Surface | Low-refractive Index Surface | | | | Intermediate Layer | Hard Coat Layer | Antistatic Layer | Leveling Layer |
| Example C1 | 1.0 | 0.1 | 95.0 | $1 \times 10^9$ | 75 | 85 | ○ | ○ | 2H | ○ | ○ | ○ | ○ |
| Example C2 | 1.0 | 0.1 | 95.0 | $1 \times 10^9$ | 75 | 85 | ○ | ○ | 2H | ○ | ○ | ○ | ○ |
| Example C3 | 1.0 | 0.1 | 95.0 | $1 \times 10^9$ | 75 | 85 | ○ | ○ | 2H | ○ | ○ | ○ | ○ |
| Example C4 | 1.0 | 0.1 | 95.5 | $1 \times 10^{13}$ | 75 | 85 | ○ | ○ | 2H | ○ | ○ | X | ○ |
| Example C5 | 1.0 | 0.1 | 95.0 | $1 \times 10^8$ | 75 | 85 | X | ○ | 2H | X | ○ | ○ | ○ |
| Example C6 | 1.0 | 3.0 | 93.5 | $1 \times 10^8$ | 40 | 60 | ○ | X | B | ○ | X | ○ | X |
| Example C7 | 1.0 | 0.7 | 95.0 | $5 \times 10^8$ | 75 | 85 | X | ○ | 2H | X | ○ | X | X |
| Example C8 | 1.0 | 2.0 | 92.0 | $1 \times 10^{13}$ | 60 | 85 | ○ | X | 2H | ○ | ○ | X | X |
| Example C9 | 1.0 | 0.1 | 95.0 | $1 \times 10^9$ | 40 | 50 | ○ | X | B | ○ | X | ○ | X |

TABLE 6-continued

| | Evaluation Item | | | | | | | | | | State of Localized Layer Formation | | | |
|---|---|---|---|---|---|---|---|---|---|---|---|---|---|---|
| | Luminous Reflectivity (%) | Haze (%) | Parallel Light Transmittance (%) | Surface Resistance Value (Ω/cm2) | Contact Angle (°) Localized Layer Surface | Contact Angle (°) Low-refractive Index Surface | Color Variation and Interference Fringe | Abrasion Resistance (SW) | Pencil Hardness | Intermediate Layer | Hard Coat Layer | Antistatic Layer | Leveling Layer |
| Example C10 | 1.0 | 0.1 | 95.0 | $5 \times 10^{13}$ | 60 | 85 | ○ | ○ | 2H | ○ | ○ | X | X |
| Example C11 | 1.0 | 3.0 | 92.0 | $5 \times 10^{8}$ | 40 | 50 | ○ | X | 2H | ○ | ○ | ○ | — |
| Example C12 | 1.0 | 0.1 | 96.0 | $5 \times 10^{13}$ | 70 | 85 | ○ | ○ | 2H | ○ | ○ | — | — |

(D) Leveling Material: Compound Having an Acrylic Group, and Conductive Material: Quaternary Ammonium Salt Material Hereinafter, Examples where a compound having an acrylic group is used as a leveling material, and a quaternary ammonium salt material is used as the conductive material, are shown.

Hereinafter, Adjustment Examples of the coating liquids for forming a localized layer D1 to D12, are shown.

(Synthesis Example 1)

A four-necked flask equipped with stirring blades, a reflux cooling tube, a dry air introduction tube, and a thermometer, was charged with

| | |
|---|---|
| octylpolyethylene glycol polypropylene glycol methacrylate (trade name: "BLEMMER 50POEP-800B", manufactured by NOF CORPORATION) | 18.0 g |
| methacryloyl oxyethyltrimethyl ammonium chloride | 35.0 g |
| cyclohexyl methacrylate | 14.0 g |
| azobisisobutyronitrile | 0.3 g |
| isopropyl alcohol | 100.0 g |
| methyl ethyl ketone | 40.0 g | and polymerized at 65° C. for 3 hours under nitrogen atmosphere. After completion of the polymerization, the reaction liquid was put into hexane, and a product was precipitated, and then dried. The weight average molecular weight of the resulting quaternary ammonium salt material was 18500.

Adjustment Example D1

Coating Fluid for Forming Localized Layer D1

A mixture of

| | |
|---|---|
| quaternary ammonium salt material produced in Synthesis Example 1 (18500 of weight average molecular weight) | 10 weight parts |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer D1.

Adjustment Example D2

Coating Fluid for Forming Localized Layer D2

A mixture of

| | |
|---|---|
| NR-121X-9IPA (isopropyl alcohol dispersion liquid, manufactured by COLCOAT CO., Ltd.) (solid content) | 20 weight parts |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer D2.

Adjustment Example D3

Coating Fluid for Forming Localized Layer D3

A mixture of

| | |
|---|---|
| quaternary ammonium salt material produced in Synthesis Example 1 (18500 of weight average molecular weight) | 10 weight parts |
| BYK-394 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer D3.

Adjustment Example D4

Coating Fluid for Forming Localized Layer D4

A mixture of

| | |
|---|---|
| quaternary ammonium salt containing LIGHT ESTER DQ100 (trade name, manufactured by KYOEISHA CHEMICAL Co., LTD., weight average molecular weight 208) | 10 weight parts |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer D4.

Adjustment Example D5

Coating Fluid for Forming Localized Layer D5

A mixture of

| | |
|---|---|
| p-styrene sulfonic acid ammonium salt homopolymer (molecular weight: 120,000) | 10 weight parts |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer D5.

Adjustment Example D6

Coating Fluid for Forming Localized Layer D6

A mixture of

| | |
|---|---|
| quaternary ammonium salt material produced in Synthesis Example 1 (18500 of weight average molecular weight) | 0.01 weight part |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer D6.

Adjustment Example D7

Coating Fluid for Forming Localized Layer D7

A mixture of

| | |
|---|---|
| quaternary ammonium salt material produced in Synthesis Example 1 (18500 of weight average molecular weight) | 100 weight parts |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 20 wt % of the solid content using methyl ethyl ketone, which was taken as the coating liquid for forming a localized layer D7.

Adjustment Example D8

Coating Fluid for Forming Localized Layer D8

A mixture of

| | |
|---|---|
| quaternary ammonium salt material produced in Synthesis Example 1 (18500 of weight average molecular weight) | 10 weight parts |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using isopropyl alcohol, which was taken as the coating liquid for forming a localized layer D1.

Adjustment Example D9

Coating Fluid for Forming Localized Layer D9

A mixture of

| | |
|---|---|
| quaternary ammonium salt material produced in Synthesis Example 1 (18500 of weight average molecular weight) | 10 weight parts |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 20 wt % of the solid content using methyl ethyl ketone, which was taken as the coating liquid for forming a localized layer D9.

Adjustment Example D10

Coating Fluid for Forming Localized Layer D10

A mixture of

| | |
|---|---|
| quaternary ammonium salt material produced in Synthesis Example 1 (18500 of weight average molecular weight) | 10 weight parts |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 90 wt % of the solid content using methyl ethyl ketone, which was taken as the coating liquid for forming a localized layer D10.

Adjustment Example D11

Coating Fluid for Forming Localized Layer D11

A mixture of

| | |
|---|---|
| quaternary ammonium salt material produced in Synthesis Example 1 (18500 of weight average molecular weight) | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer 10.

Adjustment Example D12

Coating Fluid for Forming Localized Layer D12

A mixture of

| | |
|---|---|
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer D12.

Hereinafter, Adjustment Example of the coating liquid for forming a low refractive index layer D, is shown.

(Coating Fluid for Forming Low Refractive Index Layer D)

A mixture of

| | |
|---|---|
| dispersion liquid of porous silica fine particles (50 nm of the average particle size/20 wt % of the solid content/methyl isobutyl ketone dispersion liquid) (solid content) | 2.5 weight parts |
| EO-modified dipentaerythritol hexaacrylate (trade name: DPEA-12, manufactured by NIPPO KAYAKU Co., Ltd.) | 2.5 weight parts |
| photopolymerization initiator (trade name: IRGACURE 184, manufactured by Ciba Specialty Chemicals Japan K.K.) | 0.1 weight part | was prepared, and this was prepared to a liquid having 5 wt % of the solid content using isopropyl alcohol, which was taken as the coating liquid for forming a low refractive index layer D.

Example D1

Formation of Localized Layer

Onto one surface of a triacetyl cellulose film (manufactured by FUJIFILM Corporation, film thickness: 80 µm), the coating liquid for forming a localized layer D1 was coated, and dried at 25° C. for 10 seconds in a drying oven for primary drying, and subsequently dried at 80° C. for 50 seconds in a drying oven for secondary drying, and then ultraviolet irradiation was performed using an ultraviolet irradiation apparatus (manufactured by Fusion UV Systems Japan K.K., light source: H bulb) at an irradiation dose of 300 mJ/m$^2$, whereby to form a transparent localized layer having a dry film thickness of 5 µm.

(Formation of Low Refractive Index Layer)

Onto the localized layer formed above, the coating liquid for forming a low refractive index layer D was coated such that the film thickness after drying became 100 nm. Primary drying was performed at a temperature of 25° C. for 25 seconds, and then secondary drying was performed at a temperature of 80° C. for 50 seconds, and then ultraviolet irradiation was performed at an irradiation dose of 192 mJ/m$^2$ using an ultraviolet irradiation apparatus (manufactured by Fusion UV Systems Japan K.K., light source: H bulb) to harden the film, whereby to form a low refractive index layer, and prepare the anti-reflection film of [Example D1].

[Example D2] to [Example D10]

In [Example D2] to [Example D10], the coating liquids for forming a localized layer D2 to D10 were used instead of the coating liquid for forming a localized layer D1, with other production conditions being similar to those of [Example D1], whereby to prepare the anti-reflection film of [Example D2] to [Example D10].

[Example D11] to [Example D13]

In [Example D11], the coating liquid for forming a localized layer D1 was used, and the localized layer was formed at 50° C. of the primary drying temperature and at 60° C. of the secondary drying temperature, with other production conditions being similar to those of [Example D1], whereby to prepare the anti-reflection film of [Example D11].

In [Example D12], the coating liquid for forming a localized layer D1 was used, and the localized layer was formed at 25° C. of both of the primary drying temperature and the secondary drying temperature, with other production conditions being similar to those of [Example A1], whereby to prepare the anti-reflection film of [Example D12].

In [Example D13], the coating liquid for forming a localized layer D1 was used, and the localized layer was formed at 80° C. of both of the primary drying temperature and the secondary drying temperature, with other production conditions being similar to those of [Example D1], whereby to prepare the anti-reflection film of [Example D13].

[Example D14] and [Example D15]

In [Example D14] and [Example D15], the coating liquids for forming a localized layer D11 and D12 were used instead of the coating liquid for forming a localized layer D1, with other production conditions being similar to those of [Example D1], whereby to prepare the anti-reflection films of [Example D14] and [Example D15].

The production conditions in [Example D1] to [Example D15] are shown collectively in Table 7.

TABLE 7

| | | Production Condition | | | | | | | | |
|---|---|---|---|---|---|---|---|---|---|---|
| | | Quaternary Ammonium Salt Material | | | Leveling Material | | Dilution Solvent | Solid | Drying Temperature | |
| | | | | | | | | | Primary Drying | Secondary Drying |
| | Forming Coating Liquid | Name of Material | Molecular Weight | Quantity | Name of Material | Molecular Weight | Name of Material | Content Adjustment | Temperature | Temperature |
| Example D1 | Localized Layer-Forming Coating Liquid D1 | Synthesis Example 1 | 18500 | 10 Weight Part | BYK-350 | 15000 | Methyl Ethyl Ketone | 50% | 25° C. | 80° C. |
| Example D2 | Localized Layer-Forming Coating Liquid D2 | NR-121X-9IPA | 15000 | 20 Weight Part | BYK-350 | 15000 | Methyl Ethyl Ketone | 50% | 25° C. | 80° C. |
| Example D3 | Localized Layer-Forming Coating Liquid D3 | Synthesis Example 1 | 18500 | 10 Weight Part | BYK-352 | 40000 | Methyl Ethyl Ketone | 50% | 25° C. | 80° C. |
| Example D4 | Localized Layer-Forming Coating Liquid D4 | LIGHT ESTER DQ100 | 208 | 10 Weight Part | BYK-350 | 15000 | Methyl Ethyl Ketone | 50% | 25° C. | 80° C. |
| Example D5 | Localized Layer-Forming Coating Liquid D5 | Ammonium Salt Homopolymer | 120000 | 10 Weight Part | BYK-350 | 15000 | Methyl Ethyl Ketone | 50% | 25° C. | 80° C. |
| Example D6 | Localized Layer-Forming Coating Liquid D6 | Synthesis Example 1 | 18500 | 0.01 Weight Part | BYK-350 | 15000 | Methyl Ethyl Ketone | 50% | 25° C. | 80° C. |
| Example D7 | Localized Layer-Forming Coating Liquid D7 | Synthesis Example 1 | 18500 | 100 Weight Part | BYK-350 | 15000 | Methyl Ethyl Ketone | 50% | 25° C. | 80° C. |
| Example D8 | Localized Layer-Forming Coating Liquid D8 | Synthesis Example 1 | 18500 | 10 Weight Part | BYK-350 | 15000 | Isopropyl Alcohol | 50% | 25° C. | 80° C. |
| Example D9 | Localized Layer-Forming Coating Liquid D9 | Synthesis Example 1 | 18500 | 10 Weight Part | BYK-350 | 15000 | Methyl Ethyl Ketone | 20% | 25° C. | 80° C. |
| Example D10 | Localized Layer-Forming Coating Liquid D10 | Synthesis Example 1 | 18500 | 10 Weight Part | BYK-350 | 15000 | Methyl Ethyl Ketone | 90% | 25° C. | 80° C. |
| Example D11 | Localized Layer-Forming Coating Liquid D1 | Synthesis Example 1 | 18500 | 10 Weight Part | BYK-350 | 15000 | Methyl Ethyl Ketone | 50% | 50° C. | 60° C. |

TABLE 7-continued

| | | Quaternary Ammonium Salt Material | | | Leveling Material | | Dilution Solvent | Solid Content Adjustment | Drying Temperature | |
|---|---|---|---|---|---|---|---|---|---|---|
| | Forming Coating Liquid | Name of Material | Molecular Weight | Quantity | Name of Material | Molecular Weight | Name of Material | | Primary Drying Temperature | Secondary Drying Temperature |
| Example D12 | Localized Layer-Forming Coating Liquid D1 | Synthesis Example 1 | 18500 | 10 Weight Part | BYK-350 | 15000 | Methyl Ethyl Ketone | 50% | 25° C. | |
| Example D13 | Localized Layer-Forming Coating Liquid D1 | Synthesis Example 1 | 18500 | 10 Weight Part | BYK-350 | 15000 | Methyl Ethyl Ketone | 50% | 80° C. | |
| Example D14 | Localized Layer-Forming Coating Liquid D11 | Synthesis Example 1 | 18500 | 10 Weight Part | — | — | Methyl Ethyl Ketone | 50% | 25° C. | 80° C. |
| Example D15 | Localized Layer-Forming Coating Liquid D12 | — | — | — | — | — | Methyl Ethyl Ketone | 50% | 25° C. | 80° C. |

For the resulting anti-reflection films of [Example D1] to [Example D15], evaluations were performed as described above, and the state of formation of each layer in the localized layer was checked. The evaluation results and the like are shown collectively in Table 8.

TABLE 8

| | Evaluation Item | | | | | | | | | | | | |
|---|---|---|---|---|---|---|---|---|---|---|---|---|---|
| | Luminous Reflectivity (%) | Haze (%) | Parallel Light Transmittance (%) | Surface Resistance Value (Ω/cm2) | Contact Angle (°) | | Color Variation and Interference Fringe | Abrasion Resistance (SW) | Pencil Hardness | State of Localized Layer Formation | | | |
| | | | | | Localized Layer Surface | Low-refractive Index Surface | | | | Intermediate Layer | Hard Coat Layer | Anti-static Layer | Leveling Layer |
| Example D1 | 1.0 | 0.1 | 96.0 | $1 \times 10^9$ | 75 | 85 | ○ | ○ | 2H | ○ | ○ | ○ | ○ |
| Example D2 | 1.0 | 0.1 | 96.0 | $1 \times 10^9$ | 75 | 85 | ○ | ○ | 2H | ○ | ○ | ○ | ○ |
| Example D3 | 1.0 | 0.1 | 96.0 | $1 \times 10^9$ | 75 | 85 | ○ | ○ | 2H | ○ | ○ | ○ | ○ |
| Example D4 | 1.0 | 2.0 | 94.0 | $5 \times 10^8$ | 45 | 60 | ○ | X | 2H | ○ | ○ | ○ | X |
| Example D5 | 1.0 | 0.1 | 96.0 | $1 \times 10^{13}$ | 75 | 85 | ○ | ○ | 2H | ○ | ○ | X | ○ |
| Example D6 | 1.0 | 0.1 | 96.0 | $1 \times 10^{13}$ | 75 | 85 | ○ | ○ | 2H | ○ | ○ | X | ○ |
| Example D7 | 1.0 | 3.0 | 93.0 | $2 \times 10^8$ | 40 | 60 | ○ | X | 2H | ○ | ○ | ○ | X |
| Example D8 | 1.0 | 0.1 | 96.0 | $1 \times 10^8$ | 75 | 85 | X | ○ | 2H | X | ○ | ○ | ○ |
| Example D9 | 1.0 | 3.0 | 94.0 | $1 \times 10^8$ | 40 | 60 | ○ | X | B | ○ | X | ○ | X |
| Example D10 | 1.0 | 0.7 | 95.5 | $5 \times 10^8$ | 75 | 85 | X | X | 2H | X | ○ | X | X |
| Example D11 | 1.0 | 2.0 | 95.0 | $1 \times 10^{13}$ | 60 | 85 | ○ | X | 2H | ○ | ○ | X | X |
| Example D12 | 1.0 | 0.1 | 96.0 | $1 \times 10^9$ | 40 | 50 | ○ | X | B | ○ | X | ○ | X |
| Example D13 | 1.0 | 0.1 | 96.0 | $5 \times 10^{13}$ | 60 | 85 | ○ | ○ | 2H | ○ | ○ | X | X |
| Example D14 | 1.0 | 3.0 | 94.0 | $5 \times 10^8$ | 40 | 50 | ○ | X | 2H | ○ | ○ | ○ | — |
| Example D15 | 1.0 | 0.1 | 96.0 | $5 \times 10^{13}$ | 70 | 85 | ○ | ○ | 2H | ○ | ○ | — | — |

(E) Leveling Material: Compound Having an Acrylic Group, and Conductive Material: a Metal Oxide Particle Hereinafter, Examples where a compound having an acrylic group is used as a leveling material, and a metal oxide particle is used as the conductive material, are shown.

Hereinafter, Adjustment Examples of the coating liquids for forming a localized layer E1 to E11, are shown.

Adjustment Example E1

Coating Fluid for Forming Localized Layer E1

A mixture of

| | |
|---|---|
| antimony-containing tin oxide (50 nm of the average particle size/isopropyl alcohol dispersion liquid) (solid content) | 5 weight parts |

-continued

| | |
|---|---|
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer E1.

Adjustment Example E2

Coating Fluid for Forming Localized Layer E2

A mixture of

| | |
|---|---|
| phosphorus-containing tin oxide (50 nm of the average particle size/isopropyl alcohol dispersion liquid) (solid content) | 5 weight parts |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer E2.

Adjustment Example E3

Coating Fluid for Forming Localized Layer E3

A mixture of

| | |
|---|---|
| antimony-containing tin oxide (50 nm of the average particle size/isopropyl alcohol dispersion liquid) (solid content) | 5 weight parts |
| BYK-394 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer E3.

Adjustment Example E4

Coating Fluid for Forming Localized Layer E4

A mixture of

| | |
|---|---|
| antimony-containing tin oxide (50 nm of the average particle size/isopropyl alcohol dispersion liquid) (solid content) | 0.01 weight part |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer E4.

Adjustment Example E5

Coating Fluid for Forming Localized Layer E5

A mixture of

| | |
|---|---|
| antimony-containing tin oxide (50 nm of the average particle size/isopropyl alcohol dispersion liquid) (solid content) | 100 weight parts |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer E5.

Adjustment Example E6

Coating Fluid for Forming Localized Layer E6

A mixture of

| | |
|---|---|
| antimony-containing tin oxide (1,000 nm of the average particle size/isopropyl alcohol dispersion liquid) (solid content) | 5 weight parts |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer E6.

Adjustment Example E7

Coating Fluid for Forming Localized Layer E7

A mixture of

| | |
|---|---|
| antimony-containing tin oxide (50 nm of the average particle size/isopropyl alcohol dispersion liquid) (solid content) | 5 weight parts |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using isopropyl alcohol, which was taken as the coating liquid for forming a localized layer E7.

Adjustment Example E8

Coating Fluid for Forming Localized Layer E8

A mixture of

| | |
|---|---|
| antimony-containing tin oxide (50 nm of the average particle size/isopropyl alcohol dispersion liquid) (solid content) | 5 weight parts |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 20 wt % of the solid content using methyl ethyl ketone, which was taken as the coating liquid for forming a localized layer E8.

Adjustment Example E9

Coating Fluid for Forming Localized Layer E9

A mixture of

| | |
|---|---|
| antimony-containing tin oxide (50 nm of the average particle size/isopropyl alcohol dispersion liquid) (solid content) | 5 weight parts |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 90 wt % of the solid content using methyl ethyl ketone, which was taken as the coating liquid for forming a localized layer E9.

Adjustment Example E10

Coating Fluid for Forming Localized Layer E10

A mixture of

| | |
|---|---|
| antimony-containing tin oxide (50 nm of the average particle size/isopropyl alcohol dispersion liquid) (solid content) | 5 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer E10.

Adjustment Example E11

Coating Fluid for Forming Localized Layer E11

A mixture of

| | |
|---|---|
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer E11.

Hereinafter, Adjustment Example of the coating liquid for forming a low refractive index layer E, are shown.

(Coating Fluid for Forming Low Refractive Index Layer E)

A mixture of

| | |
|---|---|
| dispersion liquid of porous silica fine particles (50 nm of the average particle size/20 wt % of the solid content/methyl isobutyl ketone dispersion liquid) (solid content) | 2.5 weight parts |
| EO-modified dipentaerythritol hexaacrylate (trade name: DPEA-12, manufactured by NIPPO KAYAKU Co., Ltd.) | 2.5 weight parts |
| photopolymerization initiator (trade name: IRGACURE 184, manufactured by Ciba Specialty Chemicals Japan K.K.) | 0.1 weight part | was prepared, and this was prepared to a liquid having 5 wt % of the solid content using isopropyl alcohol, which was taken as the coating liquid for forming a low refractive index layer E.

Example E1

Formation of Localized Layer

Onto one surface of a triacetyl cellulose film (manufactured by FUJIFILM Corporation, film thickness: 80 μm), the coating liquid for forming a localized layer E1 was coated, and dried at 25° C. for 10 seconds in a drying oven for primary drying, and subsequently dried at 80° C. for 50 seconds in a drying oven for secondary drying, and then ultraviolet irradiation was performed using an ultraviolet irradiation apparatus (manufactured by Fusion UV Systems Japan K.K., light source: H bulb) at an irradiation dose of 300 mJ/m$^2$, whereby to form a transparent localized layer having a dry film thickness of 5 μm.

(Formation of Low Refractive Index Layer)

Onto the localized layer formed above, the coating liquid for forming a low refractive index layer E was coated such that the film thickness after drying became 100 nm. Primary drying was performed at a temperature of 25° C. for 25 seconds, and then secondary drying was performed at a temperature of 80° C. for 50 seconds, and then ultraviolet irradiation was performed at an irradiation dose of 192 mJ/m$^2$ using an ultraviolet irradiation apparatus (manufactured by Fusion UV Systems Japan K.K., light source: H bulb) to harden the film, whereby to form a low refractive index layer, and prepare the anti-reflection film of [Example E1].

[Example E2] to [Example E9]

In [Example E2] to [Example E9], the coating liquids for forming a localized layer E2 to E9 were used instead of the coating liquid for forming a localized layer E1, with other production conditions being similar to those of [Example E1], whereby to prepare the anti-reflection films of [Example E2] to [Example E9].

[Example E10] to [Example E12]

In [Example E10], the coating liquid for forming a localized layer E1 was used, and the localized layer was formed at 50° C. of the primary drying temperature and at 60° C. of the secondary drying temperature, with other production conditions being similar to those of [Example E1], whereby to prepare the anti-reflection film of [Example E10].

In [Example E11], the coating liquid for forming a localized layer E1 was used, and the localized layer was formed at 25° C. of both of the primary drying temperature and the secondary drying temperature, with other production conditions being similar to those of [Example E1], whereby to prepare the anti-reflection film of [Example E11].

In [Example E12], the coating liquid for forming a localized layer E1 was used, and the localized layer was formed at 80° C. of both of the primary drying temperature and the secondary drying temperature, with other production conditions being similar to those of [Example E1], whereby to prepare the anti-reflection film of [Example E12].

[Example E13] and [Example E14]

In [Example E13] and [Example E14], the coating liquids for forming a localized layer E10 and E11 were used instead of the coating liquid for forming a localized layer E1, with other production conditions being similar to those of [Example E1], whereby to prepare the anti-reflection films of [Example E13] and [Example E14].

The production conditions in [Example E1] to [Example E14] are shown collectively in Table 9.

TABLE 9

| | | Production Condition | | | | | | | | |
|---|---|---|---|---|---|---|---|---|---|---|
| | | Metal Oxide Particle | | | | Leveling Material | | Dilution Solvent | Drying Temperature | |
| | Forming Coating Liquid | Name of Material | Average Particle Size (nm) | Quantity | Name of Material | Molecular Weight | Name of Material | Solid Content Adjustment | Primary Drying Temperature | Secondary Drying Temperature |
| Example E1 | Localized Layer-Forming Coating Liquid E1 | ATO | 50 | 5 Weight Part | BYK-350 | 15000 | Methyl Ethyl Ketone | 50% | 25° C. | 80° C. |
| Example E2 | Localized Layer-Forming Coating Liquid E2 | PTO | 50 | 5 Weight Part | BYK-350 | 15000 | Methyl Ethyl Ketone | 50% | 25° C. | 80° C. |
| Example E3 | Localized Layer-Forming Coating Liquid E3 | ATO | 50 | 5 Weight Part | BYK-352 | 40000 | Methyl Ethyl Ketone | 50% | 25° C. | 80° C. |
| Example E4 | Localized Layer-Forming Coating Liquid E4 | ATO | 50 | 0.01 Weight Part | BYK-350 | 15000 | Methyl Ethyl Ketone | 50% | 25° C. | 80° C. |
| Example E5 | Localized Layer-Forming Coating Liquid E5 | ATO | 50 | 100 Weight Part | BYK-350 | 15000 | Methyl Ethyl Ketone | 50% | 25° C. | 80° C. |
| Example E6 | Localized Layer-Forming Coating Liquid E6 | ATO | 1000 | 5 Weight Part | BYK-350 | 15000 | Methyl Ethyl Ketone | 50% | 25° C. | 80° C. |
| Example E7 | Localized Layer-Forming | ATO | 50 | 5 Weight Part | BYK-350 | 15000 | Isopropyl Alcohol | 50% | 25° C. | 80° C. |

TABLE 9-continued

| | Forming Coating Liquid | Metal Oxide Particle Name of Material | Average Particle Size (nm) | Quantity | Leveling Material Name of Material | Molecular Weight | Dilution Solvent Name of Material | Solid Content Adjustment | Primary Drying Temperature | Secondary Drying Temperature |
|---|---|---|---|---|---|---|---|---|---|---|
| | Coating Liquid E7 | | | | | | | | | |
| Example E8 | Localized Layer-Forming Coating Liquid E8 | ATO | 50 | 5 Weight Part | BYK-350 | 15000 | Methyl Ethyl Ketone | 20% | 25° C. | 80° C. |
| Example E9 | Localized Layer-Forming Coating Liquid E9 | ATO | 50 | 5 Weight Part | BYK-350 | 15000 | Methyl Ethyl Ketone | 90% | 25° C. | 80° C. |
| Example E10 | Localized Layer-Forming Coating Liquid E1 | ATO | 50 | 5 Weight Part | BYK-350 | 15000 | Methyl Ethyl Ketone | 50% | 50° C. | 60° C. |
| Example E11 | Localized Layer-Forming Coating Liquid E1 | ATO | 50 | 5 Weight Part | BYK-350 | 15000 | Methyl Ethyl Ketone | 50% | 25° C. | |
| Example E12 | Localized Layer-Forming Coating Liquid E1 | ATO | 50 | 5 Weight Part | BYK-350 | 15000 | Methyl Ethyl Ketone | 50% | 80° C. | |
| Example E13 | Localized Layer-Forming Coating Liquid E10 | ATO | 50 | 5 Weight Part | — | — | Methyl Ethyl Ketone | 50% | 25° C. | 80° C. |
| Example E14 | Localized Layer-Forming Coating Liquid E11 | — | — | — | — | — | Methyl Ethyl Ketone | 50% | 25° C. | 80° C. |

For the resulting anti-reflection films of [Example E1] to [Example E14], evaluations were performed as described above, and the state of formation of each layer in the localized layer was checked. The evaluation results and the like are shown collectively in Table 10.

(F) Leveling Material: Compound Having an Acrylic Group, and Conductive Material: Quaternary Ammonium Salt Hereinafter, Examples where a compound having an acrylic group is used as a leveling material, and a conductive polymer is used as a conductive material, are shown.

TABLE 10

| | Evaluation Item | | | | | | | | | | | | |
|---|---|---|---|---|---|---|---|---|---|---|---|---|---|
| | Luminous Reflectivity (%) | Haze (%) | Parallel Light Transmittance (%) | Surface Resistance Value (Ω/cm2) | Contact Angle (°) Localized Layer Surface | Contact Angle (°) Low-refractive Index Surface | Color Variation and Interference Fringe | Abrasion Resistance (SW) | Pencil Hardness | State of Localized Layer Formation Intermediate Layer | Hard Coat Layer | Antistatic Layer | Leveling Layer |
| Example E1 | 1.0 | 0.1 | 95.0 | $1 \times 10^9$ | 75 | 85 | ○ | ○ | 2H | ○ | ○ | ○ | ○ |
| Example E2 | 1.0 | 0.1 | 95.0 | $1 \times 10^9$ | 75 | 85 | ○ | ○ | 2H | ○ | ○ | ○ | ○ |
| Example E3 | 1.0 | 0.1 | 95.0 | $1 \times 10^9$ | 75 | 85 | ○ | ○ | 2H | ○ | ○ | ○ | ○ |
| Example E4 | 1.0 | 0.1 | 95.0 | $1 \times 10^{13}$ | 75 | 85 | ○ | ○ | 2H | ○ | ○ | X | ○ |
| Example E5 | 1.0 | 5.0 | 95.5 | $2 \times 10^8$ | 40 | 60 | ○ | X | 2H | ○ | ○ | ○ | X |
| Example E6 | 1.0 | 3.0 | 93.5 | $1 \times 10^9$ | 50 | 50 | ○ | X | 2H | ○ | ○ | ○ | X |
| Example E7 | 1.0 | 0.1 | 95.0 | $1 \times 10^8$ | 75 | 85 | X | ○ | 2H | X | ○ | ○ | ○ |
| Example E8 | 1.0 | 3.0 | 92.0 | $1 \times 10^8$ | 40 | 60 | ○ | X | B | ○ | X | ○ | X |
| Example E9 | 1.0 | 3.0 | 92.0 | $5 \times 10^8$ | 75 | 85 | X | ○ | 2H | X | ○ | X | X |
| Example E10 | 1.0 | 2.0 | 93.0 | $1 \times 10^{13}$ | 60 | 85 | ○ | X | 2H | ○ | ○ | X | X |
| Example E11 | 1.0 | 0.1 | 95.0 | $1 \times 10^9$ | 40 | 50 | ○ | X | B | ○ | X | ○ | X |
| Example E12 | 1.0 | 0.1 | 95.0 | $5 \times 10^{13}$ | 60 | 85 | ○ | ○ | 2H | ○ | ○ | X | X |
| Example E13 | 1.0 | 5.0 | 93.0 | $5 \times 10^8$ | 40 | 50 | ○ | X | 2H | ○ | ○ | ○ | — |
| Example E14 | 1.0 | 0.1 | 96.0 | $5 \times 10^{13}$ | 70 | 85 | ○ | ○ | 2H | ○ | ○ | — | — |

Hereinafter, Adjustment Examples of the coating liquids for forming a localized layer F1 to F10, are shown.

Adjustment Example F1

Coating Fluid for Forming Localized Layer F1

A mixture of

| | |
|---|---|
| polythiophene (100 nm of the average particle size/isopropyl alcohol dispersion liquid) (solid content) | 5 weight parts |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer F1.

Adjustment Example F2

Coating Fluid for Forming Localized Layer F2

A mixture of

| | |
|---|---|
| polyaniline (75 nm of the average particle size/isopropyl alcohol dispersion liquid) (solid content) | 5 weight parts |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer F2.

Adjustment Example F3

Coating Fluid for Forming Localized Layer F3

A mixture of

| | |
|---|---|
| polythiophene (300 nm of the average particle size/isopropyl alcohol dispersion liquid) (solid content) | 5 weight parts |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer F3.

Adjustment Example F4

Coating Fluid for Forming Localized Layer F4

A mixture of

| | |
|---|---|
| polythiophene (100 nm of the average particle size/isopropyl alcohol dispersion liquid) (solid content) | 5 weight parts |
| BYK-394 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer F4.

Adjustment Example F5

Coating Fluid for Forming Localized Layer F5

A mixture of

| | |
|---|---|
| polythiophene (100 nm of the average particle size/isopropyl alcohol dispersion liquid) (solid content) | 0.01 weight part |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer F5.

Adjustment Example F6

Coating Fluid for Forming Localized Layer F6

A mixture of

| | |
|---|---|
| polythiophene (100 nm of the average particle size/isopropyl alcohol dispersion liquid) (solid content) | 5 weight parts |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using isopropyl alcohol, which was taken as the coating liquid for forming a localized layer F6.

Adjustment Example F7

Coating Fluid for Forming Localized Layer F7

A mixture of

| | |
|---|---|
| polythiophene (100 nm of the average particle size/isopropyl alcohol dispersion liquid) (solid content) | 5 weight parts |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 20 wt % of the solid content using methyl ethyl ketone, which was taken as the coating liquid for forming a localized layer F7.

Adjustment Example F8

Coating Fluid for Forming Localized Layer F8

A mixture of

| | |
|---|---|
| polythiophene (100 nm of the average particle size/isopropyl alcohol dispersion liquid) (solid content) | 5 weight parts |
| BYK-350 (manufactured by BYK-Chemie Japan) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 90 wt % of the solid content using methyl ethyl ketone, which was taken as the coating liquid for forming a localized layer F8.

Adjustment Example F9

Coating Fluid for Forming Hard Coat Layer F9

A mixture of

| | |
|---|---|
| polythiophene (100 nm of the average particle size/isopropyl alcohol dispersion liquid) (solid content) | 5 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer F9.

Adjustment Example F10

Coating Fluid for Forming Localized Layer F10

A mixture of

| | |
|---|---|
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer F10.

Hereinafter, Adjustment Example of the coating liquid for forming a low refractive index layer F, is shown.

(Coating Fluid for Forming Low Refractive Index Layer F)

A mixture of

| | |
|---|---|
| dispersion liquid of porous silica fine particles (50 nm of the average particle size/20 wt % of the solid content/methyl isobutyl ketone dispersion liquid) (solid content) | 2.5 weight parts |
| EO-modified dipentaerythritol hexaacrylate (trade name: DPEA-12, manufactured by NIPPO KAYAKU Co., Ltd.) | 2.5 weight parts |
| photopolymerization initiator (trade name: IRGACURE 184, manufactured by Ciba Specialty Chemicals Japan K.K.) | 0.1 weight part | was prepared, and this was prepared to a liquid having wt % of the solid content using isopropyl alcohol, which was taken as the coating liquid for forming a low refractive index layer F.

Example F1

Formation of Localized Layer

Onto one surface of a triacetyl cellulose film (manufactured by FUJIFILM Corporation, film thickness: 80 µm), the coating liquid for forming a localized layer F1 was coated, and dried at 25° C. for 10 seconds in a drying oven for primary drying, and subsequently dried at 80° C. for 50 seconds in a drying oven for secondary drying, and then ultraviolet irradiation was performed using an ultraviolet irradiation apparatus (manufactured by Fusion UV Systems Japan K.K., light source: H bulb) at an irradiation dose of 300 mJ/m², whereby to form a transparent localized layer having a dry film thickness of 5 µm.
(Formation of Low Refractive Index Layer)

Onto the localized layer formed above, the coating liquid for forming a low refractive index layer F was coated such that the film thickness after drying became 100 nm. Primary drying was performed at a temperature of 25° C. for 25 seconds, and then secondary drying was performed at a temperature of 80° C. for 50 seconds, and then ultraviolet irradiation was performed at an irradiation dose of 192 mJ/m² using an ultraviolet irradiation apparatus (manufactured by Fusion UV Systems Japan K.K., light source: H bulb) to harden the film, whereby to form a low refractive index layer, and prepare the anti-reflection film of [Example F1].

[Example F2] to [Example F8]

In [Example F2] to [Example F8], the coating liquids for forming a localized layer F2 to F8 were used instead of the coating liquid for forming a localized layer F1, with other production conditions being similar to those of [Example F1], whereby to prepare the anti-reflection films of [Example F2] to [Example F8].

[Example F9] to [Example F11]

In [Example F9], the coating liquid for forming a localized layer F1 was used, and the localized layer was formed at 50° C. of the primary drying temperature and at 60° C. of the secondary drying temperature, with other production conditions being similar to those of [Example F1], whereby to prepare the anti-reflection film of [Example F9].

In [Example F10], the coating liquid for forming a localized layer F1 was used, and the localized layer was formed at 25° C. of both of the primary drying temperature and the secondary drying temperature, with other production conditions being similar to those of [Example F1], whereby to prepare the anti-reflection film of [Example F10].

In [Example F11], the coating liquid for forming a localized layer F1 was used, and the localized layer was formed at 80° C. of both of the primary drying temperature and the secondary drying temperature, with other production conditions being similar to those of [Example F1], whereby to prepare the anti-reflection film of [Example F11].

[Example F12] and [Example F13]

In [Example F12] and [Example F13], the coating liquids for forming a localized layer F9 and F10 were used instead of the coating liquid for forming a localized layer F1, with other production conditions being similar to those of [Example F1], whereby to prepare the anti-reflection films of [Example F12] and [Example F13].

The production conditions in [Example F1] to [Example F13] are shown collectively in Table 11.

TABLE 11

| | | Production Condition | | | | | | | | |
|---|---|---|---|---|---|---|---|---|---|---|
| | | Conductive Polymer | | | | Leveling Material | | Dilution Solvent | | Drying Temperature |
| | Forming Coating Liquid | Name of Material | Average Particle Size (nm) | Quantity | Name of Material | Molecular Weight | Name of Material | Solid Content Adjustment | Primary Drying Temperature | Secondary Drying Temperature |
| Example F1 | Localized Layer-Forming Coating Liquid F1 | Polythiophene | 100 | 5 Weight Part | BYK-350 | 15000 | Methyl Ethyl Ketone | 50% | 25° C. | 80° C. |
| Example F2 | Localized Layer-Forming Coating Liquid F2 | Polyaniline | 75 | 5 Weight Part | BYK-350 | 15000 | Methyl Ethyl Ketone | 50% | 25° C. | 80° C. |
| Example F3 | Localized Layer-Forming Coating Liquid F3 | Polythiophene | 300 | 5 Weight Part | BYK-350 | 15000 | Methyl Ethyl Ketone | 50% | 25° C. | 80° C. |
| Example F4 | Localized Layer-Forming Coating Liquid F4 | Polythiophene | 100 | 5 Weight Part | BYK-352 | 40000 | Methyl Ethyl Ketone | 50% | 25° C. | 80° C. |
| Example F5 | Localized Layer-Forming Coating Liquid F5 | Polythiophene | 100 | 0.01 Weight Part | BYK-350 | 15000 | Methyl Ethyl Ketone | 50% | 25° C. | 80° C. |
| Example F6 | Localized Layer-Forming | Polythiophene | 100 | 5 Weight Part | BYK-350 | 15000 | Isopropyl Alcohol | 50% | 25° C. | 80° C. |

TABLE 11-continued

| | | Production Condition | | | | | | | | |
|---|---|---|---|---|---|---|---|---|---|---|
| | | Conductive Polymer | | | Leveling Material | | Dilution Solvent | | Drying Temperature | |
| | | | Average | | | | | Solid | Primary | Secondary |
| | | | Particle | | | | | | Drying | Drying |
| | Forming | Name of | Size | | Name of | Molecular | Name of | Content | Temper- | Temper- |
| | Coating Liquid | Material | (nm) | Quantity | Material | Weight | Material | Adjustment | ature | ature |
| Example F7 | Coating Liquid F6 Localized Layer-Forming Coating Liquid F7 | Polythiophene | 100 | 5 Weight Part | BYK-350 | 15000 | Methyl Ethyl Ketone | 20% | 25° C. | 80° C. |
| Example F8 | Localized Layer-Forming Coating Liquid F8 | Polythiophene | 100 | 5 Weight Part | BYK-350 | 15000 | Methyl Ethyl Ketone | 90% | 25° C. | 80° C. |
| Example F9 | Localized Layer-Forming Coating Liquid F1 | Polythiophene | 100 | 5 Weight Part | BYK-350 | 15000 | Methyl Ethyl Ketone | 50% | 50° C. | 60° C. |
| Example F10 | Localized Layer-Forming Coating Liquid F1 | Polythiophene | 100 | 5 Weight Part | BYK-350 | 15000 | Methyl Ethyl Ketone | 50% | 25° C. | |
| Example F11 | Localized Layer-Forming Coating Liquid F1 | Polythiophene | 100 | 5 Weight Part | BYK-350 | 15000 | Methyl Ethyl Ketone | 50% | 80° C. | |
| Example F12 | Localized Layer-Forming Coating Liquid F9 | Polythiophene | 100 | ○ | — | — | Methyl Ethyl Ketone | 50% | 25° C. | 80° C. |
| Example F13 | Localized Layer-Forming Coating Liquid F10 | — | — | — | — | — | Methyl Ethyl Ketone | 50% | 25° C. | 80° C. |

For the resulting anti-reflection films of [Example F1] to [Example F13], evaluations were performed as described above, and the state of formation of each layer in the localized layer was checked. The evaluation results and the like are shown collectively in Table 12.

TABLE 12

| | Evaluation Item | | | | | | | | | | | | |
|---|---|---|---|---|---|---|---|---|---|---|---|---|---|
| | | | | | | Contact Angle (°) | | Color Variation | | | | State of Localized Layer | |
| | Luminous | | Parallel Light | Surface | | Low- | and | Abrasion | | | Formation | | |
| | Reflec- tivity (%) | Haze (%) | Transmit- tance (%) | Resis- tance Value ($\Omega/cm^2$) | Localized Layer Surface | refractive Index Surface | Interfer- ence Fringe | Resis- tance (SW) | Pencil Hard- ness | Inter- mediate Layer | Hard Coat Layer | Anti- static Layer | Level- ing Layer |
| Example F1 | 1.0 | 0.1 | 95.0 | $1 \times 10^9$ | 75 | 85 | ○ | ○ | 2H | ○ | ○ | ○ | ○ |
| Example F2 | 1.0 | 0.1 | 95.0 | $1 \times 10^9$ | 75 | 85 | ○ | ○ | 2H | ○ | ○ | ○ | ○ |
| Example F3 | 1.0 | 0.1 | 95.0 | $1 \times 10^9$ | 75 | 85 | ○ | ○ | 2H | ○ | ○ | ○ | ○ |
| Example F4 | 1.0 | 0.1 | 95.0 | $1 \times 10^9$ | 75 | 85 | ○ | ○ | 2H | ○ | ○ | ○ | ○ |
| Example F5 | 1.0 | 0.1 | 95.5 | $1 \times 10^{13}$ | 75 | 85 | ○ | ○ | 2H | ○ | ○ | X | ○ |
| Example F6 | 1.0 | 0.1 | 95.0 | $1 \times 10^8$ | 75 | 85 | X | ○ | 2H | X | ○ | ○ | ○ |
| Example F7 | 1.0 | 3.0 | 93.5 | $1 \times 10^8$ | 40 | 60 | ○ | X | B | ○ | X | ○ | X |
| Example F8 | 1.0 | 0.7 | 95.0 | $5 \times 10^8$ | 75 | 85 | X | ○ | 2H | X | ○ | X | X |
| Example F9 | 1.0 | 2.0 | 92.0 | $1 \times 10^{13}$ | 60 | 85 | ○ | X | 2H | ○ | ○ | X | X |
| Example F10 | 1.0 | 0.1 | 95.0 | $1 \times 10^9$ | 40 | 50 | ○ | X | B | X | ○ | ○ | X |
| Example F11 | 1.0 | 0.1 | 95.0 | $5 \times 10^{13}$ | 60 | 85 | ○ | ○ | 2H | ○ | ○ | X | X |
| Example F12 | 1.0 | 3.0 | 92.0 | $5 \times 10^8$ | 40 | 50 | ○ | X | 2H | ○ | ○ | ○ | — |
| Example F13 | 1.0 | 0.1 | 96.0 | $5 \times 10^{13}$ | 70 | 85 | ○ | ○ | 2H | ○ | ○ | — | — |

(G) Leveling Material: Compound Having a Butadiene Group, and Conductive Material: Quaternary Ammonium Salt Material Hereinafter, Examples where a compound having a butadiene group is used as a leveling material, and a quaternary ammonium salt material is used as the conductive material, are shown.

Hereinafter, Adjustment Examples of the coating liquids for forming a localized layer G1 to G11, are shown.

Synthesis Example 1

A four-necked flask equipped with stirring blades, a reflux cooling tube, a dry air introduction tube, and a thermometer, was charged with

| | |
|---|---|
| octylpolyethylene glycol polypropylene glycol methacrylate (trade name: "BLEMMER 50POEP-800B", manufactured by NOF CORPORATION) | 18.0 g |
| methacryloyl oxyethyltrimethyl ammonium chloride | 35.0 g |
| cyclohexyl methacrylate | 14.0 g |
| azobisisobutyronitrile | 0.3 g |
| isopropyl alcohol | 100.0 g |
| methyl ethyl ketone | 40.0 g | and polymerized at 65° C. for 3 hours under nitrogen atmosphere. After completion of the polymerization, the reaction liquid was put into hexane, and a product was precipitated, and then dried. The weight average molecular weight of the resulting quaternary ammonium salt material was 18500.

Adjustment Example G1

Coating Fluid for Forming Localized Layer G1

A mixture of

| | |
|---|---|
| quaternary ammonium salt material produced in Synthesis Example 1 (18500 of weight average molecular weight) | 10 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer G1.

Adjustment Example G2

Coating Fluid for Forming Localized Layer G2

A mixture of

| | |
|---|---|
| NR-121X-9IPA (isopropyl alcohol dispersion liquid, manufactured by COLCOAT CO., Ltd.) (solid content) | 20 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer G2.

Adjustment Example G3

Coating Fluid for Forming Localized Layer C3

A mixture of

| | |
|---|---|
| quaternary ammonium salt containing LIGHT ESTER DQ100 (trade name, manufactured by KYOEISHA CHEMICAL Co., LTD., molecular weight 208) | 10 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer C3.

Adjustment Example G4

Coating Fluid for Forming Localized Layer G4

A mixture of

| | |
|---|---|
| p-styrene sulfonic acid ammonium salt homopolymer (molecular weight: 120,000) | 10 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer G4.

Adjustment Example G5

Coating Fluid for Forming Localized Layer G5

A mixture of

| | |
|---|---|
| quaternary ammonium salt material produced in Synthesis Example 1 (18500 of weight average molecular weight) | 0.01 weight part |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer G5.

Adjustment Example G6

Coating Fluid for Forming Localized Layer G6

A mixture of

| | |
|---|---|
| quaternary ammonium salt material produced in Synthesis Example 1 (18500 of weight average molecular weight) | 100 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer G6.

Adjustment Example G7

Coating Fluid for Forming Localized Layer G7

A mixture of

| | |
|---|---|
| quaternary ammonium salt material produced in Synthesis Example 1 (18500 of weight average molecular weight) | 10 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using isopropyl alcohol, which was taken as the coating liquid for forming a localized layer G7.

Adjustment Example G8

Coating Fluid for Forming Localized Layer G8

A mixture of

| | |
|---|---|
| quaternary ammonium salt material produced in Synthesis Example 1 (18500 of weight average molecular weight) | 10 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 20 wt % of the solid content using methyl ethyl ketone, which was taken as the coating liquid for forming a localized layer G8.

Adjustment Example G9

Coating Fluid for Forming Localized Layer G9

A mixture of

| | |
|---|---|
| quaternary ammonium salt material produced in Synthesis Example 1 (18500 of weight average molecular weight) | 10 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 90 wt % of the solid content using methyl ethyl ketone, which was taken as the coating liquid for forming a localized layer G9.

Adjustment Example G10

Coating Fluid for Forming Localized Layer G10

A mixture of

| | |
|---|---|
| quaternary ammonium salt material produced in Synthesis Example 1 (18500 of weight average molecular weight) | 10 weight parts |
| dipentaerythritol triacrylate | 50 weight parts |
| pentaerythritol tetraacrylate | 50 weight parts |

-continued

| | |
|---|---|
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)
was prepared, and this was prepared to a liquid having 50 wt % of the solid content using methyl ethyl ketone, which was taken as the coating liquid for forming a localized layer G10.

Adjustment Example G11

Coating Fluid for Forming Localized Layer G11

A mixture of

| | |
|---|---|
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)
was prepared, and this was prepared to a liquid having 50 wt % of the solid content using methyl ethyl ketone, which was taken as the coating liquid for forming a localized layer G11.

Hereinafter, Adjustment Example of the coating liquid for forming a low refractive index layer G, are shown.
(Coating Fluid for Forming Low Refractive Index Layer G)
A mixture of

| | |
|---|---|
| dispersion liquid of porous silica fine particles (50 nm of the average particle size/20 wt % of the solid content/methyl isobutyl ketone dispersion liquid) (solid content) | 2.5 weight parts |
| EO-modified dipentaerythritol hexaacrylate (trade name: DPEA-12, manufactured by NIPPO KAYAKU Co., Ltd.) | 2.5 weight parts |
| photopolymerization initiator (trade name: IRGACURE 184, manufactured by Ciba Specialty Chemicals Japan K.K.) | 0.1 weight part | was prepared, and this was prepared to a liquid having 5 wt % of the solid content using isopropyl alcohol, which was taken as the coating liquid for forming a low refractive index layer G.

Example G1

Formation of Localized Layer

Onto one surface of a triacetyl cellulose film (manufactured by FUJIFILM Corporation, film thickness: 80 μm), the coating liquid for forming a localized layer G1 was coated, and dried at 25° C. for 10 seconds in a drying oven for primary drying, and subsequently dried at 80° C. for 50 seconds in a drying oven for secondary drying, and then ultraviolet irradiation was performed using an ultraviolet irradiation apparatus (manufactured by Fusion UV Systems Japan K.K., light source: H bulb) at an irradiation dose of 300 mJ/m$^2$, whereby to form a transparent localized layer having a dry film thickness of 5 μm.

(Formation of Low Refractive Index Layer)

Onto the localized layer formed above, the coating liquid for forming a low refractive index layer G was coated such that the film thickness after drying became 100 nm. Primary drying was performed at a temperature of 25° C. for 25 seconds, and then secondary drying was performed at a temperature of 80° C. for 50 seconds, and then ultraviolet irradiation was performed at an irradiation dose of 192 mJ/m$^2$ using an ultraviolet irradiation apparatus (manufactured by Fusion UV Systems Japan K.K., light source: H bulb) to harden the film, whereby to form a low refractive index layer, and prepare the anti-reflection film of [Example G1].

[Example G2] to [Example G9]

In [Example G2] to [Example G9], the coating liquids for forming a localized layer G2 to G9 were used instead of the coating liquid for forming a localized layer G1, with other production conditions being similar to those of [Example G1], whereby to prepare the anti-reflection films of [Example G2] to [Example G9].

[Example G10] to [Example G12]

In [Example G10], the coating liquid for forming a localized layer G1 was used, and the localized layer was formed at 50° C. of the primary drying temperature and at 60° C. of the secondary drying temperature, with other production conditions being similar to those of [Example G1], whereby to prepare the anti-reflection film of [Example G10].

In [Example G11], the coating liquid for forming a localized layer G1 was used, and the localized layer was formed at 25° C. of both of the primary drying temperature and the secondary drying temperature, with other production conditions being similar to those of [Example G1], whereby to prepare the anti-reflection film of [Example G11].

In [Example G12], the coating liquid for forming a localized layer G1 was used, and the localized layer was formed at 80° C. of both of the primary drying temperature and the secondary drying temperature, with other production conditions being similar to those of [Example G1], whereby to prepare the anti-reflection film of [Example G12].

[Example G13] and [Example G14]

In [Example G13] and [Example G14], the coating liquids for forming a localized layer G10 and G11 were used instead of the coating liquid for forming a localized layer G1, with other production conditions being similar to those of [Example G1], whereby to prepare the anti-reflection films of [Example G13] and [Example G14].

The production conditions in [Example G1] to [Example G14] are shown collectively in Table 13.

TABLE 13

| | | Quaternary Ammonium Salt Material | | | Leveling Material | | Dilution Solvent | | Drying Temperature | |
|---|---|---|---|---|---|---|---|---|---|---|
| | | | | | | | | Solid | Primary Drying | Secondary Drying |
| | Forming Coating Liquid | Name of Material | Molecular Weight | Quantity | Name of Material | Molecular Weight | Name of Material | Content Adjustment | Temperature | Temperature |
| Example G1 | Localized Layer-Forming Coating Liquid G1 | Synthesis Example 1 | 18500 | 10 Weight Part | FLOREN AC2000 | 11000 | Methyl Ethyl Ketone | 50% | 25° C. | 80° C. |
| Example G2 | Localized Layer-Forming Coating Liquid G2 | NR-121X-9IPA | 15000 | 20 Weight Part | FLOREN AC2000 | 11000 | Methyl Ethyl Ketone | 50% | 25° C. | 80° C. |
| Example G3 | Localized Layer-Forming Coating Liquid G3 | LIGHT ESTER DQ100 | 208 | 10 Weight Part | FLOREN AC2000 | 11000 | Methyl Ethyl Ketone | 50% | 25° C. | 80° C. |
| Example G4 | Localized Layer-Forming Coating Liquid G4 | Ammonium Salt Homopolymer | 120000 | 10 Weight Part | FLOREN AC2000 | 11000 | Methyl Ethyl Ketone | 50% | 25° C. | 80° C. |
| Example G5 | Localized Layer-Forming Coating Liquid G5 | Synthesis Example 1 | 18500 | 0.01 Weight Part | FLOREN AC2000 | 11000 | Methyl Ethyl Ketone | 50% | 25° C. | 80° C. |
| Example G6 | Localized Layer-Forming Coating Liquid G6 | Synthesis Example 1 | 18500 | 100 Weight Part | FLOREN AC2000 | 11000 | Methyl Ethyl Ketone | 50% | 25° C. | 80° C. |
| Example G7 | Localized Layer-Forming Coating Liquid G7 | Synthesis Example 1 | 18500 | 10 Weight Part | FLOREN AC2000 | 11000 | Isopropyl Alcohol | 50% | 25° C. | 80° C. |
| Example G8 | Localized Layer-Forming Coating Liquid G8 | Synthesis Example 1 | 18500 | 10 Weight Part | FLOREN AC2000 | 11000 | Methyl Ethyl Ketone | 20% | 25° C. | 80° C. |
| Example G9 | Localized Layer-Forming Coating Liquid G9 | Synthesis Example 1 | 18500 | 10 Weight Part | FLOREN AC2000 | 11000 | Methyl Ethyl Ketone | 90% | 25° C. | 80° C. |
| Example G10 | Localized Layer-Forming Coating Liquid G1 | Synthesis Example 1 | 18500 | 10 Weight Part | FLOREN AC2000 | 11000 | Methyl Ethyl Ketone | 50% | 50° C. | 60° C. |
| Example G11 | Localized Layer-Forming Coating Liquid G1 | Synthesis Example 1 | 18500 | 10 Weight Part | FLOREN AC2000 | 11000 | Methyl Ethyl Ketone | 50% | 25° C. | |
| Example G12 | Localized Layer-Forming Coating Liquid G1 | Synthesis Example 1 | 18500 | 10 Weight Part | FLOREN AC2000 | 11000 | Methyl Ethyl Ketone | 50% | 80° C. | |
| Example G13 | Localized Layer-Forming Coating Liquid G10 | Synthesis Example 1 | 18500 | — | — | — | Methyl Ethyl Ketone | 50% | 25° C. | 80° C. |
| Example G14 | Localized Layer-Forming Coating Liquid G11 | — | — | — | — | — | Methyl Ethyl Ketone | 50% | 25° C. | 80° C. |

For the resulting anti-reflection films of [Example G1] to [Example G14], evaluations were performed as described above, and the state of formation of each layer in the localized layer was checked. The evaluation results and the like are shown collectively in Table 14.

TABLE 14

| | Luminous Reflectivity (%) | Haze (%) | Parallel Light Transmittance (%) | Surface Resistance Value (Ω/cm2) | Contact Angle (°) | | Color Variation | Abrasion Resistance (SW) | Pencil Hardness | State of Localized Layer Formation | | | |
|---|---|---|---|---|---|---|---|---|---|---|---|---|---|
| | | | | | Localized Layer Surface | Low-refractive Index Surface | Interference Fringe | | | Intermediate Layer | Hard Coat Layer | Antistatic Layer | Leveling Layer |
| Example G1 | 1.0 | 0.1 | 96.0 | $1 \times 10^9$ | 75 | 85 | ○ | ○ | 2H | ○ | ○ | ○ | ○ |
| Example G2 | 1.0 | 0.1 | 96.0 | $1 \times 10^9$ | 75 | 85 | ○ | ○ | 2H | ○ | ○ | ○ | ○ |
| Example G3 | 1.0 | 2.0 | 94.0 | $5 \times 10^8$ | 45 | 60 | ○ | X | 2H | ○ | ○ | ○ | X |
| Example G4 | 1.0 | 0.1 | 96.0 | $1 \times 10^{13}$ | 75 | 85 | ○ | ○ | 2H | ○ | ○ | X | ○ |
| Example G5 | 1.0 | 0.1 | 96.0 | $1 \times 10^{13}$ | 75 | 85 | ○ | ○ | 2H | ○ | ○ | X | ○ |
| Example G6 | 1.0 | 0.1 | 96.0 | $2 \times 10^8$ | 40 | 60 | ○ | ○ | 2H | ○ | ○ | ○ | X |
| Example G7 | 1.0 | 0.1 | 96.0 | $1 \times 10^8$ | 75 | 85 | X | ○ | 2H | X | ○ | ○ | ○ |
| Example G8 | 1.0 | 3.0 | 94.0 | $1 \times 10^8$ | 40 | 60 | ○ | X | B | ○ | X | ○ | X |
| Example G9 | 1.0 | 0.7 | 95.5 | $5 \times 10^8$ | 75 | 85 | X | ○ | 2H | X | ○ | X | X |
| Example G10 | 1.0 | 2.0 | 95.0 | $1 \times 10^{13}$ | 60 | 85 | ○ | X | 2H | ○ | ○ | X | X |
| Example G11 | 1.0 | 0.1 | 96.0 | $1 \times 10^9$ | 40 | 50 | ○ | X | B | ○ | X | ○ | X |
| Example G12 | 1.0 | 0.1 | 96.0 | $5 \times 10^{13}$ | 60 | 85 | ○ | ○ | 2H | ○ | ○ | X | X |
| Example G13 | 1.0 | 3.0 | 94.0 | $5 \times 10^8$ | 40 | 50 | ○ | X | 2H | ○ | ○ | ○ | — |
| Example G14 | 1.0 | 0.1 | 96.0 | $5 \times 10^{13}$ | 70 | 85 | ○ | ○ | 2H | ○ | ○ | — | — |

(H) Leveling Material: Compound Having a Butadiene Group, and Conductive Material: a Metal Oxide Particle Hereinafter, Examples where a compound having a butadiene group is used as a leveling material, and a metal oxide particle is used as the conductive material, are shown.

Hereinafter, Adjustment Examples of the coating liquids for forming a localized layer H1 to H10, are shown.

Adjustment Example H1

Coating Fluid for Forming Localized Layer H1

A mixture of

| | |
|---|---|
| antimony-containing tin oxide (50 nm of the average particle size/isopropyl alcohol dispersion liquid) (solid content) | 5 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer H1.

Adjustment Example H2

Coating Fluid for Forming Localized Layer H2

A mixture of

| | |
|---|---|
| phosphorus-containing tin oxide (50 nm of the average particle size/isopropyl alcohol dispersion liquid) (solid content) | 5 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer H2.

Adjustment Example H3

Coating Fluid for Forming Localized Layer H3

A mixture of

| | |
|---|---|
| antimony-containing tin oxide (50 nm of the average particle size/isopropyl alcohol dispersion liquid) (solid content) | 0.01 weight part |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer H3.

Adjustment Example H4

Coating Fluid for Forming Localized Layer H4

A mixture of

| | |
|---|---|
| antimony-containing tin oxide (50 nm of the average particle size/isopropyl alcohol dispersion liquid) (solid content) | 100 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer H4.

Adjustment Example H5

Coating Fluid for Forming Localized Layer H5

A mixture of

| | |
|---|---|
| antimony-containing tin oxide (1,000 nm of the average particle size/isopropyl alcohol dispersion liquid) (solid content) | 5 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer H5.

Adjustment Example H6

Coating Fluid for Forming Localized Layer H6

A mixture of

| | |
|---|---|
| antimony-containing tin oxide (50 nm of the average particle size/isopropyl alcohol dispersion liquid) (solid content) | 5 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using isopropyl alcohol, which was taken as the coating liquid for forming a localized layer H6.

Adjustment Example H7

Coating Fluid for Forming Localized Layer H7

A mixture of

| | |
|---|---|
| antimony-containing tin oxide (50 nm of the average particle size/isopropyl alcohol dispersion liquid) (solid content) | 5 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 20 wt % of the solid content using methyl ethyl ketone, which was taken as the coating liquid for forming a localized layer H7.

Adjustment Example H8

Coating Fluid for Forming Localized Layer H8

A mixture of

| | |
|---|---|
| antimony-containing tin oxide (50 nm of the average particle size/isopropyl alcohol dispersion liquid) (solid content) | 5 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 90 wt % of the solid content using methyl ethyl ketone, which was taken as the coating liquid for forming a localized layer H8.

Adjustment Example H9

Coating Fluid for Forming Localized Layer H9

A mixture of

| | |
|---|---|
| antimony-containing tin oxide (50 nm of the average particle size/isopropyl alcohol dispersion liquid) (solid content) | 5 weight parts |

-continued

| | |
|---|---|
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)
was prepared, and this was prepared to a liquid having 50 wt % of the solid content using methyl ethyl ketone, which was taken as the coating liquid for forming a localized layer H9.

Adjustment Example H10

Coating Fluid for Forming Localized Layer H10

A mixture of

| | |
|---|---|
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)
was prepared, and this was prepared to a liquid having 50 wt % of the solid content using methyl ethyl ketone, which was taken as the coating liquid for forming a localized layer G11.
Hereinafter, Adjustment Example of the coating liquid for forming a low refractive index layer H, is shown.
(Coating Fluid for Forming Low Refractive Index Layer H)
A mixture of

| | |
|---|---|
| dispersion liquid of porous silica fine particles (50 nm of the average particle size/20 wt % of the solid content/methyl isobutyl ketone dispersion liquid) (solid content) | 2.5 weight parts |
| EO-modified dipentaerythritol hexaacrylate (trade name: DPEA-12, manufactured by NIPPO KAYAKU Co., Ltd.) | 2.5 weight parts |
| photopolymerization initiator (trade name: IRGACURE 184, manufactured by Ciba Specialty Chemicals Japan K.K.) | 0.1 weight part | was prepared, and this was prepared to a liquid having 5 wt % of the solid content using isopropyl alcohol, which was taken as the coating liquid for forming a low refractive index layer H.

Example H1

Formation of Localized Layer

Onto one surface of a triacetyl cellulose film (manufactured by FUJIFILM Corporation, film thickness: 80 μm), the coating liquid for forming a localized layer H1 was coated, and dried at 25° C. for 10 seconds in a drying oven for primary drying, and subsequently dried at 80° C. for 50 seconds in a drying oven for secondary drying, and then ultraviolet irradiation was performed using an ultraviolet irradiation apparatus (manufactured by Fusion UV Systems Japan K.K., light source: H bulb) at an irradiation dose of 300 mJ/m$^2$, whereby to form a transparent localized layer having a dry film thickness of 5 μm.

(Formation of Low Refractive Index Layer)

Onto the localized layer formed above, the coating liquid for forming a low refractive index layer H was coated such that the film thickness after drying became 100 nm. Primary drying was performed at a temperature of 25° C. for 25 seconds, and then secondary drying was performed at a temperature of 80° C. for 50 seconds, and then ultraviolet irradiation was performed at an irradiation dose of 192 mJ/m$^2$ using an ultraviolet irradiation apparatus (manufactured by Fusion UV Systems Japan K.K., light source: H bulb) to harden the film, whereby to form a low refractive index layer, and to prepare the anti-reflection film of [Example H1].

[Example H2] to [Example H8]

In [Example H2] to [Example H8], the coating liquids for forming a localized layer H2 to H8 were used instead of the coating liquid for forming a localized layer H1, with other production conditions being similar to those of [Example H1], whereby to prepare the anti-reflection film of [Example H2] to [Example H8].

[Example H9] to [Example H11]

In [Example H9], the coating liquid for forming a localized layer H1 was used, and the localized layer was formed at 50° C. of the primary drying temperature and at 60° C. of the secondary drying temperature, with other production conditions being similar to those of [Example H1], whereby to prepare the anti-reflection film of [Example H9].

In [Example H10], the coating liquid for forming a localized layer H1 was used, and the localized layer was formed at 25° C. of both of the primary drying temperature and the secondary drying temperature, with other production conditions being similar to those of [Example H1], whereby to prepare the anti-reflection film of [Example H10].

In [Example H11], the coating liquid for forming a localized layer H1 was used, and the localized layer was formed at 80° C. of both of the primary drying temperature and the secondary drying temperature, with other production conditions being similar to those of [Example H1], whereby to prepare the anti-reflection film of [Example H11].

[Example H12] and [Example H13]

In [Example H12] and [Example H13], the coating liquids for forming a localized layer H9 and H10 were used instead of the coating liquid for forming a localized layer H1, with other production conditions being similar to those of [Example H1], whereby to prepare the anti-reflection films of [Example H12] and [Example H13].

The production conditions in [Example H1] to [Example H13] are shown collectively in Table 15.

TABLE 15

| | | Production Condition | | | | | | | | |
|---|---|---|---|---|---|---|---|---|---|---|
| | | Metal Oxide Particle | | | Leveling Material | | Dilution Solvent | | Drying Temperature | |
| | Forming Coating Liquid | Name of Material | Average Particle Size (nm) | Quantity | Name of Material | Molecular Weight | Name of Material | Solid Content Adjustment | Primary Drying Temperature | Secondary Drying Temperature |
| Example H1 | Localized Layer-Forming Coating Liquid H1 | ATO | 50 | 5 Weight Part | FLOREN AC2000 | 11000 | Methyl Ethyl Ketone | 50% | 25° C. | 80° C. |
| Example H2 | Localized Layer-Forming Coating Liquid H2 | PTO | 50 | 5 Weight Part | FLOREN AC2000 | 11000 | Methyl Ethyl Ketone | 50% | 25° C. | 80° C. |
| Example H3 | Localized Layer-Forming Coating Liquid H3 | ATO | 50 | 0.01 Weight Part | FLOREN AC2000 | 11000 | Methyl Ethyl Ketone | 50% | 25° C. | 80° C. |
| Example H4 | Localized Layer-Forming Coating Liquid H4 | ATO | 50 | 100 Weight Part | FLOREN AC2000 | 11000 | Methyl Ethyl Ketone | 50% | 25° C. | 80° C. |
| Example H5 | Localized Layer-Forming Coating Liquid H5 | ATO | 1000 | 5 Weight Part | FLOREN AC2000 | 11000 | Methyl Ethyl Ketone | 50% | 25° C. | 80° C. |
| Example H6 | Localized Layer-Forming Coating Liquid H6 | ATO | 50 | 5 Weight Part | FLOREN AC2000 | 11000 | Isopropyl Alcohol | 50% | 25° C. | 80° C. |
| Example H7 | Localized Layer-Forming Coating Liquid H7 | ATO | 50 | 5 Weight Part | FLOREN AC2000 | 11000 | Methyl Ethyl Ketone | 20% | 25° C. | 80° C. |
| Example H8 | Localized Layer-Forming Coating Liquid H8 | ATO | 50 | 5 Weight Part | FLOREN AC2000 | 11000 | Methyl Ethyl Ketone | 90% | 25° C. | 80° C. |
| Example H9 | Localized Layer-Forming Coating Liquid H1 | ATO | 50 | 5 Weight Part | FLOREN AC2000 | 11000 | Methyl Ethyl Ketone | 50% | 50° C. | 60° C. |
| Example H10 | Localized Layer-Forming Coating Liquid H1 | ATO | 50 | 5 Weight Part | FLOREN AC2000 | 11000 | Methyl Ethyl Ketone | 50% | 25° C. | |
| Example H11 | Localized Layer-Forming Coating Liquid H1 | ATO | 50 | 5 Weight Part | FLOREN AC2000 | 11000 | Methyl Ethyl Ketone | 50% | 80° C. | |
| Example H12 | Localized Layer-Forming Coating Liquid H9 | ATO | 50 | 5 Weight Part | — | — | Methyl Ethyl Ketone | 50% | 25° C. | 80° C. |
| Example H13 | Localized Layer-Forming Coating Liquid H10 | — | — | — | — | — | Methyl Ethyl Ketone | 50% | 25° C. | 80° C. |

For the resulting anti-reflection films of [Example H1] to [Example H13], evaluations were performed as described above, and the state of formation of each layer in the localized layer was checked. The evaluation results and the like are shown collectively in Table 16.

TABLE 16

| | Evaluation Item | | | | | | | | | | | | |
|---|---|---|---|---|---|---|---|---|---|---|---|---|---|
| | Luminous Reflectivity (%) | Haze (%) | Parallel Light Transmittance (%) | Surface Resistance Value (Ω/cm2) | Contact Angle (°) | | Color Variation and Interference Fringe | Abrasion Resistance (SW) | Pencil Hardness | State of Localized Layer Formation | | | |
| | | | | | Localized Layer Surface | Low-refractive Index Surface | | | | Intermediate Layer | Hard Coat Layer | Antistatic Layer | Leveling Layer |
| Example H1 | 1.0 | 0.1 | 95.0 | 1 × 10⁹ | 75 | 85 | ○ | ○ | 2H | ○ | ○ | ○ | ○ |
| Example H2 | 1.0 | 0.1 | 95.0 | 1 × 10⁹ | 75 | 85 | ○ | ○ | 2H | ○ | ○ | ○ | ○ |
| Example H3 | 1.0 | 0.1 | 95.0 | 1 × 10¹³ | 75 | 85 | ○ | ○ | 2H | ○ | ○ | X | ○ |
| Example H4 | 1.0 | 5.0 | 95.5 | 2 × 10⁸ | 40 | 60 | ○ | X | 2H | ○ | ○ | ○ | X |
| Example H5 | 1.0 | 3.0 | 93.5 | 1 × 10⁹ | 50 | 50 | ○ | X | 2H | ○ | ○ | ○ | X |
| Example H6 | 1.0 | 0.1 | 95.0 | 1 × 10⁸ | 75 | 85 | X | ○ | 2H | X | ○ | ○ | ○ |
| Example H7 | 1.0 | 3.0 | 92.0 | 1 × 10⁸ | 40 | 60 | ○ | X | B | ○ | X | ○ | X |
| Example H8 | 1.0 | 3.0 | 92.0 | 5 × 10⁸ | 75 | 85 | X | ○ | 2H | X | ○ | X | X |
| Example H9 | 1.0 | 2.0 | 93.0 | 1 × 10¹³ | 60 | 85 | ○ | X | 2H | ○ | ○ | X | X |
| Example H10 | 1.0 | 0.1 | 95.0 | 1 × 10⁹ | 40 | 50 | ○ | X | B | ○ | X | ○ | X |
| Example H11 | 1.0 | 0.1 | 95.0 | 5 × 10¹³ | 60 | 85 | ○ | ○ | 2H | ○ | ○ | X | X |
| Example H12 | 1.0 | 5.0 | 93.0 | 5 × 10⁸ | 40 | 50 | ○ | X | 2H | ○ | ○ | ○ | — |
| Example H13 | 1.0 | 0.1 | 96.0 | 5 × 10¹³ | 70 | 85 | ○ | ○ | 2H | ○ | ○ | — | — |

(I) Leveling Material: Compound Having a Butadiene Group, and Conductive Material: Quaternary Ammonium Salt Hereinafter, Examples where a compound having a butadiene group is used as a leveling material, and a conductive polymer is used as a conductive material, are shown.

Hereinafter, Adjustment Examples of the coating liquid for forming a localized layer I1 to I9, are shown.

Adjustment Example I1

Coating Fluid for Forming Localized Layer I1

A mixture of

| | |
|---|---|
| polythiophene (100 nm of the average particle size/isopropyl alcohol dispersion liquid) (solid content) | 5 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer I1.

Adjustment Example I2

Coating Fluid for Forming Localized Layer I2

A mixture of

| | |
|---|---|
| polyaniline (75 nm of the average particle size/isopropyl alcohol dispersion liquid) (solid content) | 5 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer I2.

Adjustment Example I3

Coating Fluid for Forming Localized Layer I3

A mixture of

| | |
|---|---|
| polythiophene (1,500 nm of the average particle size/isopropyl alcohol dispersion liquid) (solid content) | 5 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer I3.

Adjustment Example I4

Coating Fluid for Forming Localized Layer I4

A mixture of

| | |
|---|---|
| polythiophene (100 nm of the average particle size/isopropyl alcohol dispersion liquid) | 0.01 weight part |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer I5.

Adjustment Example I5

Coating Fluid for Forming Localized Layer I5

A mixture of

| | |
|---|---|
| polythiophene (100 nm of the average particle size/isopropyl alcohol dispersion liquid) (solid content) | 5 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using isopropyl alcohol, which was taken as the coating liquid for forming a localized layer I5.

Adjustment Example I6

Coating Fluid for Forming Localized Layer I6

A mixture of

| | |
|---|---|
| polythiophene (100 nm of the average particle size/isopropyl alcohol dispersion liquid) (solid content) | 5 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 20 wt % of the solid content using methyl ethyl ketone, which was taken as the coating liquid for forming a localized layer I6.

Adjustment Example I7

Coating Fluid for Forming Localized Layer I7

A mixture of

| | |
|---|---|
| polythiophene (100 nm of the average particle size/isopropyl alcohol dispersion liquid) (solid content) | 5 weight parts |
| FLOREN AC2000 (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 90 wt % of the solid content using methyl ethyl ketone, which was taken as the coating liquid for forming a localized layer I7.

Adjustment Example I8

Coating Fluid for Forming Localized Layer I8

A mixture of

| | |
|---|---|
| polythiophene (100 nm of the average particle size/isopropyl alcohol dispersion liquid) (solid content) | 5 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer I8.

Adjustment Example I9

Coating Fluid for Forming Localized Layer I9

A mixture of

| | |
|---|---|
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer I9.

Hereinafter, Adjustment Example of the coating liquid for forming a low refractive index layer I, is shown.
(Coating Fluid for Forming Low Refractive Index Layer I)
A mixture of

| | |
|---|---|
| dispersion liquid of porous silica fine particles (50 nm of the average particle size/20 wt % of the solid content/methyl isobutyl ketone dispersion liquid) (solid content) | 2.5 weight parts |
| EO-modified dipentaerythritol hexaacrylate (trade name: DPEA-12, manufactured by NIPPO KAYAKU Co., Ltd.) | 2.5 weight parts |
| photopolymerization initiator (trade name: IRGACURE 184, manufactured by Ciba Specialty Chemicals Japan K.K.) | 0.1 weight part | was prepared, and this was prepared to a liquid having 5 wt % of the solid content using isopropyl alcohol, which was taken as the coating liquid for forming a low refractive index layer I.

Example I1

Formation of Localized Layer

Onto one surface of a triacetyl cellulose film (manufactured by FUJIFILM Corporation, film thickness: 80 μm), the coating liquid for forming a localized layer I1 was coated, and dried at 25° C. for 10 seconds in a drying oven for primary drying, and subsequently dried at 80° C. for 50 seconds in a drying oven for secondary drying, and then ultraviolet irradiation was performed using an ultraviolet irradiation apparatus (manufactured by Fusion UV Systems Japan K.K., light source: H bulb) at an irradiation dose of 300 mJ/m$^2$, whereby to form a transparent localized layer having a dry film thickness of 5 μm.
(Formation of Low Refractive Index Layer)

Onto the localized layer formed above, the coating liquid for forming a low refractive index layer I was coated such that the film thickness after drying became 100 nm. Primary drying was performed at a temperature of 25° C. for 25 seconds, and then secondary drying was performed at a temperature of 80° C. for 50 seconds, and then ultraviolet irradiation was performed at an irradiation dose of 192 mJ/m$^2$ using an ultraviolet irradiation apparatus (manufactured by Fusion UV Systems Japan K.K., light source: H bulb) to harden the film, whereby to form a low refractive index layer, and prepare the anti-reflection film of [Example I1].

[Example I2] to [Example I7]

In [Example I2] to [Example I7], the coating liquids for forming a localized layer I2 to I7 were used instead of the coating liquid for forming a localized layer I1, with other production conditions being similar to those of [Example I1], whereby to prepare the anti-reflection films of [Example I2] to [Example I7].

[Example I8] to [Example I10]

In [Example I8], the coating liquid for forming a localized layer I1 was used, and the localized layer was formed at 50° C. of the primary drying temperature and at 60° C. of the secondary drying temperature, with other production conditions being similar to those of [Example I1], whereby to prepare the anti-reflection film of [Example I8].

In [Example I9], the coating liquid for forming a localized layer I1 was used, and the localized layer was formed at 25° C. of both of the primary drying temperature and the secondary drying temperature, with other production conditions being similar to those of [Example I1], whereby to prepare the anti-reflection film of [Example I9].

In [Example I10], the coating liquid for forming a localized layer I1 was used, and the localized layer was formed at 80° C. of both of the primary drying temperature and the secondary drying temperature, with other production conditions being similar to those of [Example I1], whereby to prepare the anti-reflection film of [Example I10].

[Example I11] and [Example I12]

In [Example I11] and [Example I12], the coating liquids for forming a localized layer I8 and I9 were used instead of the coating liquid for forming a localized layer I1, with other production conditions being similar to those of [Example I1], whereby to prepare the anti-reflection films of [Example I11] and [Example I12].

The production conditions in [Example I1] to [Example I12] are shown collectively in Table 17.

TABLE 17

| | | Production Condition | | | | | | | |
|---|---|---|---|---|---|---|---|---|---|
| | | Conductive Polymer | | | Leveling Material | | Dilution Solvent | | Drying Temperature | |
| | Forming Coating Liquid | Name of Material | Average Particle Size (nm) | Quantity | Name of Material | Molecular Weight | Name of Material | Solid Content Adjustment | Primary Drying Temperature | Secondary Drying Temperature |
| Example I1 | Localized Layer-Forming Coating Liquid I1 | Polythiophene | 100 | 5 Weight Part | FLOREN AC2000 | 11000 | Methyl Ethyl Ketone | 50% | 25° C. | 80° C. |
| Example I2 | Localized Layer-Forming Coating Liquid I2 | Polyaniline | 75 | 5 Weight Part | FLOREN AC2000 | 11000 | Methyl Ethyl Ketone | 50% | 25° C. | 80° C. |
| Example I3 | Localized Layer-Forming | Polythiophene | 300 | 5 Weight Part | FLOREN AC2000 | 11000 | Methyl Ethyl | 50% | 25° C. | 80° C. |

TABLE 17-continued

| | | Production Condition | | | | | | | | |
|---|---|---|---|---|---|---|---|---|---|---|
| | | Conductive Polymer | | | Leveling Material | | Dilution Solvent | | Drying Temperature | |
| | | | Average | | | | | | Primary | Secondary |
| | | | Particle | | | | | Solid | Drying | Drying |
| | Forming Coating Liquid | Name of Material | Size (nm) | Quantity | Name of Material | Molecular Weight | Name of Material | Content Adjustment | Temperature | Temperature |
| Example I4 | Coating Liquid I3 Localized Layer-Forming Coating Liquid I4 | Polythiophene | 100 | 0.01 Weight Part | FLOREN AC2000 | 11000 | Ketone Methyl Ethyl Ketone | 50% | 25° C. | 80° C. |
| Example I5 | Localized Layer-Forming Coating Liquid I5 | Polythiophene | 100 | 5 Weight Part | FLOREN AC2000 | 11000 | Isopropyl Alcohol | 50% | 25° C. | 80° C. |
| Example I6 | Localized Layer-Forming Coating Liquid I6 | Polythiophene | 100 | 5 Weight Part | FLOREN AC2000 | 11000 | Methyl Ethyl Ketone | 20% | 25° C. | 80° C. |
| Example I7 | Localized Layer-Forming Coating Liquid I7 | Polythiophene | 100 | 5 Weight Part | FLOREN AC2000 | 11000 | Methyl Ethyl Ketone | 90% | 25° C. | 80° C. |
| Example I8 | Localized Layer-Forming Coating Liquid I1 | Polythiophene | 100 | 5 Weight Part | FLOREN AC2000 | 11000 | Methyl Ethyl Ketone | 50% | 50° C. | 60° C. |
| Example I9 | Localized Layer-Forming Coating Liquid I1 | Polythiophene | 100 | 5 Weight Part | FLOREN AC2000 | 11000 | Methyl Ethyl Ketone | 50% | 25° C. | |
| Example I10 | Localized Layer-Forming Coating Liquid I1 | Polythiophene | 100 | 5 Weight Part | FLOREN AC2000 | 11000 | Methyl Ethyl Ketone | 50% | 80° C. | |
| Example I11 | Localized Layer-Forming Coating Liquid I8 | Polythiophene | 100 | 5 Weight Part | — | — | Methyl Ethyl Ketone | 50% | 25° C. | 80° C. |
| Example I12 | Localized Layer-Forming Coating Liquid I9 | — | — | — | — | — | Methyl Ethyl Ketone | 50% | 25° C. | 80° C. |

For the resulting anti-reflection films of [Example I1], to [Example I12], evaluations were performed as described above, and the state of formation of each layer in the localized layer was checked. The evaluation results and the like are shown collectively in Table 18.

TABLE 18

| | Evaluation Item | | | | | | | | | State of Localized Layer | | | |
|---|---|---|---|---|---|---|---|---|---|---|---|---|---|
| | Luminous | | Parallel | Surface | Contact Angle (°) | | Color Variation | | | | Formation | | |
| | Reflectivity (%) | Haze (%) | Light Transmittance (%) | Resistance Value ($\Omega/cm^2$) | Localized Layer Surface | Low-refractive Index Surface | Interference Fringe | Abrasion Resistance (SW) | Pencil Hardness | Intermediate Layer | Hard Coat Layer | Antistatic Layer | Leveling Layer |
| Example I1 | 1.0 | 0.1 | 95.0 | $1 \times 10^9$ | 75 | 85 | ○ | ○ | 2H | ○ | ○ | ○ | ○ |
| Example I2 | 1.0 | 0.1 | 95.0 | $1 \times 10^9$ | 75 | 85 | ○ | ○ | 2H | ○ | ○ | ○ | ○ |
| Example I3 | 1.0 | 0.1 | 95.0 | $1 \times 10^9$ | 75 | 85 | ○ | ○ | 2H | ○ | ○ | ○ | ○ |
| Example I4 | 1.0 | 0.1 | 95.5 | $1 \times 10^{13}$ | 75 | 85 | ○ | ○ | 2H | ○ | ○ | X | ○ |
| Example I5 | 1.0 | 0.1 | 95.0 | $1 \times 10^8$ | 75 | 85 | X | ○ | 2H | X | ○ | ○ | ○ |
| Example I6 | 1.0 | 3.0 | 93.5 | $1 \times 10^8$ | 40 | 60 | ○ | X | B | ○ | X | ○ | X |
| Example I7 | 1.0 | 0.7 | 95.0 | $5 \times 10^8$ | 75 | 85 | X | ○ | 2H | X | ○ | X | X |

TABLE 18-continued

| | Evaluation Item | | | | | | | | | | | | |
|---|---|---|---|---|---|---|---|---|---|---|---|---|---|
| | Luminous Reflectivity (%) | Haze (%) | Parallel Light Transmittance (%) | Surface Resistance Value (Ω/cm2) | Contact Angle (°) | | Color Variation and Interference Fringe | Abrasion Resistance (SW) | Pencil Hardness | State of Localized Layer Formation | | | |
| | | | | | Localized Layer Surface | Low-refractive Index Surface | | | | Intermediate Layer | Hard Coat Layer | Antistatic Layer | Leveling Layer |
| Example I8 | 1.0 | 2.0 | 92.0 | 1 × 10¹³ | 60 | 85 | ○ | X | 2H | ○ | ○ | X | X |
| Example I9 | 1.0 | 0.1 | 95.0 | 1 × 10⁹ | 40 | 50 | ○ | X | B | ○ | X | ○ | X |
| Example I10 | 1.0 | 0.1 | 95.0 | 5 × 10¹³ | 60 | 85 | ○ | ○ | 2H | ○ | ○ | X | X |
| Example I11 | 1.0 | 3.0 | 92.0 | 5 × 10⁸ | 40 | 50 | ○ | X | 2H | ○ | ○ | ○ | — |
| Example I12 | 1.0 | 0.1 | 96.0 | 5 × 10¹³ | 70 | 85 | ○ | ○ | 2H | ○ | ○ | — | — |

(J) Leveling Material: Compound Having an Olefin Group, and Conductive Material: Quaternary Ammonium Salt Material Hereinafter, Examples where a compound having an olefin group is used as a leveling material, and a quaternary ammonium salt material is used as the conductive material, are shown.

Hereinafter, Adjustment Examples of the coating liquids for forming a localized layer J1 to J11, are shown.

Synthesis Example 1

A four-necked flask equipped with stirring blades, a reflux cooling tube, a dry air introduction tube, and a thermometer, was charged with

| | |
|---|---|
| octylpolyethylene glycol polypropylene glycol methacrylate (trade name: "BLEMMER 50POEP-800B", manufactured by NOF CORPORATION) | 18.0I |
| methacryloyl oxyethyltrimethyl ammonium chloride | 35.0I |
| cyclohexyl methacrylate | 14.0I |
| azobisisobutyronitrile | 0.3I |
| isopropyl alcohol | 100.0I |
| methyl ethyl ketone | 40.0I | and polymerized at 65° C. for 3 hours under nitrogen atmosphere. After completion of the polymerization, the reaction liquid was put into hexane, and a product was precipitated, and then dried. The weight average molecular weight of the resulting quaternary ammonium salt material was 18500.

Adjustment Example J1

Coating Fluid for Forming Localized Layer J1

A mixture of

| | |
|---|---|
| quaternary ammonium salt material produced in Synthesis Example 1 (18500 of weight average molecular weight) | 10 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer J1.

Adjustment Example J2

Coating Fluid for Forming Localized Layer J2

A mixture of

| | |
|---|---|
| NR-121X-9IPA (isopropyl alcohol dispersion liquid, manufactured by COLCOAT CO., Ltd.) (solid content) | 20 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer J2.

Adjustment Example J3

Coating Fluid for Forming Localized Layer J3

A mixture of

| | |
|---|---|
| quaternary ammonium salt containing LIGHT ESTER DQ100 (trade name, manufactured by KYOEISHA CHEMICAL Co., LTD., molecular weight 208) | 10 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer J3.

Adjustment Example J4

Coating Fluid for Forming Localized Layer J4

A mixture of

| | |
|---|---|
| p-styrene sulfonic acid ammonium salt homopolymer (molecular weight: 120,000) | 10 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer J4.

Adjustment Example J5

Coating Fluid for Forming Localized Layer J5

A mixture of

| | |
|---|---|
| quaternary ammonium salt material produced in Synthesis Example 1 (18500 of weight average molecular weight) | 0.01 weight part |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer J5.

Adjustment Example J6

Coating Fluid for Forming Localized Layer J6

A mixture of

| | |
|---|---|
| quaternary ammonium salt material produced in Synthesis Example 1 (18500 of weight average molecular weight) | 100 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer J6.

Adjustment Example J7

Coating Fluid for Forming Localized Layer J7

A mixture of

| | |
|---|---|
| quaternary ammonium salt material produced in Synthesis Example 1 (18500 of weight average molecular weight) | 10 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using isopropyl alcohol, which was taken as the coating liquid for forming a localized layer J7.

Adjustment Example J8

Coating Fluid for Forming Localized Layer J8

A mixture of

| | |
|---|---|
| quaternary ammonium salt material produced in Synthesis Example 1 (18500 of weight average molecular weight) | 10 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 20 wt % of the solid content using methyl ethyl ketone, which was taken as the coating liquid for forming a localized layer J8.

Adjustment Example J9

Coating Fluid for Forming Localized Layer J9

A mixture of

| | |
|---|---|
| quaternary ammonium salt material produced in Synthesis Example 1 (18500 of weight average molecular weight) | 10 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 90 wt % of the solid content using methyl ethyl ketone, which was taken as the coating liquid for forming a localized layer J9.

Adjustment Example J10

Coating Fluid for Forming Localized Layer J10

A mixture of

| | |
|---|---|
| quaternary ammonium salt material produced in Synthesis Example 1 (18500 of weight average molecular weight) | 10 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer J10.

Adjustment Example J11

Coating Fluid for Forming Localized Layer J11

A mixture of

| | |
|---|---|
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer J10.

Hereinafter, Adjustment Example of the coating liquid for forming a low refractive index layer J, is shown.

(Coating Fluid for Forming Low Refractive Index Layer J)

A mixture of

| | |
|---|---|
| dispersion liquid of porous silica fine particles (50 nm of the average particle size/20 wt % of the solid content/methyl isobutyl ketone dispersion liquid) (solid content) | 2.5 weight parts |
| EO-modified dipentaerythritol hexaacrylate (trade name: DPEA-12, manufactured by NIPPO KAYAKU Co., Ltd.) | 2.5 weight parts |
| photopolymerization initiator (trade name: IRGACURE 184, manufactured by Ciba Specialty Chemicals Japan K.K.) | 0.1 weight part | was prepared, and this was prepared to a liquid having 5 wt % of the solid content using isopropyl alcohol, which was taken as the coating liquid for forming a low refractive index layer J.

Example J1

Formation of Localized Layer

Onto one surface of a triacetyl cellulose film (manufactured by FUJIFILM Corporation, film thickness: 80 μm), the coating liquid for forming a localized layer J1 was coated, and dried at 25° C. for 10 seconds in a drying oven for primary drying, and subsequently dried at 80° C. for 50 seconds in a drying oven for secondary drying, and then ultraviolet irradiation was performed using an ultraviolet irradiation apparatus (manufactured by Fusion UV Systems Japan K.K., light source: H bulb) at an irradiation dose of 300 mJ/m$^2$, whereby to form a transparent localized layer having a dry film thickness of 5 μm.

(Formation of Low Refractive Index Layer)

Onto the localized layer formed above, the coating liquid for forming a low refractive index layer J was coated such that the film thickness after drying became 100 nm. Primary drying was performed at a temperature of 25° C. for 25 seconds, and then secondary drying was performed at a temperature of 80° C. for 50 seconds, and then ultraviolet irradiation was performed at an irradiation dose of 192 mJ/m$^2$ using an ultraviolet irradiation apparatus (manufactured by Fusion UV Systems Japan K.K., light source: H bulb) to harden the film, whereby to form a low refractive index layer, and prepare the anti-reflection film of [Example J1].

[Example J2] to [Example J9]

In [Example J2] to [Example J9], the coating liquids for forming a localized layer J2 to J9 were used instead of the coating liquid for forming a localized layer J1, with other production conditions being similar to those of [Example J1], whereby to prepare the anti-reflection films of [Example J2] to [Example J9].

[Example J10] to [Example J12]

In [Example J10], the coating liquid for forming a localized layer J1 was used, and the localized layer was formed at 50° C. of the primary drying temperature and at 60° C. of the secondary drying temperature, with other production conditions being similar to those of [Example J1], whereby to prepare the anti-reflection film of [Example J10].

In [Example J11], the coating liquid for forming a localized layer J1 was used, and the localized layer was formed at 25° C. of both of the primary drying temperature and the secondary drying temperature, with other production conditions being similar to those of [Example J1], whereby to prepare the anti-reflection film of [Example J11].

In [Example J12], the coating liquid for forming a localized layer J1 was used, and the localized layer was formed at 80° C. of both of the primary drying temperature and the secondary drying temperature, with other production conditions being similar to those of [Example J1], whereby to prepare the anti-reflection film of [Example J12].

[Example J13] and [Example J14]

In [Example J13] and [Example J14], the coating liquids for forming a localized layer J10 and J11 were used instead of the coating liquid for forming a localized layer J1, with other production conditions being similar to those of [Example J1], [Example J13], whereby to prepare the anti-reflection film of [Example J14].

The production conditions in [Example J1] to [Example J14] are shown collectively in Table 19.

TABLE 19

| | | Production Condition | | | | | | | | |
|---|---|---|---|---|---|---|---|---|---|---|
| | | Quaternary Ammonium Salt Material | | | Leveling Material | | Dilution Solvent | | Drying Temperature | |
| | | | | | | | | Solid | Primary Drying | Secondary Drying |
| | Forming Coating Liquid | Name of Material | Molecular Weight | Quantity | Name of Material | Molecular Weight | Name of Material | Content Adjustment | Temperature | Temperature |
| Example J1 | Localized Layer-Forming Coating Liquid J1 | Synthesis Example 1 | 18500 | 10 Weight Part | FLOREN AC2200HF | 5000 | Methyl Ethyl Ketone | 50% | 25° C. | 80° C. |
| Example J2 | Localized Layer-Forming Coating Liquid J2 | NR-121X-9IPA | 15000 | 20 Weight Part | FLOREN AC2200HF | 5000 | Methyl Ethyl Ketone | 50% | 25° C. | 80° C. |
| Example J3 | Localized Layer-Forming Coating Liquid J3 | LIGHT ESTER DQ100 | 208 | 10 Weight Part | FLOREN AC2200HF | 5000 | Methyl Ethyl Ketone | 50% | 25° C. | 80° C. |
| Example J4 | Localized Layer-Forming Coating Liquid J4 | Ammonium Salt Homopolymer | 120000 | 10 Weight Part | FLOREN AC2200HF | 5000 | Methyl Ethyl Ketone | 50% | 25° C. | 80° C. |
| Example J5 | Localized Layer-Forming Coating Liquid J5 | Synthesis Example 1 | 18500 | 0.01 Weight Part | FLOREN AC2200HF | 5000 | Methyl Ethyl Ketone | 50% | 25° C. | 80° C. |
| Example J6 | Localized Layer-Forming Coating Liquid J6 | Synthesis Example 1 | 18500 | 100 Weight Part | FLOREN AC2200HF | 5000 | Methyl Ethyl Ketone | 50% | 25° C. | 80° C. |
| Example J7 | Localized Layer-Forming Coating Liquid J7 | Synthesis Example 1 | 18500 | 10 Weight Part | FLOREN AC2200HF | 5000 | Isopropyl Alcohol | 50% | 25° C. | 80° C. |
| Example J8 | Localized Layer-Forming Coating Liquid J8 | Synthesis Example 1 | 18500 | 10 Weight Part | FLOREN AC2200HF | 5000 | Methyl Ethyl Ketone | 20% | 25° C. | 80° C. |
| Example J9 | Localized Layer-Forming Coating Liquid J9 | Synthesis Example 1 | 18500 | 10 Weight Part | FLOREN AC2200HF | 5000 | Methyl Ethyl Ketone | 90% | 25° C. | 80° C. |
| Example J10 | Localized Layer-Forming Coating Liquid J1 | Synthesis Example 1 | 18500 | 10 Weight Part | FLOREN AC2200HF | 5000 | Methyl Ethyl Ketone | 50% | 50° C. | 60° C. |
| Example J11 | Localized Layer-Forming Coating Liquid J1 | Synthesis Example 1 | 18500 | 10 Weight Part | FLOREN AC2200HF | 5000 | Methyl Ethyl Ketone | 50% | 25° C. | 25° C. |
| Example J12 | Localized Layer-Forming Coating Liquid J1 | Synthesis Example 1 | 18500 | 10 Weight Part | FLOREN AC2200HF | 5000 | Methyl Ethyl Ketone | 50% | 80° C. | 80° C. |

TABLE 19-continued

| | | Production Condition | | | | | | | | |
|---|---|---|---|---|---|---|---|---|---|---|
| | | Quaternary Ammonium Salt Material | | | Leveling Material | | Dilution Solvent | | Drying Temperature | |
| | | | | | | | | Solid | Primary Drying | Secondary Drying |
| | Forming Coating Liquid | Name of Material | Molecular Weight | Quantity | Name of Material | Molecular Weight | Name of Material | Content Adjustment | Temperature | Temperature |
| Example J13 | Localized Layer-Forming Coating Liquid J10 | Synthesis Example 1 | 18500 | — | — | — | Methyl Ethyl Ketone | 50% | 25° C. | 80° C. |
| Example J14 | Localized Layer-Forming Coating Liquid J11 | — | — | — | — | — | Methyl Ethyl Ketone | 50% | 25° C. | 80° C. |

For the resulting anti-reflection films of [Example J1] to [Example J14], evaluations were performed as described above, and the state of formation of each layer in the localized layer was checked. The evaluation results and the like are shown collectively in Table 20.

TABLE 20

| | Evaluation Item | | | | | | | | | | | | |
|---|---|---|---|---|---|---|---|---|---|---|---|---|---|
| | Luminous Reflectivity (%) | Haze (%) | Parallel Light Transmittance (%) | Surface Resistance Value (Ω/cm2) | Contact Angle (°) | | Color Variation and Interference Fringe | Abrasion Resistance (SW) | Pencil Hardness | State of Localized Layer Formation | | | |
| | | | | | Localized Layer Surface | Low-refractive Index Surface | | | | Intermediate Layer | Hard Coat Layer | Anti-static Layer | Leveling Layer |
| Example J1 | 1.0 | 0.1 | 96.0 | 1 × 10$^9$ | 75 | 85 | ○ | ○ | 2H | ○ | ○ | ○ | ○ |
| Example J2 | 1.0 | 0.1 | 96.0 | 1 × 10$^9$ | 75 | 85 | ○ | ○ | 2H | ○ | ○ | ○ | ○ |
| Example J3 | 1.0 | 2.0 | 94.0 | 5 × 10$^8$ | 45 | 60 | ○ | X | 2H | ○ | ○ | ○ | X |
| Example J4 | 1.0 | 0.1 | 96.0 | 1 × 10$^{13}$ | 75 | 85 | ○ | ○ | 2H | ○ | ○ | X | ○ |
| Example J5 | 1.0 | 0.1 | 96.0 | 1 × 10$^{13}$ | 75 | 85 | ○ | ○ | 2H | ○ | ○ | X | ○ |
| Example J6 | 1.0 | 0.1 | 96.0 | 2 × 10$^8$ | 40 | 60 | ○ | ○ | 2H | ○ | ○ | ○ | X |
| Example J7 | 1.0 | 0.1 | 96.0 | 1 × 10$^8$ | 75 | 85 | X | ○ | 2H | X | ○ | ○ | ○ |
| Example J8 | 1.0 | 3.0 | 94.0 | 1 × 10$^8$ | 40 | 60 | ○ | X | B | ○ | X | ○ | X |
| Example J9 | 1.0 | 0.7 | 95.5 | 5 × 10$^8$ | 75 | 85 | X | ○ | 2H | X | ○ | X | X |
| Example J10 | 1.0 | 2.0 | 95.0 | 1 × 10$^{13}$ | 60 | 85 | ○ | X | 2H | ○ | ○ | X | X |
| Example J11 | 1.0 | 0.1 | 96.0 | 1 × 10$^9$ | 40 | 50 | ○ | X | B | ○ | X | ○ | X |
| Example J12 | 1.0 | 0.1 | 96.0 | 5 × 10$^{13}$ | 60 | 85 | ○ | ○ | 2H | ○ | ○ | X | X |
| Example J13 | 1.0 | 3.0 | 94.0 | 5 × 10$^8$ | 40 | 50 | ○ | X | 2H | ○ | ○ | ○ | — |
| Example J14 | 1.0 | 0.1 | 96.0 | 5 × 10$^{13}$ | 70 | 85 | ○ | ○ | 2H | ○ | ○ | — | — |

(K) Leveling Material: Compound Having an Olefin Group, and Conductive Material: a Metal Oxide Particle Hereinafter, Examples where a compound having an olefin group is used as a leveling material, and a metal oxide particle is used as the conductive material, are shown.

Hereinafter, Adjustment Examples of the coating liquids for forming a localized layer K1 to K10, are shown.

Adjustment Example K1

Coating Fluid for Forming Localized Layer K1

A mixture of

| | |
|---|---|
| antimony-containing tin oxide (50 nm of the average particle size/isopropyl alcohol dispersion liquid) (solid content) | 5 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer K1.

Adjustment Example K2

Coating Fluid for Forming Localized Layer K2

A mixture of

| | |
|---|---|
| phosphorus-containing tin oxide (50 nm of the average particle size/isopropyl alcohol dispersion liquid) (solid content) | 5 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer K2.

Adjustment Example K3

Coating Fluid for Forming Localized Layer K3

A mixture of

| | |
|---|---|
| antimony-containing tin oxide (50 nm of the average particle size/isopropyl alcohol dispersion liquid) (solid content) | 0.01 weight part |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer K3.

Adjustment Example K4

Coating Fluid for Forming Localized Layer K4

A mixture of

| | |
|---|---|
| antimony-containing tin oxide (50 nm of the average particle size/isopropyl alcohol dispersion liquid) (solid content) | 100 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer K4.

Adjustment Example K5

Coating Fluid for Forming Localized Layer K5

A mixture of

| | |
|---|---|
| antimony-containing tin oxide (1,000 nm of the average particle size/isopropyl alcohol dispersion liquid) (solid content) | 5 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer K5.

Adjustment Example K6

Coating Fluid for Forming Localized Layer K6

A mixture of

| | |
|---|---|
| antimony-containing tin oxide (50 nm of the average particle size/isopropyl alcohol dispersion liquid) (solid content) | 5 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using isopropyl alcohol, which was taken as the coating liquid for forming a localized layer K6.

Adjustment Example K7

Coating Fluid for Forming Localized Layer K7

A mixture of

| | |
|---|---|
| antimony-containing tin oxide (50 nm of the average particle size/isopropyl alcohol dispersion liquid) (solid content) | 5 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: | 10 weight parts |

IRGACURE 184, manufactured by Ciba
Specialty Chemicals Japan K.K.)

with respect to 100 weight parts of urethane acrylate (trade name: UA-306T, manufactured by KYOEISHA CHEMICAL Co., LTD.)

was prepared, and this was prepared to a liquid having 20 wt % of the solid content using methyl ethyl ketone, which was taken as the coating liquid for forming a localized layer K7.

Adjustment Example K8

Coating Fluid for Forming Localized Layer K8

A mixture of

| | |
|---|---|
| antimony-containing tin oxide (50 nm of the average particle size/isopropyl alcohol dispersion liquid) (solid content) | 5 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 90 wt % of the solid content using methyl ethyl ketone, which was taken as the coating liquid for forming a localized layer K8.

Adjustment Example K9

Coating Fluid for Forming Localized Layer K9

A mixture of

| | |
|---|---|
| antimony-containing tin oxide (50 nm of the average particle size/isopropyl alcohol dispersion liquid) (solid content) | 5 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer K9.

Adjustment Example K10

Coating Fluid for Forming Localized Layer K10

A mixture of

| | |
|---|---|
| antimony-containing tin oxide (50 nm of the average particle size/isopropyl alcohol dispersion liquid) (solid content) | 5 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)

was prepared, and this was prepared to a liquid having 50 wt % of the solid content using methyl ethyl ketone, which was taken as the coating liquid for forming a localized layer K10.

Hereinafter, Adjustment Example of the coating liquid for forming a low refractive index layer K, is shown.
(Coating Fluid for Forming Low Refractive Index Layer K)
A mixture of

| | |
|---|---|
| dispersion liquid of porous silica fine particles (50 nm of the average particle size/20 wt % of the solid content/methyl isobutyl ketone dispersion liquid) (solid content) | 2.5 weight parts |
| EO-modified dipentaerythritol hexaacrylate (trade name: DPEA-12, manufactured by NIPPO KAYAKU Co., Ltd.) | 2.5 weight parts |
| photopolymerization initiator (trade name: IRGACURE 184, manufactured by Ciba Specialty Chemicals Japan K.K.) | 0.1 weight part | was prepared, and this was prepared to a liquid having 5 wt % of the solid content using isopropyl alcohol, which was taken as the coating liquid for forming a low refractive index layer K.

Example K1

Formation of Localized Layer

Onto one surface of a triacetyl cellulose film (manufactured by FUJIFILM Corporation, film thickness: 80 μm), the coating liquid for forming a localized layer K1 was coated, and dried at 25° C. for 10 seconds in a drying oven for primary drying, and subsequently dried at 80° C. for 50 seconds in a drying oven for secondary drying, and then ultraviolet irradiation was performed using an ultraviolet irradiation apparatus (manufactured by Fusion UV Systems Japan K.K., light source: H bulb) at an irradiation dose of 300 mJ/m$^2$, whereby to form a transparent localized layer having a dry film thickness of 5 μm.
(Formation of Low Refractive Index Layer)

Onto the localized layer formed above, the coating liquid for forming a low refractive index layer K was coated such that the film thickness after drying became 100 nm. Primary drying was performed at a temperature of 25° C. for 25 seconds, and then secondary drying was performed at a temperature of 80° C. for 50 seconds, and then ultraviolet irradiation was performed using an ultraviolet irradiation apparatus (manufactured by Fusion UV Systems Japan K.K., light source: K bulb) at an irradiation dose of 192 mJ/m$^2$ to harden the film, whereby to form a low refractive index layer, and prepare the anti-reflection film of [Example K1].

[Example K2] to [Example K8]

In [Example K2] to [Example K8], the coating liquids for forming a localized layer K2 to K8 were used instead of the coating liquid for forming a localized layer K1, with other production conditions being similar to those of [Example K1], whereby to prepare the anti-reflection films of [Example K2] to [Example K8].

[Example K9] to [Example K11]

In [Example K9], the coating liquid for forming a localized layer K1 was used, and the localized layer was formed at 50° C. of the primary drying temperature and at 60° C. of the secondary drying temperature, with other production conditions being similar to those of [Example K1], [Example K9] whereby to prepare the anti-reflection film of.

In [Example K10], the coating liquid for forming a localized layer K1 was used, and the localized layer was formed at 25° C. of both of the primary drying temperature and the secondary drying temperature, with other production conditions being similar to those of [Example K1], whereby to prepare the anti-reflection film of [Example K10].

In [Example K11], the coating liquid for forming a localized layer K1 was used, and the localized layer was formed at 80° C. of both of the primary drying temperature and the secondary drying temperature, with other production conditions being similar to those of [Example K1], whereby to prepare the anti-reflection film of [Example K11].

[Example K12] and [Example K13]

In [Example K12] and [Example K13], the coating liquids for forming a localized layer K9 and K10 were used instead of the coating liquid for forming a localized layer K1, with other production conditions being similar to those of [Example K1], whereby to prepare the anti-reflection films of [Example K12] and [Example K13].

The production conditions in [Example K1] to [Example K13] are shown collectively in Table 21.

TABLE 21

| | | Production Condition | | | | | | | | |
|---|---|---|---|---|---|---|---|---|---|---|
| | | Metal Oxide Particle | | | Leveling Material | | Dilution Solvent | | Drying Temperature | |
| | Forming Coating Liquid | Name of Material | Average Particle Size (nm) | Quantity | Name of Material | Molecular Weight | Name of Material | Solid Content Adjustment | Primary Drying Temperature | Secondary Drying Temperature |
| Example K1 | Localized Layer-Forming Coating Liquid K1 | ATO | 50 | 5 Weight Part | FLOREN AC2200HF | 5000 | Methyl Ethyl Ketone | 50% | 25° C. | 80° C. |
| Example K2 | Localized Layer-Forming Coating Liquid K2 | PTO | 50 | 5 Weight Part | FLOREN AC2200HF | 5000 | Methyl Ethyl Ketone | 50% | 25° C. | 80° C. |
| Example K3 | Localized Layer-Forming Coating Liquid K3 | ATO | 50 | 0.01 Weight Part | FLOREN AC2200HF | 5000 | Methyl Ethyl Ketone | 50% | 25° C. | 80° C. |
| Example K4 | Localized Layer-Forming Coating Liquid K4 | ATO | 50 | 100 Weight Part | FLOREN AC2200HF | 5000 | Methyl Ethyl Ketone | 50% | 25° C. | 80° C. |
| Example K5 | Localized Layer-Forming Coating Liquid K5 | ATO | 1000 | 5 Weight Part | FLOREN AC2200HF | 5000 | Methyl Ethyl Ketone | 50% | 25° C. | 80° C. |
| Example K6 | Localized Layer-Forming Coating Liquid K6 | ATO | 50 | 5 Weight Part | FLOREN AC2200HF | 5000 | Isopropyl Alcohol | 50% | 25° C. | 80° C. |
| Example K7 | Localized Layer-Forming Coating Liquid K7 | ATO | 50 | 5 Weight Part | FLOREN AC2200HF | 5000 | Methyl Ethyl Ketone | 20% | 25° C. | 80° C. |
| Example K8 | Localized Layer-Forming Coating Liquid K8 | ATO | 50 | 5 Weight Part | FLOREN AC2200HF | 5000 | Methyl Ethyl Ketone | 90% | 25° C. | 80° C. |
| Example K9 | Localized Layer-Forming Coating Liquid K1 | ATO | 50 | 5 Weight Part | FLOREN AC2200HF | 5000 | Methyl Ethyl Ketone | 50% | 50° C. | 60° C. |
| Example K10 | Localized Layer-Forming Coating Liquid K1 | ATO | 50 | 5 Weight Part | FLOREN AC2200HF | 5000 | Methyl Ethyl Ketone | 50% | 25° C. | |
| Example K11 | Localized Layer-Forming Coating Liquid K1 | ATO | 50 | 5 Weight Part | FLOREN AC2200HF | 5000 | Methyl Ethyl Ketone | 50% | 80° C. | |

TABLE 21-continued

| | | Production Condition | | | | | | | |
|---|---|---|---|---|---|---|---|---|---|
| | | Metal Oxide Particle | | | Leveling Material | | Dilution Solvent | | Drying Temperature |
| | Forming Coating Liquid | Name of Material | Average Particle Size (nm) | Quantity | Name of Material | Molecular Weight | Name of Material | Solid Content Adjustment | Primary Drying Temperature / Secondary Drying Temperature |
| Example K12 | Localized Layer-Forming Coating Liquid K9 | ATO | 50 | 5 Weight Part | — | — | Methyl Ethyl Ketone | 50% | 25° C. / 80° C. |
| Example K13 | Localized Layer-Forming Coating Liquid K10 | — | — | — | — | — | Methyl Ethyl Ketone | 50% | 25° C. / 80° C. |

For the resulting anti-reflection films of [Example K1] to [Example K13], evaluations were performed as described above, and the state of formation of each layer in the localized layer was checked. The evaluation results and the like are shown collectively in Table 22.

TABLE 22

| | Evaluation Item | | | | | | | | | | | | |
|---|---|---|---|---|---|---|---|---|---|---|---|---|---|
| | Luminous Reflectivity (%) | Haze (%) | Parallel Light Transmittance (%) | Surface Resistance Value (Ω/cm2) | Contact Angle (°) Localized Layer Surface | Contact Angle (°) Low-refractive Index Surface | Color Variation and Interference Fringe | Abrasion Resistance (SW) | Pencil Hardness | State of Localized Layer Formation Intermediate Layer | Hard Coat Layer | Antistatic Layer | Leveling Layer |
| Example K1 | 1.0 | 0.1 | 95.0 | 1 × 10⁹ | 75 | 85 | ○ | ○ | 2H | ○ | ○ | ○ | ○ |
| Example K2 | 1.0 | 0.1 | 95.0 | 1 × 10⁹ | 75 | 85 | ○ | ○ | 2H | ○ | ○ | ○ | ○ |
| Example K3 | 1.0 | 0.1 | 95.0 | 1 × 10¹³ | 75 | 85 | ○ | ○ | 2H | ○ | ○ | X | ○ |
| Example K4 | 1.0 | 5.0 | 95.5 | 2 × 10⁸ | 40 | 60 | ○ | X | 2H | ○ | ○ | ○ | X |
| Example K5 | 1.0 | 3.0 | 93.5 | 1 × 10⁹ | 50 | 50 | ○ | X | 2H | ○ | ○ | ○ | X |
| Example K6 | 1.0 | 0.1 | 95.0 | 1 × 10⁸ | 75 | 85 | X | ○ | 2H | X | ○ | ○ | ○ |
| Example K7 | 1.0 | 3.0 | 92.0 | 1 × 10⁸ | 40 | 60 | ○ | X | B | ○ | X | ○ | X |
| Example K8 | 1.0 | 3.0 | 92.0 | 5 × 10⁸ | 75 | 85 | X | ○ | 2H | X | ○ | X | X |
| Example K9 | 1.0 | 2.0 | 93.0 | 1 × 10¹³ | 60 | 85 | ○ | X | 2H | ○ | ○ | X | X |
| Example K10 | 1.0 | 0.1 | 95.0 | 1 × 10⁹ | 40 | 50 | ○ | X | B | ○ | X | ○ | X |
| Example K11 | 1.0 | 0.1 | 95.0 | 5 × 10¹³ | 60 | 85 | ○ | ○ | 2H | ○ | ○ | X | X |
| Example K12 | 1.0 | 5.0 | 93.0 | 5 × 10⁸ | 40 | 50 | ○ | X | 2H | ○ | ○ | ○ | — |
| Example K13 | 1.0 | 0.1 | 96.0 | 5 × 10¹³ | 70 | 85 | ○ | ○ | 2H | ○ | ○ | — | — |

(L) Leveling Material: Compound Having an Olefin Group, and Conductive Material: Quaternary Ammonium Salt Hereinafter, Examples where a compound having an olefin group is used as a leveling material, and a conductive polymer is used as a conductive material, are shown.

Hereinafter, Adjustment Examples of the coating liquids for forming a localized layer L1 to L9, are shown.

Adjustment Example L1

Coating Fluid for Forming Localized Layer L1

A mixture of

| | |
|---|---|
| polythiophene (100 nm of the average particle size/isopropyl alcohol dispersion liquid) (solid content) | 5 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer 18.

Adjustment Example L2

Coating Fluid for Forming Localized Layer L2

A mixture of

| | |
|---|---|
| polyaniline (75 nm of the average particle size/isopropyl alcohol dispersion liquid) (solid content) | 5 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer L2.

Adjustment Example L3

Coating Fluid for Forming Localized Layer L3

A mixture of

| | |
|---|---|
| polythiophene (300 nm of the average particle size/isopropyl alcohol dispersion liquid) (solid content) | 5 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer L3.

Adjustment Example L4

Coating Fluid for Forming Localized Layer L4

A mixture of

| | |
|---|---|
| polythiophene (100 nm of the average particle size/isopropyl alcohol dispersion liquid) (solid content) | 0.01 weight part |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using methyl ethyl ketone, which was taken as the coating liquid for forming a localized layer L4.

Adjustment Example L5

Coating Fluid for Forming Localized Layer L5

A mixture of

| | |
|---|---|
| polythiophene (100 nm of the average particle size/isopropyl alcohol dispersion liquid) (solid content) | 5 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 50 wt % of the solid content using isopropyl alcohol, which was taken as the coating liquid for forming a localized layer L5.

Adjustment Example L6

Coating Fluid for Forming Localized Layer L6

A mixture of

| | |
|---|---|
| polythiophene (100 nm of the average particle size/isopropyl alcohol dispersion liquid) (solid content) | 5 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.) was prepared, and this was prepared to a liquid having 20 wt % of the solid content using methyl ethyl ketone, which was taken as the coating liquid for forming a localized layer L6.

Adjustment Example L7

Coating Fluid for Forming Localized Layer L7

A mixture of

| | |
|---|---|
| polythiophene (100 nm of the average particle size/isopropyl alcohol dispersion liquid) (solid content) | 5 weight parts |
| FLOREN AC2200HF (trade name, manufactured by KYOEISHA CHEMICAL Co., LTD.) | 0.1 weight part |
| dipentaerythritol triacrylate | 50 weight parts |
| pentaerythritol tetraacrylate | 50 weight parts |

| | |
|---|---|
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)
was prepared, and this was prepared to a liquid having 90 wt % of the solid content using methyl ethyl ketone, which was taken as the coating liquid for forming a localized layer L7.

Adjustment Example L8

Coating Fluid for Forming Localized Layer L8

A mixture of

| | |
|---|---|
| polythiophene (100 nm of the average particle size/isopropyl alcohol dispersion liquid) (solid content) | 5 weight parts |
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)
was prepared, and this was prepared to a liquid having 50 wt % of the solid content using methyl ethyl ketone, which was taken as the coating liquid for forming a localized layer L8.

Adjustment Example L9

Coating Fluid for Forming Localized Layer L9

A mixture of

| | |
|---|---|
| dipentaerythritol triacrylate | 50 weight parts |
| pentaerythritol tetraacrylate | 50 weight parts |
| photopolymerization initiator (trade name: IRGACURE 184, manufactured by Ciba Specialty Chemicals Japan K.K.) | 10 weight parts | with respect to 100 weight parts of urethane acrylate (trade name: UA-306T, manufactured by KYOEISHA CHEMICAL Co., LTD.)
was prepared, and this was prepared to a liquid having 50 wt % of the solid content using methyl ethyl ketone, which was taken as the coating liquid for forming a localized layer L9.
Hereinafter, Adjustment Example of the coating liquid for forming a low refractive index layer L, is shown.
(Coating Fluid for Forming Low Refractive Index Layer L)
A mixture of

| | |
|---|---|
| dispersion liquid of porous silica fine particles (50 nm of the average particle size/20 wt % of the solid content/methyl isobutyl ketone dispersion liquid) (solid content) | 2.5 weight parts |
| EO-modified dipentaerythritol hexaacrylate (trade name: DPEA-12, manufactured by NIPPO KAYAKU Co., Ltd.) | 2.5 weight parts |
| photopolymerization initiator (trade name: IRGACURE 184, manufactured by Ciba Specialty Chemicals Japan K.K.) | 0.1 weight part | was prepared, and this was prepared to a liquid having 5 wt % of the solid content using isopropyl alcohol, which was taken as the coating liquid for forming a low refractive index layer L.

Example L1

Formation of Localized Layer

Onto one surface of a triacetyl cellulose film (manufactured by FUJIFILM Corporation, film thickness: 80 μm), the coating liquid for forming a localized layer L1 was coated, and dried at 25° C. for 10 seconds in a drying oven for primary drying, and subsequently dried at 80° C. for 50 seconds in a drying oven for secondary drying, and then ultraviolet irradiation was performed using an ultraviolet irradiation apparatus (manufactured by Fusion UV Systems Japan K.K., light source: H bulb) at an irradiation dose of 300 mJ/m$^2$, whereby to form a transparent localized layer having a dry film thickness of 5 μm.
(Formation of Low Refractive Index Layer)
Onto the localized layer formed above, the coating liquid for forming a low refractive index layer L was coated such that the film thickness after drying became 100 nm. Primary drying was performed at a temperature of 25° C. for 25 seconds, and then secondary drying was performed at a temperature of 80° C. for 50 seconds, and then ultraviolet irradiation was performed at an irradiation dose of 192 mJ/m$^2$ using an ultraviolet irradiation apparatus (manufactured by Fusion UV Systems Japan K.K., light source: H bulb) to harden the film, whereby to form a low refractive index layer, and prepare the anti-reflection film of [Example L1].

[Example L2] to [Example L7]

In [Example L2] to [Example L7], the coating liquids for forming a localized layer L2 to L7 were used instead of the coating liquid for forming a localized layer L1, with other production conditions being similar to those of [Example L1], whereby to prepare the anti-reflection films of [Example L2] to [Example L7].

[Example L8] to [Example L10]

In [Example L8], the coating liquid for forming a localized layer L1 was used, and the localized layer was formed at 50° C. of the primary drying temperature and at 60° C. of the secondary drying temperature, with other production conditions being similar to those of [Example L1], whereby to prepare the anti-reflection film of [Example L8].
In [Example L9], the coating liquid for forming a localized layer L1 was used, and the localized layer was formed at 25° C. of both of the primary drying temperature and the secondary drying temperature, with other production conditions being similar to those of [Example L1], whereby to prepare the anti-reflection film of [Example L9].
In [Example L10], the coating liquid for forming a localized layer L1 was used, and the localized layer was formed at 80° C. of both of the primary drying temperature and the secondary drying temperature, with other production conditions being similar to those of [Example L1], whereby to prepare the anti-reflection film of [Example L10].

[Example L11] and [Example L12]

In [Example L11] and [Example L12], the coating liquids for forming a localized layer L8 and L9 were used instead of the coating liquid for forming a localized layer L1, with other production conditions being similar to those of [Example L1], whereby to prepare the anti-reflection films of [Example L11] and [Example L12].

The production conditions in [Example L1] to [Example L12] are shown collectively in Table 23.

TABLE 23

| | | Production Condition | | | | | | | | |
|---|---|---|---|---|---|---|---|---|---|---|
| | | Conductive Polymer | | | | | Dilution Solvent | | Drying Temperature | |
| | | | Average | | Leveling Material | | | Solid | Primary | Secondary |
| | | | Particle | | | | | | Drying | Drying |
| | Forming Coating Liquid | Name of Material | Size (nm) | Quantity | Name of Material | Molecular Weight | Name of Material | Content Adjustment | Temperature | Temperature |
| Example L1 | Localized Layer-Forming Coating Liquid L1 | Polythiophene | 100 | 5 Weight Part | FLOREN AC2200HF | 5000 | Methyl Ethyl Ketone | 50% | 25° C. | 80° C. |
| Example L2 | Localized Layer-Forming Coating Liquid L2 | Polyaniline | 75 | 5 Weight Part | FLOREN AC2200HF | 5000 | Methyl Ethyl Ketone | 50% | 25° C. | 80° C. |
| Example L3 | Localized Layer-Forming Coating Liquid L3 | Polythiophene | 300 | 5 Weight Part | FLOREN AC2200HF | 5000 | Methyl Ethyl Ketone | 50% | 25° C. | 80° C. |
| Example L4 | Localized Layer-Forming Coating Liquid L4 | Polythiophene | 100 | 0.01 Weight Part | FLOREN AC2200HF | 5000 | Methyl Ethyl Ketone | 50% | 25° C. | 80° C. |
| Example L5 | Localized Layer-Forming Coating Liquid L5 | Polythiophene | 100 | 5 Weight Part | FLOREN AC2200HF | 5000 | Isopropyl Alcohol | 50% | 25° C. | 80° C. |
| Example L6 | Localized Layer-Forming Coating Liquid L6 | Polythiophene | 100 | 5 Weight Part | FLOREN AC2200HF | 5000 | Methyl Ethyl Ketone | 20% | 25° C. | 80° C. |
| Example L7 | Localized Layer-Forming Coating Liquid L7 | Polythiophene | 100 | 5 Weight Part | FLOREN AC2200HF | 5000 | Methyl Ethyl Ketone | 90% | 25° C. | 80° C. |
| Example L8 | Localized Layer-Forming Coating Liquid L1 | Polythiophene | 100 | 5 Weight Part | FLOREN AC2200HF | 5000 | Methyl Ethyl Ketone | 50% | 50° C. | 60° C. |
| Example L9 | Localized Layer-Forming Coating Liquid L1 | Polythiophene | 100 | 5 Weight Part | FLOREN AC2200HF | 5000 | Methyl Ethyl Ketone | 50% | 25° C. | |
| Example L10 | Localized Layer-Forming Coating Liquid L1 | Polythiophene | 100 | 5 Weight Part | FLOREN AC2200HF | 5000 | Methyl Ethyl Ketone | 50% | 80° C. | |
| Example L11 | Localized Layer-Forming Coating Liquid L8 | Polythiophene | 100 | 5 Weight Part | — | — | Methyl Ethyl Ketone | 50% | 25° C. | 80° C. |
| Example L12 | Localized Layer-Forming Coating Liquid L9 | — | — | — | — | — | Methyl Ethyl Ketone | 50% | 25° C. | 80° C. |

For the resulting anti-reflection films of [Example L1] to [Example L12], evaluations were performed as described above. In addition, the state of formation of each layer in the localized layer was checked. The evaluation results and the like are shown collectively in Table 24.

TABLE 24

| | Luminous Reflectivity (%) | Haze (%) | Parallel Light Transmittance (%) | Surface Resistance Value (Ω/cm2) | Contact Angle (°) Localized Layer Surface | Contact Angle (°) Low-refractive Index Surface | Color Variation and Interference Fringe | Abrasion Resistance (SW) | Pencil Hardness | State of Localized Layer Formation Intermediate Layer | Hard Coat Layer | Antistatic Layer | Leveling Layer |
|---|---|---|---|---|---|---|---|---|---|---|---|---|---|
| Example L1 | 1.0 | 0.1 | 95.0 | $1 \times 10^9$ | 75 | 85 | ○ | ○ | 2H | ○ | ○ | ○ | ○ |
| Example L2 | 1.0 | 0.1 | 95.0 | $1 \times 10^9$ | 75 | 85 | ○ | ○ | 2H | ○ | ○ | ○ | ○ |
| Example L3 | 1.0 | 0.1 | 95.0 | $1 \times 10^9$ | 75 | 85 | ○ | ○ | 2H | ○ | ○ | ○ | ○ |
| Example L4 | 1.0 | 3.0 | 95.5 | $1 \times 10^{13}$ | 75 | 85 | ○ | ○ | 2H | ○ | ○ | X | ○ |
| Example L5 | 1.0 | 0.1 | 95.0 | $1 \times 10^8$ | 75 | 85 | X | ○ | 2H | X | ○ | ○ | ○ |
| Example L6 | 1.0 | 3.0 | 93.5 | $1 \times 10^8$ | 40 | 60 | ○ | X | B | ○ | X | ○ | X |
| Example L7 | 1.0 | 0.7 | 95.0 | $5 \times 10^8$ | 75 | 85 | X | ○ | 2H | X | ○ | X | X |
| Example L8 | 1.0 | 2.0 | 92.0 | $1 \times 10^{13}$ | 60 | 85 | ○ | X | 2H | ○ | ○ | X | X |
| Example L9 | 1.0 | 0.1 | 95.0 | $1 \times 10^9$ | 40 | 50 | ○ | X | B | ○ | X | ○ | X |
| Example L10 | 1.0 | 0.1 | 95.0 | $5 \times 10^{13}$ | 60 | 85 | ○ | ○ | 2H | ○ | ○ | X | X |
| Example L11 | 1.0 | 3.0 | 92.0 | $5 \times 10^8$ | 40 | 50 | ○ | X | 2H | ○ | ○ | ○ | — |
| Example L12 | 1.0 | 0.1 | 96.0 | $5 \times 10^{13}$ | 70 | 85 | ○ | ○ | 2H | ○ | ○ | — | — |

From the results of Examples, it was possible to provide an anti-reflection film having low production costs and excellent optical property, and high abrasion resistance and antistatic performance by preparing the anti-reflection film in which a localized layer is constituted with an intermediate layer, a hard coat layer, an antistatic layer and a leveling layer.

What is claimed is:

1. An anti-reflection film in which a localized layer and a low refractive index layer are laminated in this order on at least one surface of a transparent base,
   wherein the localized layer includes an intermediate layer laminated over the transparent base, a hard coat layer laminated over the intermediate layer, an antistatic layer laminated over the hard coat layer, and a leveling layer laminated over the antistatic layer, and wherein the antistatic layer includes an conductive material, and the leveling layer includes a leveling material,
   wherein
   a parallel light beam transmittance of the anti-reflection film is 93% or more,
   a haze of the anti-reflection film is within a range of 1.0% or less,
   a surface resistance value of the anti-reflection film on a surface of the low refractive index layer is within a range of from $1 \times 10^5$ Ω/cm² to $1 \times 10^{12}$ Ω/cm², and
   a pure water contact angle of the anti-reflection film on the surface of the low refractive index layer is within a range of from 80° to 130°.

2. The anti-reflection film according to claim 1, wherein the leveling material is selected from a compound having an amide group, a compound having an acrylic group, a compound having a butadiene group, and a compound having an olefin group.

3. The anti-reflection film according to claim 1, wherein the conductive material is selected from a quaternary ammonium salt material, a metal oxide particle, and a conductive polymer.

4. The anti-reflection film according to claim 1, wherein
the conductive material includes metal oxide particles,
the leveling material includes a compound having an amide group,
an average particle size of the metal oxide particles is 500 nm or less, and
a molecular weight (A) of the compound having the amide group is 100,000 or less.

5. The anti-reflection film according to claim 1, wherein
the conductive material includes a conductive polymer,
the leveling material includes a compound having an amide group,
an average particle size of the conductive polymer is 1,000 nm or less, and
a molecular weight (A) of the compound having the amide group is 100,000 or less.

6. The anti-reflection film according to claim 1, wherein
the conductive material includes a quaternary ammonium salt material,
the leveling material includes a compound having an acrylic group,
a molecular weight (Q) of the quaternary ammonium salt material is from 1,000 to 100,000, and
a molecular weight (B) of the compound having the acrylic group is 100,000 or less.

7. The anti-reflection film according to claim 1, wherein
the conductive material includes metal oxide particles,
the leveling material includes a compound having an acrylic group,
an average particle size of the metal oxide particles is 500 nm or less, and
a molecular weight (B) of the compound having the acrylic group is 100,000 or less.

8. The anti-reflection film according to claim 1, wherein
the conductive material includes a conductive polymer,
the leveling material includes a compound having an acrylic group,
an average particle size of the conductive polymer is 1,000 nm or less, and
a molecular weight (B) of the compound having the acrylic group is 100,000 or less.

9. The anti-reflection film according to claim 1, wherein
the conductive material includes a quaternary ammonium salt material, the leveling material includes a compound having a butadiene group,
a molecular weight (Q) of the quaternary ammonium salt material is from 1,000 to 100,000, and
a molecular weight (C) of the compound having the butadiene group is 100,000 or less.

10. The anti-reflection film according to claim 1, wherein
the conductive material includes metal oxide particles,
the leveling material includes a compound having a butadiene group,
an average particle size of the metal oxide particles is 500 nm or less, and
a molecular weight (C) of the compound having the butadiene group is 100,000 or less.

11. The anti-reflection film according to claim 1, wherein
the conductive material includes a conductive polymer,
the leveling material includes a compound having a butadiene group,
an average particle size of the conductive polymer is 1,000 nm or less, and
a molecular weight (C) of the compound having the butadiene group is 100,000 or less.

12. The anti-reflection film according to claim 1, wherein
the conductive material includes a quaternary ammonium salt material,
the leveling material includes a compound having an olefin group,
a molecular weight (Q) of the quaternary ammonium salt material is from 1,000 to 100,000, and
a molecular weight (D) of the compound having the olefin group is 100,000 or less.

13. The anti-reflection film according to claim 1, wherein
the conductive material includes metal oxide particles,
the leveling material includes a compound having an olefin group,
an average particle size of the metal oxide particles is 500 nm or less, and
a molecular weight (D) of the compound having the olefin group is 100,000 or less.

14. The anti-reflection film according to claim 1, wherein
the conductive material includes a conductive polymer,
the leveling material includes a compound having an olefin group,
an average particle size of the conductive polymer is 1,000 nm or less, and
a molecular weight (D) of the compound having the olefin group is 100,000 or less.

15. An anti-reflection film in which a localized layer and a low refractive index layer are laminated in this order on at least one surface of a transparent base,
wherein the localized layer includes an intermediate layer laminated over the transparent base, a hard coat layer laminated over the intermediate layer, an antistatic layer laminated over the hard coat layer, and a leveling layer laminated over the antistatic layer, and wherein the antistatic layer includes an conductive material, and the leveling layer includes a leveling material,
wherein
the conductive material includes a quaternary ammonium salt material,
the leveling material contained includes a compound having an amide group,
a molecular weight (Q) of the quaternary ammonium salt material is from 1,000 to 100,000, and
a molecular weight (A) of the compound having the amide group is 100,000 or less.

* * * * *